US011250054B1

(12) United States Patent
Campbell

(10) Patent No.: US 11,250,054 B1
(45) Date of Patent: *Feb. 15, 2022

(54) DYNAMIC PARTITIONING OF INPUT FRAME BUFFER TO OPTIMIZE RESOURCES OF AN OBJECT DETECTION AND RECOGNITION SYSTEM

(71) Applicant: Jeffery R. Campbell, Warkworth (CA)

(72) Inventor: Jeffery R. Campbell, Warkworth (CA)

(73) Assignee: WAYLENS, INC., Cambridge, MA (US)

( * ) Notice: Subject to any disclaimer, the term of this patent is extended or adjusted under 35 U.S.C. 154(b) by 484 days.

This patent is subject to a terminal disclaimer.

(21) Appl. No.: 16/156,254

(22) Filed: Oct. 10, 2018

Related U.S. Application Data

(63) Continuation of application No. 16/106,777, filed on Aug. 21, 2018, now abandoned, and a continuation of application No. 15/618,286, filed on Jun. 9, 2017, now abandoned, and a continuation of application No. 15/591,459, filed on May 10, 2017, now abandoned.

(Continued)

(51) Int. Cl.
| | |
|---|---|
| *G06F 16/78* | (2019.01) |
| *G06F 16/783* | (2019.01) |
| *G06K 9/32* | (2006.01) |
| *B60R 1/00* | (2022.01) |
| *G06K 9/00* | (2022.01) |
| *H04N 7/18* | (2006.01) |
| *G06F 16/738* | (2019.01) |
| *G05D 1/02* | (2020.01) |

(52) U.S. Cl.
CPC ............ *G06F 16/7837* (2019.01); *B60R 1/00* (2013.01); *G06F 16/738* (2019.01); *G06F 16/7867* (2019.01); *G06K 9/00798* (2013.01); *G06K 9/00805* (2013.01); *G06K 9/00818* (2013.01); *G06K 9/325* (2013.01); *H04N 7/183* (2013.01); *B60R 2300/50* (2013.01); *G05D 1/0246* (2013.01)

(58) Field of Classification Search
CPC .................................................. G06F 16/5846
See application file for complete search history.

(56) References Cited

U.S. PATENT DOCUMENTS 5,231,435 A * 7/1993 Blakely ................ G03B 15/006
396/12
7,872,593 B1 * 1/2011 Rauscher .................. G06T 5/50
340/933

(Continued)

*Primary Examiner* — Eliyah S. Harper
(74) *Attorney, Agent, or Firm* — Christopher P. Maiorana, PC

(57) ABSTRACT

An apparatus comprising a processor and a memory. The processor may be configured to (i) receive video frames captured by a capture device and (ii) perform video analysis on the video frames to extract metadata corresponding to objects detected in the video frames. The memory may be configured to (i) store co-ordinates corresponding to a plurality of regions of the video frames and (ii) provide temporary storage for the video frames to enable the processor to perform the video analysis. The video analysis may perform a different amount of processing for detecting the objects on each of the plurality of regions. One of the regions corresponds to a portion of the video frame comprising a hood of a vehicle.

19 Claims, 19 Drawing Sheets

Related U.S. Application Data

(60) Provisional application No. 62/571,884, filed on Oct. 13, 2017, provisional application No. 62/548,548, filed on Aug. 22, 2017.

(56) References Cited

U.S. PATENT DOCUMENTS

| | | | |
|---|---|---|---|
| 9,307,217 B1* | 4/2016 | Day | H04N 9/79 |
| 9,848,114 B2* | 12/2017 | Boudreau | H04M 1/72412 |
| 2005/0031335 A1* | 2/2005 | Itzkowitz | F16M 13/02 |
| | | | 396/419 |
| 2010/0172542 A1* | 7/2010 | Stein | G06K 9/209 |
| | | | 382/103 |
| 2012/0230538 A1* | 9/2012 | Caiman | G06F 16/583 |
| | | | 382/103 |
| 2015/0235397 A1* | 8/2015 | Beckman | G06T 11/206 |
| | | | 345/440 |
| 2016/0006922 A1* | 1/2016 | Boudreau | H04N 7/185 |
| | | | 348/207.1 |
| 2017/0200061 A1* | 7/2017 | Julian | G06K 9/00791 |
| 2017/0262996 A1* | 9/2017 | Jain | G06K 9/4671 |
| 2017/0337435 A1* | 11/2017 | Uliyar | G08G 1/0129 |
| 2017/0344838 A1* | 11/2017 | Zhou | G06T 7/77 |
| 2018/0027371 A1* | 1/2018 | Austraat | H04M 1/72454 |
| | | | 455/456.3 |
| 2018/0265095 A1* | 9/2018 | Joe | A61B 5/18 |
| 2019/0028935 A1* | 1/2019 | Cai | H04W 72/1284 |

* cited by examiner

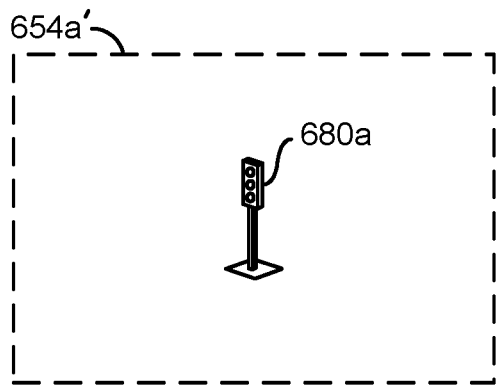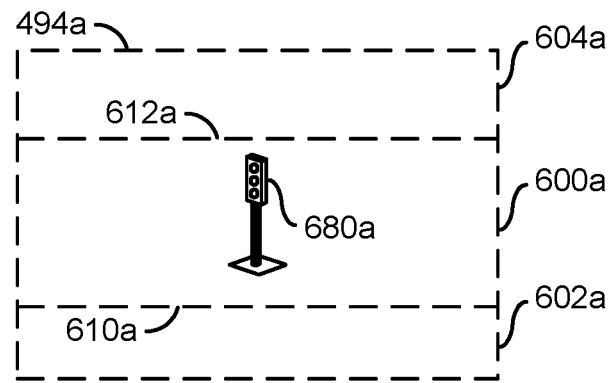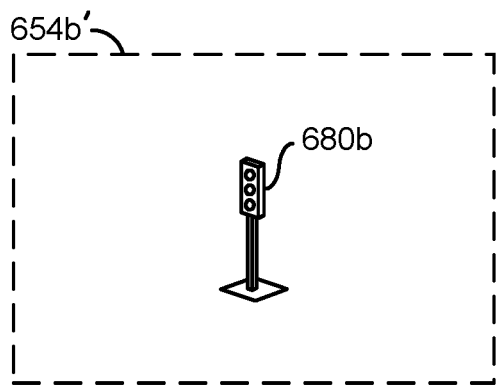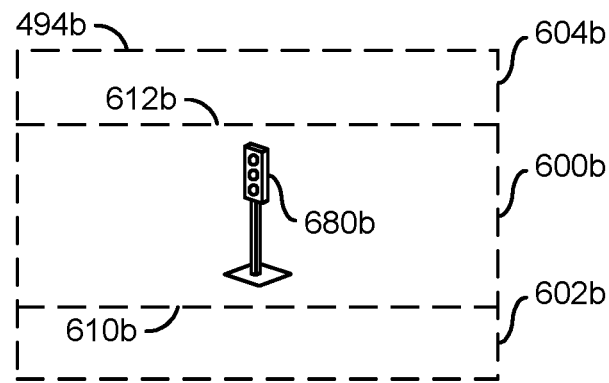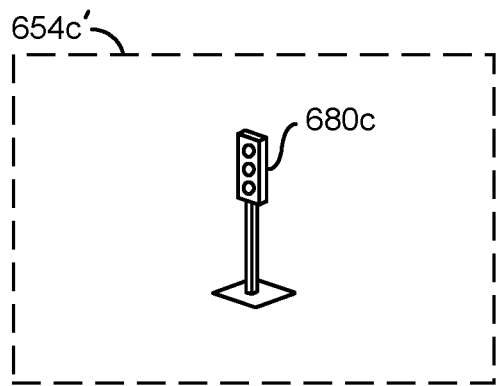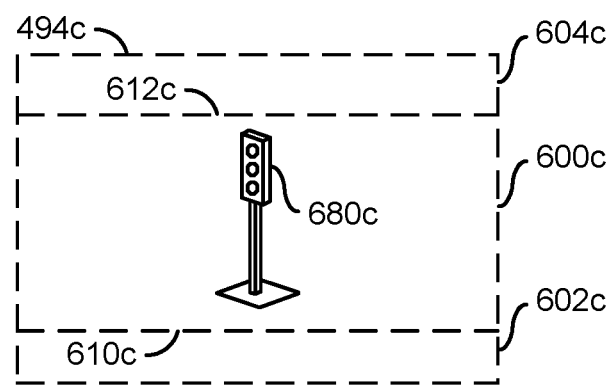
FIG. 10

DYNAMIC PARTITIONING OF INPUT FRAME BUFFER TO OPTIMIZE RESOURCES OF AN OBJECT DETECTION AND RECOGNITION SYSTEM

This application relates to U.S. Provisional Application No. 62/571,884, filed Oct. 13, 2017, which relates to U.S. U.S. Ser. No. 16/106,777, filed Aug. 21, 2018, which relates to Provisional Application No. 62/548,548, filed Aug. 22, 2017. This application also relates to U.S. Ser. No. 15/618,286, filed Jun. 9, 2017. This application also relates to U.S. Ser. No. 15/591,459, filed May 10, 2017. Each of the mentioned applications are hereby incorporated by reference in their entirety.

FIELD OF THE INVENTION

The invention relates to video capture generally and, more particularly, to a method and/or apparatus for implementing a dynamic partitioning of input frame buffer to optimize resources of an object detection and recognition system.

BACKGROUND

Real time video metadata extraction algorithms are system intensive and must process details from a video frame in a fixed amount of time to free up resources needed to analyze the next incoming video frame.

Typical dash camera systems are mounted on the front of a windshield of a vehicle at the center of the vehicle. The standard dash camera application is intended to capture mishaps and accidents that may occur on the roadway, especially as these incidents relate to damage to the vehicle hosting the dash camera. With these goals and mounting location in mind, it is advantageous to have a field of view (FOV) of the dash camera that is as wide as possible. The typical dash camera application will utilize an image sensor with 16:9 aspect ratio (with the wider dimension horizontal) and have a 140 to 180 degree wide angle lens attached. Using the wide angle lens has the advantage of capturing activity on both sides of the vehicle (as well as straight ahead) but has the disadvantage of capturing a large portion of the video frame as the vehicle hood and the sky. Objects of interest (such as collisions, road signs, other vehicles, pedestrians, etc.) are not generally located on the vehicle hood or the sky. However, sometimes objects of interest are located in the sky.

It would be desirable to implement a hood detection scheme used to optimize buffer size used for automobile metadata extraction.

SUMMARY

The invention concerns an apparatus comprising a processor and a memory. The processor may be configured to (i) receive video frames captured by a capture device and (ii) perform video analysis on the video frames to extract metadata corresponding to objects detected in the video frames. The memory may be configured to (i) store co-ordinates corresponding to a plurality of regions of the video frames and (ii) provide temporary storage for the video frames to enable the processor to perform the video analysis. The video analysis may perform a different amount of processing for detecting the objects on each of the plurality of regions. One of the regions corresponds to a portion of the video frame comprising a hood of a vehicle.

BRIEF DESCRIPTION OF THE FIGURES

Embodiments of the invention will be apparent from the following detailed description and the appended claims and drawings in which:

FIG. 10 is a diagram illustrating tracking an approach of a tall object;

DETAILED DESCRIPTION OF THE EMBODIMENTS

Embodiments of the present invention include a dynamic partitioning of an input frame buffer to optimize resources of an object detection and recognition system that may (i) implement vehicle-mounted cameras configured to perform local video analytics, (ii) generate metadata corresponding to captured video, (iii) store metadata about multiple vehicles and objects, (iv) provide a searchable database of video metadata, (v) efficiently partition the input frame buffer to reduce a processing load, (vi) use video analysis to determine a distance to objects, (vii) dynamically adjust the location of the partitions of the input buffer, (viii) adjust input frame buffer partition locations in response to geolocation information, (ix) enable event recreation using metadata from a video, (x) transfer data from a vehicle-mounted camera to a database via a user communication device, (xi) be implemented on a cloud-based database and/or (xii) use data effectively.

Dash mounted cameras (e.g., dashcams) are generally installed in a fixed location inside a vehicle (e.g., attached to the dashboard, mounted to the windshield, mounted behind a rearview mirror, etc.). Mounting a dashcam inside of a vehicle (e.g., an ego vehicle) results in portions of the ego vehicle (e.g., a car hood) being captured in the video frames. Since dashcams are statically located within the ego vehicle, the portions of the ego vehicle may be located in the same position in each video frame captured. Embodiments of the present invention may implement license plate recognition detect other types of objects. Objects and/or license plates will not appear where the portions of the ego vehicle are located in the captured video frames. Embodiments of the present invention may efficiently analyze the video frames by ignoring particular portions of a video frame and/or reducing an amount of processing load applied to the particular portions of the video frame. With advanced knowledge of the expected input video frames, the input frame buffer may be partitioned to dynamically adjust the amount of video analysis performed on pre-defined areas of the video frames.

Figure 1:
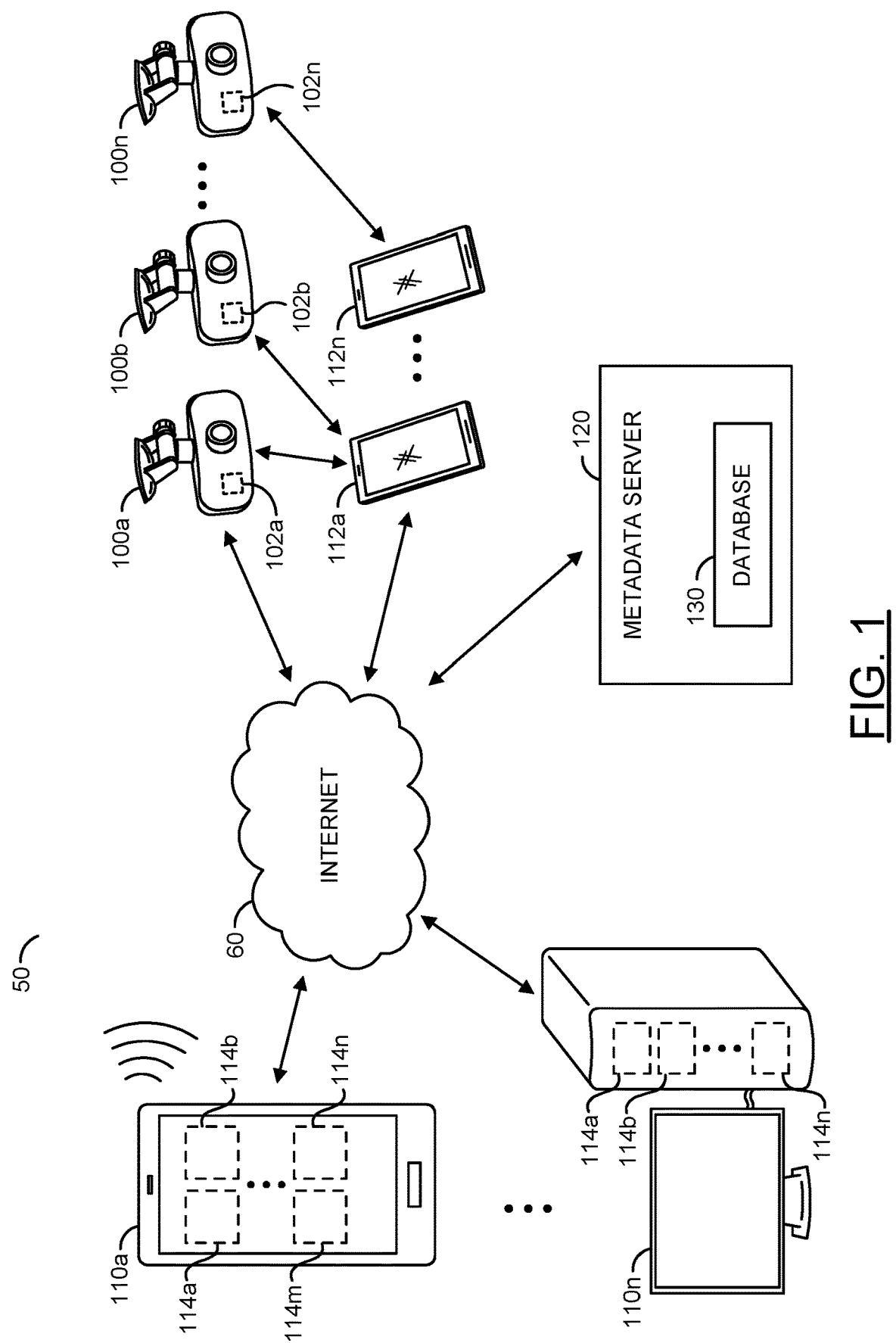
FIG. 1 is a diagram illustrating an example system in accordance with an embodiment of the present invention.

Referring to FIG. 1, a diagram illustrating an example system 50 in accordance with an embodiment of the present invention is shown. The system 50 may comprise a block (or circuit) 60, blocks (or circuits) 100a-100n, blocks (or circuits) 110a-110n, blocks (or circuits) 112a-112n and/or a block (or circuit) 120. The block 60 may be a network. The blocks 100a-100n may implement video capture devices. The blocks 110a-110n may implement subscriber devices (e.g., subscriber communication devices). The blocks 112a-112n may implement user devices (e.g., user communication devices). The block 120 may implement a server computer. The system 50 may comprise other components (not shown). The number and/or types of components implemented by the system 50 may be varied according to the design criteria of a particular implementation.

The network 60 may enable communication between the various components of the system 50. In an example, the network 60 may be the internet and/or a wide area network. Some of the components of the system 50 may communicate with the internet 60 wirelessly. Some of the components of the system 50 may communicate with the internet via a hard-wired connection.

The subscriber devices 110a-110n and/or the user communication devices 112a-112n may be configured to execute computer readable instructions (e.g., executable programs, apps, binaries, etc.). For example, the subscriber devices 110a-110n and/or the user communication devices 112a-112n may be implemented as a desktop computer, a laptop computer, a netbook computer, a tablet computing device, a phablet computing device, a smartphone, a smartwatch, smart clothing (e.g., clothing with LTE communication built in), human implantable devices (e.g., a computer chip embedded under the skin), etc. In an example, the subscriber devices 110a-110n and/or the user communication devices 112a-112n may be implemented as a vehicle capable of 3G/4G/LTE/5G communication (e.g., a vehicle with a touchscreen infotainment system). Generally, the subscriber devices 110a-110n and/or the user communication devices 112a-112n may be a device capable of data transmission to the network 60 and may comprise a display, a processor, a memory, an input (e.g., mouse, keyboard, touchscreen, voice recognition, etc.) and/or an output (e.g., a display, haptic feedback, a speaker, etc.). In some embodiments, the subscriber devices 110a-110n and/or the user communication devices 112a-112n may have similar implementations. For example, the user communication devices 112a-112n may be wireless communication devices. The type and/or features of the subscriber devices 110a-110n and/or the user communication devices 112a-112n may be varied according to the design criteria of a particular implementation.

Each of the subscriber devices 110a-110n may be configured to connect to the network 60 (e.g., hard-wired, Wi-Fi, etc.). The subscriber devices 110a-110n may be configured to store and/or execute the computer readable instructions 114a-114n. Executing the computer readable instructions 114a-114n may enable the subscriber devices 110a-110n to display various interfaces, generate output and/or receive input. For example, the app 114a may be a front-end for interacting with the system 50.

Each of the capture devices 100a-100n may be configured to capture video data. In some embodiments, the capture devices 100a-100n may be implemented as vehicle-mounted cameras (e.g., dashcams) to record video while a user drives the vehicle. In one example, each vehicle may be equipped with one of the capture devices 100a-100n. In another example, one vehicle may be equipped with more than one of the capture devices 100a-100n (e.g., to capture multiple fields of view and/or perspectives from the vehicle). In some embodiments, the capture devices 100a-100n may be cameras mounted at stationary locations (e.g., security cameras mounted on buildings). For example, the stationary camera may generate metadata used to determine roadway data. The implementation of the capture devices 100a-100n may be varied according to the design criteria of a particular implementation.

In some embodiments, the capture devices 100a-100n may be configured to communicate directly with the network 60. For example, the capture devices 100a-100n may comprise components implementing Wi-Fi communication and/or 3G/4G/LTE/5G (e.g., cellular) communication. In some embodiments, the capture devices 100a-100n may be configured to communicate indirectly with the network 60. For example, the capture devices 100a-100n may comprise short-range communication such as Bluetooth and/or Wi-Fi (e.g., short-range communication to a tethered device such as a smartphone). A cost of manufacturing the capture devices 100a-100n may be reduced if no 3G/4G/LTE/5G is implemented. A 3G/4G/LTE/5G connection further adds costs for the user since 3G/4G/LTE/5G generally involves a subscription to a carrier (and potential data usage penalties). For example, a cost of the capture devices 100a-100n may be lower when Bluetooth alone and/or Bluetooth/Wi-Fi is implemented compared to a camera that implements 3G/4G/LTE/5G hardware. Implementing the capture devices 100a-100n with a low cost may enable users to buy more than one of the capture devices 100a-100n and/or provide a larger user base. When the system 50 has more of the capture devices 100a-100n available to capture video data and/or provide metadata, more data points may be available for analysis. Generally, having more data points enables more useful analytical results generated by the system 50. In some embodiments, the capture devices 100a-100n may comprise a display and/or an input interface. For example, the capture devices 100a-100n may be configured to run apps (e.g., the computer executable instructions 114a-114n). In another example, the capture devices 100a-100n may be implemented as smartphones configured as cameras.

Each of the user communication devices 112a-112n may be configured to connect to the network 60 and/or the capture devices 100a-100n. In one example, the user communication devices 112a-112n may implement wireless communication devices. The user communication devices 112a-112n may comprise components configured to implement a wide area network connection (e.g., Wi-Fi) and/or local, device-to-device connections (e.g., Bluetooth, Zig-Bee, Z-Wave, etc.). For example, the user communication devices 112a-112n may implement a Wi-Fi and/or 3G/4G/LTE/5G connection to the internet 60 and a Bluetooth and/or Wi-Fi connection to one or more of the capture devices 100a-100n. In some embodiments, the user communication devices 112a-112n may be configured to send/receive data to/from the Internet 60. For example, the user communication devices 112a-112n may receive data (e.g., video data, metadata, etc.) from one or more of the capture devices 100a-100n and transmit the data to the internet 60. In another example, the user communication devices 112a-112n may receive data (e.g., data requests, interrupt requests, firmware updates, etc.) from the internet 60 and transmit the data to the capture devices 100a-100n.

Generally, the user communication devices 112a-112n are implemented as portable devices (e.g., carried by a person, mounted in a vehicle, battery powered, etc.). The user communication devices 112a-112n may be configured to execute the computer readable instructions 114a-114n. In one example, the subscriber devices 110a-110n may store and/or execute one version (e.g., a subscriber version) of an app (e.g., the computer readable instructions 114a) and the user communication devices 112a-112n may store and/or execute another version (e.g., a provider version) of an app (e.g., the computer readable instructions 114b). One of the user communication devices 112a-112n may be configured to communicate with more than one of the capture devices 100a-100n (e.g., one smartphone may connect to multiple vehicle-mounted cameras in the same vehicle). In the example shown, the smartphone 112a communicates with the capture device 100a and the capture device 100b (e.g., the driver may have the smartphone and the vehicle may have two vehicle-mounted cameras). The connections between the user communication devices 112a-112n and/or the capture devices 100a-100n may be varied according to the design criteria of a particular implementation.

Each of the capture devices 100a-100n may comprise a respective block (or circuit) 102a-102n. The circuits 102a-102n may implement video processor functionality. In some embodiments, the circuits 102a-102n may be a system-on-chip (SoC). For example, the circuits 102a-102n may comprise input/output, a memory, processors, etc. The components and/or functionality of the circuits 102a-102n may be varied according to the design criteria of a particular implementation.

The circuits 102a-102n may be configured to record, encode, decode, transmit and/or store video data. The circuits 102a-102n may be configured to perform video analysis and/or video analytics. For example, the circuits 102a-102n may process video, identify patterns in the video data and/or recognize objects captured by the video data. Heuristics, templates and/or comparisons may be performed by the circuits 102a-102n to recognize and/or identify objects in captured video frames (e.g., video data) as objects that can be perceived by humans. In one example, the circuits 102a-102n may identify an object as a vehicle (or part of a vehicle such as a hood, a license plate, etc.). In another example, the circuits 102a-102n may identify text, shapes and/or colors. In yet another example, the circuits 102a-102n may identify objects (e.g., signs, pedestrians, street lights, etc.). The video data captured by the circuits 102a-102n may be stored by the capture devices 100a-100n. In one example, the circuits 102a-102n may implement a memory. In another example, the circuits 102a-102n may connect to an external memory (e.g., the capture devices 100a-100n may be configured to receive a flash memory such as a SD card, a microSD card, NAND memory, Compact Flash (CF) and/or an XD card).

The circuits 102a-102n may be configured to extract metadata from the captured video frames. The metadata may comprise information about objects detected in the video frames by the video analysis. The metadata may comprise information about the video data (e.g., a time the video was recorded, the model number of the camera recording the video, a location that the video was captured based on GPS information, an altitude that the video was recorded, a direction of the capture device while capturing the video data, etc.). For example, the circuits 102a-102n may comprise a GPS unit to determine GPS coordinates, a magnetometer to determine direction of travel and/or a real time clock (RTC) circuit to determine time.

The circuits 102a-102n may be configured to detect license plates. License plates may be detected, and the alphanumeric characters and/or symbols on the license plate may be identified. The license plate alphanumeric characters and/or symbols may be extracted from the captured video data as the metadata. For example, the circuits 102a-102n may detect, and store as metadata, the license plate alphanumeric characters and/or symbols, and store the license plate alphanumeric characters and/or symbols, the time the video was recorded, the longitude coordinate, the latitude coordinate, an altitude value, time of capture and/or the direction of the capture devices 102a-102n when the video was recorded. The circuits 102a-102n may be further configured to analyze the video data to extract metadata such as a make of a vehicle, a model of a vehicle, color(s) of a vehicle, number of pedestrians, number of vehicles and/or roadway characteristics (e.g., road condition, weather condition, traffic signals present, state of traffic signals, road signs present, amount of traffic, flow of traffic, etc.). The metadata may be associated with the corresponding video data. For example, each video clip captured may be assigned an identification number and the metadata associated with the video clip may have the identification number.

The server 120 may be configured to store data, retrieve and transmit stored data, process data and/or communicate with other devices. In an example, the server 120 may implement a metadata server. The server 120 may be implemented as part of a cloud computing platform (e.g., distributed computing). In an example, the server 120 may be implemented as a group of cloud-based, scalable server computers. By implementing a number of scalable servers, additional resources (e.g., power, processing capability, memory, etc.) may be available to process and/or store variable amounts of data. For example, the server 120 may be configured to scale (e.g., provision resources) based on demand. The server 120 may implement scalable computing (e.g., cloud computing). The scalable computing may be available as a service to allow access to processing and/or storage resources without having to build infrastructure (e.g., the provider of the system 50 may not have to build the infrastructure of the server 120).

The server 120 may be configured to execute computer readable instructions. In an example, the server 120 may process HTML, CSS, JavaScript, PHP, SQL, AJAX applications, APIs, etc. The server 120 may be configured to distribute apps (e.g., one or more of the computer readable instructions 114a-114n) to the subscriber devices 110a-110n and/or the user communication devices 112a-112n. The server 120 may be configured to generate interfaces (e.g., graphical user interfaces) based on stored data for the subscriber devices 110a-110n. For example, the server 120 may generate data to implement an interface, the data may be sent to the subscriber devices 110a-110n, the subscriber devices 110a-110n may interpret the data to generate a user interface, the user may interact with the user interface to provide requests, the subscriber devices 110a-110n may transmit the requests to the server 120 and the server may process the requests. Similarly, the capture devices 100a-100n and/or the user communication devices 112a-112n may interpret data from the server 120 to implement an interface. The processing capabilities and/or functionality of the server 120 may be varied according to the design criteria of a particular implementation.

The server 120 may comprise a block (or circuit) 120. The circuit 120 may implement a database (e.g., a remote database). The database 130 may store data and/or filter the stored data in response to search parameters. Details of the database 130 may be described in association with FIG. 2. Generally, the database 130 may store data provided by the capture devices 100a-100n. In an example, the database 130 may store the metadata. Search parameters may be transmitted by the subscriber devices 110a-110n and the database 130 may be searched based on the search parameters. For example, the database 130 may enable the metadata to be associated with the video data stored by (and located on) the capture devices 100a-100n.

The system 50 may be configured to provide a searchable, real time database of roadway video. In an example, the system 50 may be implemented to assist in time-critical challenges (e.g., AMBER alerts, roadway crime, asset recovery, auto insurance investigation, etc.). The system 50 may implement a "Big Data" approach to providing and/or searching captured video and/or metadata.

The system 50 may be implemented using inexpensive cameras 100a-100n to program participants (e.g., the users and/or the data producers). The data producers may install the capture devices 100a-100n. For example, the data producers may install the capture devices 100a-100n on vehicles as dashcams. The capture devices 100a-100n may provide the benefits of a security camera and/or a dashboard camera to the data producers (e.g., security, video evidence, video data for uploading to video services such as YouTube, etc.). In some embodiments, the system 50 may determine an amount of video recorded and provide rewards (e.g., perks) to the data producers (e.g., discounts on the capture devices 100a-100n).

The data producers may use the capture devices 100a-100n to collect and/or upload video metadata to the server 120 (e.g., for storage in the database 130). For example, the video metadata may be uploaded via the user communication devices 112a-112n. The data producers may provide the recorded video to the server 120 on demand. The data producers may be compensated on an ongoing basis for providing the video metadata and/or the recorded video. In one example, the data producer may receive a payment for providing and/or making a pre-determined amount of recorded video available. In another example, the data producer may receive a payment each time one of the video recordings is requested.

The video metadata may be accumulated in the remote database 130. For example, the database 130 may be curated. The video metadata may be made available through a web interface to subscribers (e.g., the data consumers). The subscribers may use the subscriber devices 110a-110n to access the database 130. The database 130 and/or the server 120 may enable the subscribers to search the database 130 using search parameters. In one example, the interface may provide a map overlay (e.g., based on data presented by the server 120) that the subscriber may interact with on the subscriber devices 110a-110n to provide the search parameters. In another example, the subscriber may specify search parameters such as a location, a time of an incident and/or license plate data. The database 130 may perform a search of the metadata to determine whether any of the video metadata matches the search parameters.

The database 130 may provide the search results. The interface generated on the subscriber devices 110a-110n may provide the subscriber with a list of videos that match the search results communicated by the server 120. The subscriber may request available recorded video files for a given event. If a subscriber requests one of the video files, a request may be sent to the server 120. The server 120 and/or the database 130 may determine which of the capture devices 100a-100n captured the video based on the video metadata (e.g., the metadata may comprise an ID of a camera and/or user that captured the video). The server 120 may send a request to the user communication devices 112a-112n and/or the capture devices 100a-100n to upload the recorded video. If the capture devices 100a-100n still have the requested video stored, a video upload may be initiated. The recorded video may be trickled (e.g., uploaded as a low priority data transfer) from the corresponding one of the capture devices 100a-100n, through the corresponding one of the user communication devices 112a-112n and to the internet 60. In some embodiments, the recorded video may be buffered on one of the user communication devices 112a-112n until particular conditions are met for uploading the video recording (e.g., until a Wi-Fi connection is available). The server 120 may notify the subscriber that the video is available for download. An account of the data producer that uploaded the video may be credited in response to the video upload.

The system 50 may enable data provider users to access the database 130. The data provider users may feed the database 130 in real time with video metadata. The system 50 may enable the subscriber users to search the database 130. When the database 130 determines there is a hit for a search request, the system 50 may allow the subscriber to get access to the video metadata and/or the video recording.

The capture devices 100a-100n may be implemented with inexpensive hardware powerful enough to perform video analytics (e.g., license plate recognition (LPR)). The video analytics may be performed in real time, while capturing the video data. In one example, the capture devices 100a-100n may be sold with a low margin to encourage wide adoption of the device so that many users may be the data providers to capture large amounts of video data for the system 50. Since data providers may be compensated for providing the video data and/or video metadata, the data providers may have the ability to turn the capture devices 100a-100n into a money making tool. For example, in the system 50 the drivers may own the capture devices 100a-100n and use them to make money (e.g., similar to how an Uber, Lyft or other ridesharing service drivers own a vehicle and use the vehicle to make money).

The database 130 may be implemented to receive video metadata, index the metadata and/or provide responses to search requests in real time. In some embodiments, the database 130 may store video recordings. Generally, the video metadata (e.g., plate number, GPS coordinates, time, etc.) is uploaded via the user communication devices 112a-112n without the corresponding recorded video (e.g., the metadata may be uploaded before the video data is uploaded). If one of the subscriber users requests a recorded video file corresponding to the video metadata, the system 50 may enable the video data to be uploaded to the metadata server 120 (e.g., data may be uploaded as a low-priority data transfer). The recorded video data may have a limited time frame of availability. In one example, the capture devices 100a-100n may be configured to overwrite stored video as new video data is captured (e.g., a loop recording). In an example of 40 hours of driving per week with the capture devices 100a-100n implementing a 128 GB SD card and recording at 10 Mbit/s, the recorded video may be overwritten in approximately 3.5 days. When a video expires (e.g., is overwritten), the video metadata stored in the database 130 may still provide useful information to the subscriber user (e.g., which vehicles were in a particular area at a particular time).

The video metadata and/or the recorded video may provide useful information to the subscriber users. In one example, the system 50 may be helpful in an AMBER Alert situation. In another example, video evidence may be provided to insurance companies involved with a given auto accident. Different viewpoints and/or camera angles may be used to determine the circumstances that led up to an accident. In yet another example, the system 50 may save many government agencies (e.g., Department of Transportation) a tremendous amount of money in planning infrastructure (e.g., to limit infrastructure development and/or expand infrastructure development based on driving habits). In still another example, the system 50 may provide investigative departments (e.g., Department of Justice, local police, highway patrol, homeland security, etc.) with more information (e.g., post-mortem incident investigation).

Generally, the provider of the system 50 may not capture any video data. The video data may be captured by the data providers that have purchased (or otherwise received) the capture devices 100a-100n. The provider of the system 50 may curate the resulting data generated by the data providers.

Figure 2:
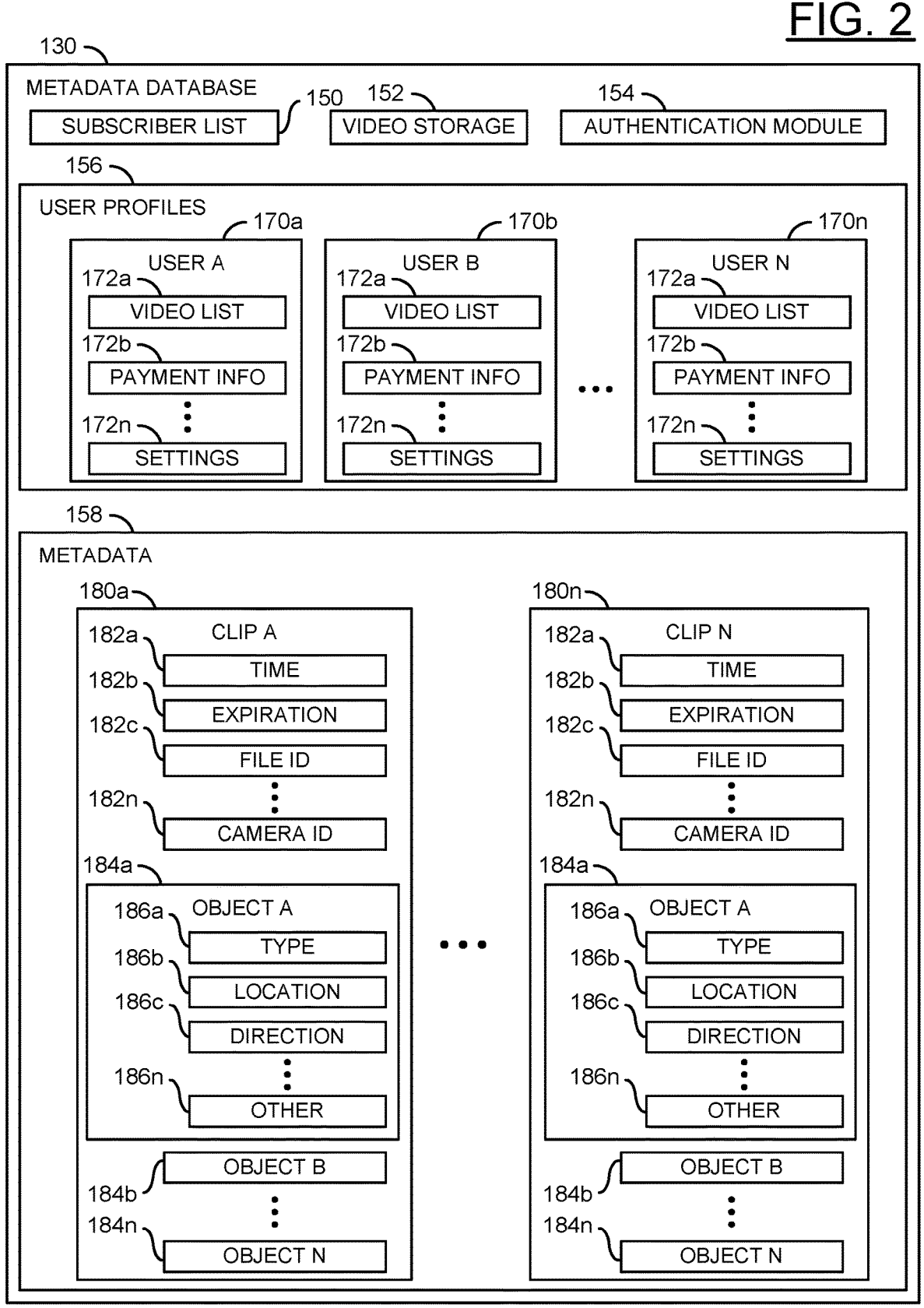
FIG. 2 is a diagram illustrating a block diagram representing data sets stored in a database.

Referring to FIG. 2, a diagram illustrating a block diagram representing example data sets stored in the database 130 is shown. The database 130 may comprise a block (or circuit) 150, a block (or circuit) 152, a block (or circuit) 154, a block (or circuit) 156 and/or a block (or circuit) 158. The block 150 may comprise a subscriber list. The block 152 may comprise video storage. The block 154 may comprise an authentication module. The block 156 may comprise user profiles. The block 158 may comprise plate and/or object metadata. The database 130 may comprise other blocks (or data sets). The implementation of the database 130 may be varied according to the design criteria of a particular implementation.

The subscriber list 150 may be configured to store information about the subscriber users. The subscriber list 150 may provide an account for each subscriber user. For example, a log in with password may be implemented by the app 114a to enable the subscriber user to access the database 130 from the subscriber device 110a. The subscriber list 150 may enable the system 50 to accept payment from subscriber users that request video data (e.g., store payment information, process payment information, etc.). The subscriber list 150 may implement individual settings, configurations and/or notifications for each of the subscriber users.

The video storage 152 may store recorded video data. In some embodiments, the data providers may upload the recorded video data to the database 130 when requested by the subscriber users. The database 130 may provide storage (e.g., temporary hosting) of the recorded video data to enable the subscriber user to download the requested video data. In some embodiments, peer-to-peer data transfers may be implemented to share the recorded video data (e.g., the database 130 may not store the recorded video data). Generally, the recorded video uploaded from the capture devices 100a-100n may be stored by the server 120.

The authentication module 154 may be configured to provide security for the data stored in the database 130. The authentication module 154 may be configured to prevent unauthorized access to the database 130. In one example, the authentication module 154 may be implemented as a username and password. For example, the user communication devices 112a-112n may provide credentials to the database 130 to upload the video metadata and/or the recorded video. In another example, two-factor authentication may be implemented by the authentication module 154. For example, the subscriber user may log in using the subscriber devices 110a-110n by providing a username, a password, and an additional key (e.g., a text message with a passcode provided to the smartphone 110a). The implementation of the authentication module 154 may be varied according to the design criteria of a particular implementation.

For example, users on the subscriber list 150 may be authorized users of the database 130. Generally, not all users have access to the database 130. The authentication module 154 may implement a heavy layer of security for the subscriber users and/or the data provider users to log onto the system 50. Since the database 130 may store privacy information (e.g., license plate data, location information, credit card information, banking information, etc.) the database 130 may be secured with a traditional approach and then have a second layer of security added. Security may be provided even if the implementation of the authentication module 154 adds inconvenience to the users.

The user profiles 156 may store data corresponding to the data provider users. The user profiles 156 may comprise blocks (or circuits) 170a-170n. The blocks 170a-170n may comprise the data provider profiles. Each of the data provider profiles 170a-170n may store information corresponding to an individual data provider. Each of the data provider profiles 170a-170n may comprise blocks (or circuits) 172a-172n. The blocks 172a-172n may be configured to store data sets for the data providers 170a-170n.

The data sets 172a-172n may facilitate access to the database 130 for each of the data provider users. In an example, the data set 172a may store a video list. The video list 172a may comprise a list of videos that have been recorded by a particular data provider. For example, the video list 172a may be used to send a request to the capture devices 100a-100n and/or the user communication devices 112a-112n to upload the recorded video data. In another example, the video list 172a may be used to provide a payment to the particular data provider that captured the requested video data. In an example, the data set 172b may store payment information. The payment information 172b may associate credit card, electronic payment (e.g., PayPal, Bitcoin, Apple Pay, Google Wallet, etc.) and/or bank information with a particular one of the data provider users. The payment information 172b may be used to facilitate payments to the data provider that has uploaded a requested recorded video.

In some embodiments, the data provider may receive one of the capture devices 100a-100n in exchange for providing the payment information 172b and if enough video data is provided (e.g., provided on a consistent basis) the data collector user may not be charged. If the capture device is not used enough (or not used regularly, a charge may be incurred (e.g., due to inactivity). In an example, the data provider may receive one of the capture devices 100a-100n free of charge and be able to use the camera as a regular dashcam as well as for providing data for the system 50. In one example, the data provider may not be charged for one of the capture devices 100a-100n for the first 90 days and if data is provided to the system 50 during the first 90 days no charge will be incurred. To avoid a situation where a freeloader receives the camera for free and uses the camera with the system 50 for a minimum threshold amount to avoid a fee and then stops providing data to the system 50, the payment information 172b may be stored to charge a penalty fee to encourage the data provider to provide data.

In an example, the data set 172n may comprise user settings. The user settings 172n may provide a configuration and/or preferences for each of the data providers 170a-170n. The data sets 172a-172n may store other information (e.g., a user name, a profile picture, a data usage plan of the data provider, etc.). In an example, the data usage plan may provide details of a carrier (e.g., 3G/4G/LTE/5G provider) to manage data transmission (e.g., prefer transferring large files over Wi-Fi instead of a limited data plan). The amount and/or type of data stored in the data sets 172a-172n of each of the data provider profiles 170a-170n may be varied according to the design criteria of a particular implementation.

The metadata 158 may store information about various captured videos (e.g., video clips) 180a-180n. The video clips 180a-180n may not be the actual video data (e.g., the actual video data may be stored with the video storage 152). The video clips 180a-180n may comprise information about the video clips and/or information about objects detected in the video clips by the capture devices 100a-100n.

In some embodiments, each video clip metadata 180a-180n that is captured and/or uploaded by the capture devices 100a-100n may be stored by the database 130. The video data associated with the video clip metadata 180a-180n may be stored in the video storage 152. Generally, the video data in the video storage 152 may be stored temporarily. For example, video data may have a relatively large file size and storing video data indefinitely may be impractical. However, the video clip metadata 180a-180n may have a much smaller file size than the video data. The video clip metadata 180a-180n may be configured to provide sufficient information about the video data to re-create the positioning of various objects in the video data even after the video data is no longer available.

Every time video data is uploaded to the database 130, the corresponding video metadata 180a-180n may be stored by the database 130. The video metadata 180a-180n may be stored long-term compared to the video data. In some embodiments, the metadata 158 may be organized by detected objects instead of the video clip metadata 180a-180n. In one example, where the objects detected are license plates, each time a license plate is detected a new metadata entry may be created. For example, each of the license plate entries may comprise the associated clips 180a-180n. The clips 180a-180n may comprise metadata entries for each time a license plate has been read by one of the capture devices 100a-100n. For example, each time a license plate is detected, a new one of the clips 180a-180n may be appended to the corresponding one of the license plate entries. Similarly, if the objects detected are vehicles then the video clips 180a-180n may be associated with a particular vehicle. The arrangement of the metadata 158 may be varied according to the design criteria of a particular implementation.

Each video clip 180a-180n is shown comprising metadata 182a-182n. The clip metadata 182a-182n may comprise the data extracted by the capture devices 100a-100n from the video recorded by the capture devices 100a-100n and/or data associated with the video recorded by the capture devices 100a-100n. The video clip metadata 182a-182n may be configured to provide useful information about the video clips that have been uploaded.

In one example, the video clip metadata 182a may comprise a time. The time 182a may indicate a date and/or time of day when the corresponding video was recorded (e.g., a timestamp). The time 182a may be used to find recorded video that occurred at a particular time. In another example, the video metadata 182b may comprise an expiration flag. The expiration flag 182b may indicate whether or not the recorded video is still available (e.g., stored in the memory of the capture device, stored in the video storage 152, has not been overwritten, etc.). For example, the expiration flag 182b may have a particular value (e.g., a logical one value) if the video has been overwritten. If the expiration flag 182b indicates that the recorded video is no longer available, the video clip metadata 180a-184n may still provide useful information. The video clip metadata 182c may provide a file ID. The file ID 182c may be used to associate the video clip metadata 180a-180n to a particular stored video file (e.g., either in the video storage 152 and/or in the memory of the cameras 100a-100n). For example, if the expiration flag 182b indicates the video data is still available then the file ID 182c may be used to retrieve the video data. The video clip metadata 182n may provide a camera ID. The camera ID 182n may be used to associate the video clip metadata 180a-180n to a particular one of the cameras 100a-100n (e.g., the camera that captured the video data associated with the metadata). The camera ID 182n may enable the video data to be retrieved from the capture devices 100a-100n (if the video is still available) and/or to enable the data provider to be contacted for more information (or provide payment to the data provider user). The number and/or type of video clip metadata 182a-182n available may be varied according to the design criteria of a particular implementation.

The video clip metadata 180a-180n may comprise a number of objects 184a-184n. The objects 184a-184n may correspond to each object detected using the video analysis performed by the capture devices 100a-100n. In one example, the object 184a may be a particular vehicle detected in the video data. In another example, the object 184b may be a particular pedestrian detected in the video data. In yet another example, the object 184c may be a license plate detected in the video data. In still another example, the object 184n may be a particular sign and/or landmark detected in the video data. The number and/or types of objects 184a-184n stored with the video clip metadata 180a-180n may be varied according to the design criteria of a particular implementation.

Each of the objects 184a-184n may have associated object information 186a-186n. In an example, the object information 186a may correspond to an object type (e.g., a person, a vehicle, a building, a sign, a billboard, a license plate, etc.). The object type 186a may provide details about the associated objects 184a-184n. In one example, if the object is a vehicle, the object type 186a may indicate the make, model, year, color, license plate, number of passengers, distinctive markings, etc. The object information 186b may correspond to a location. The location 186*b* may comprise GPS coordinates corresponding to the object in the recorded video. The location 186*b* may be used to find recorded video that was captured at a particular location (e.g., at an intersection at a particular time). In some embodiments, the location 186*b* may comprise an absolute location of the objects 184*a*-184*n*. For example, the absolute location 186*b* may be determined by the video analysis performed by the capture devices 100*a*-100*n* to determine the actual coordinates of the objects detected instead of merely the GPS coordinates of the capture devices 100*a*-100*n*. In some embodiments, the location 186*b* may be the location of the object within the video frame (e.g., the distance of the object from the camera lens determined by the capture devices 100*a*-100*n* using video analysis).

The object information 186*c* may comprise a direction. In some embodiments, the direction 186*c* may indicate the direction of travel of the objects 184*a*-184*n* (or if the objects 184*a*-184*n* are stationary). For example, the direction 186*c* may be determined by the capture devices 100*a*-100*n* analyzing a sequence of video frames to determine where the object is moving over time. In some embodiments, the direction 186*c* may be the direction that the capture device 186*a*-186*n* was facing when the video data was captured. For example, the information from the location 186*b* and the direction 186*c* may be combined to determine the absolute location coordinates of the objects 184*a*-184*n*. Other types of metadata 186*n* may be stored about the objects 184*a*-184*n*. The types and/or amount of object information 186*a*-186*n* may be varied according to the design criteria of a particular implementation.

The information stored about the video clips 180*a*-180*n* may be used to identify vehicles, times, locations and/or other data about the recorded videos. The video clip metadata 180*a*-180*n* may be the data checked by the database 130 to determine results for a search query from the subscriber users. The video metadata 180*a*-180*n* may be used to approximate what may be recorded and/or visible when viewing the corresponding recorded video. The storage format for the metadata 158 may be implemented to enable re-enact and/or re-creating a scene (e.g., the vehicle locations) after the video data has expired (e.g., re-creating the arrangement of the objects when the video data is no longer available).

The circuits 102*a*-102*n* may be configured to perform object detection and/or video analysis to determine and/or recognize details of an object (e.g., of objects other than license plates). For example, in some video scenes, license plates may not be visible (e.g., the license plate is obstructed and/or not clear enough for optical character recognition). The circuits 102*a*-102*n* may be configured to determine roadway data in real time. In one example, the object information 186*a*-186*n* may store information corresponding to a type of vehicle detected (e.g., color of a car, make of a vehicle, model of a vehicle, year of a vehicle, speed of a vehicle, etc.). In another example, the object information 186*a*-186*n* may comprise roadway data (e.g., a lamp post detected, a street sign detected, a shape of a roadway detected, conditions of the road detected, etc.).

The database 130 may be configured to index the video metadata and/or associate new video metadata with license plate numbers and/or objects in real time. The database 130 may arrange the data to enable efficient filtering of information to provide fast search results for the subscriber users. In the example shown, the metadata 158 is arranged according to the video clips 180*a*-180*n*. In another example, the metadata 158 may be arranged based on a time, a location, a camera ID, etc.). The arrangement of the storage of the data in the database 130 may be varied according to the design criteria of a particular implementation.

The database 130 may be configured to create a database entry for each incoming video clip. In one example, the video metadata 182*a*-182*n* for the clip 180*a* may comprise information such as id="1", lp="5SAM333", date="20170307", time="14:30", alt="141.46354", lat="37.804440" and/or lng="−122.422874". In another example, the video metadata 182*a*-182*n* for the clip 180*i* may comprise information such as id="2", lp="5SAM333", date="20170307", time="14:32", alt="142.13576", lat="37.804643" and/or lng="−122.420899". The database 130 may receive a large amount of data collected from various data provider users in a short amount of time. The database 130 may be constantly (e.g., continually, regularly, periodically, etc.) sorting the received data in order to serve up results to the subscriber users on the web interface. For example, the database may implement one file for each license plate 180*a*-180*n* to avoid parsing all stored data in order to filter out license plate results in real time.

Figure 3:
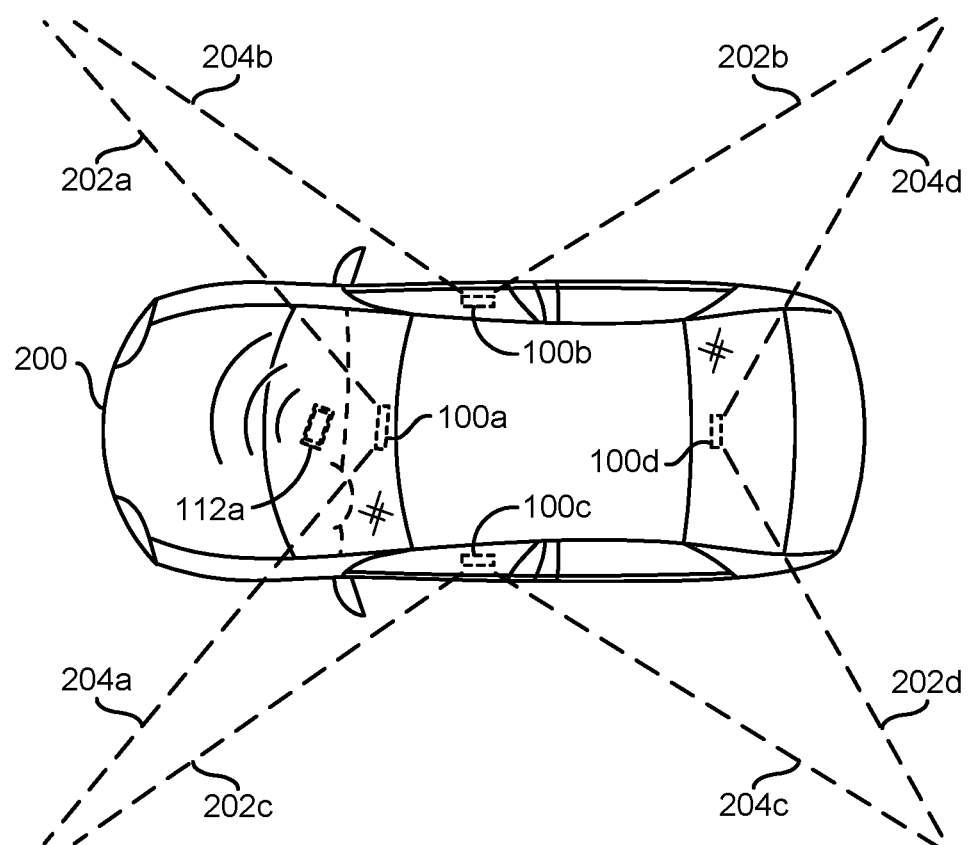
FIG. 3 is a diagram illustrating capturing video data from vehicle-mounted cameras.

Referring to FIG. 3, a diagram illustrating capturing video data from vehicle-mounted cameras is shown. A vehicle 200 is shown. The vehicle 200 may be a vehicle of a data provider (e.g., a data provider vehicle). The vehicle 200 may comprise a number of the capture devices 100*a*-100*n*. In the example shown, the capture device 100*a* may be installed facing the direction of travel of the vehicle 200, the capture device 100*b* may be installed directed away from a passenger side of the vehicle 200, the capture device 100*c* may be installed directed away from a driver side of the vehicle 200 and the capture device 100*d* may be installed directed facing opposite from the direction of travel of the vehicle 200.

The user communication device 112*a* is shown in the vehicle 200. In the example shown, the user communication device 112*a* may be a smartphone communicating to the network 60 (e.g., via a 3G/4G/LTE/5G wireless connection). For example, each of the installed cameras 100*a*-100*d* may communicate with the smartphone 112*a* (e.g., creating a local network) and the smartphone 112*a* may communicate with the external network 60. In the example shown, the capture devices 100*a*-100*d* may be positioned on the windows of the front, side and back of the vehicle 200 (e.g., suction cupped from the inside of the vehicle 200). The number, installation and/or locations of the capture devices 100*a*-100*n* in a vehicle may be varied according to the design criteria of a particular implementation and/or a preference of the data provider.

A line 202*a* and a line 204*a* are shown extending from the capture device 100*a*. The line 202*a* and the line 204*a* may represent a field of view captured by the capture device 100*a*. The field of view of the capture device 100*a* may record video of a view from the front of the vehicle 200 (e.g., from a perspective of a front of the vehicle 200). A line 202*b* and a line 204*b* are shown extending from the capture device 100*b*. The line 202*b* and the line 204*b* may represent a field of view captured by the capture device 100*b*. The field of view of the capture device 100*b* may record video of the view from the right of the vehicle 200 (e.g., from a perspective of a passenger side of the vehicle 200). A line 202*c* and a line 204*c* are shown extending from the capture device 100*c*. The line 202*c* and the line 204*c* may represent a field of view captured by the capture device 100*c*. The field of view of the capture device 100*c* may record video of the view from the left of the vehicle 200 (e.g., from a perspective of a driver side of the vehicle 200). A line 202*d* and a line 204*d* are shown extending from the capture device 100d. The line 202d and the line 204d may represent a field of view captured by the capture device 100d. The field of view of the capture device 100d may record video of the view from the rear of the vehicle 200 (e.g., from a perspective of a back of the vehicle 200).

The vehicle 200 may have a number of the capture devices 100a-100n installed. In the example shown, four of the capture devices 100a-100n may be installed. For example, the cameras may be directed for a "drive mode" (e.g., the camera 100a directed forward, and the camera 100d directed backwards) and the cameras may be directed for a "trawl mode" (e.g., the camera 100b and the camera 100c each directed sideways). For example, the trawl mode may be useful when in parking lots. The number of the capture devices 100a-100n installed on the vehicle 200 may be varied according to the design criteria of a particular implementation.

Figure 4:
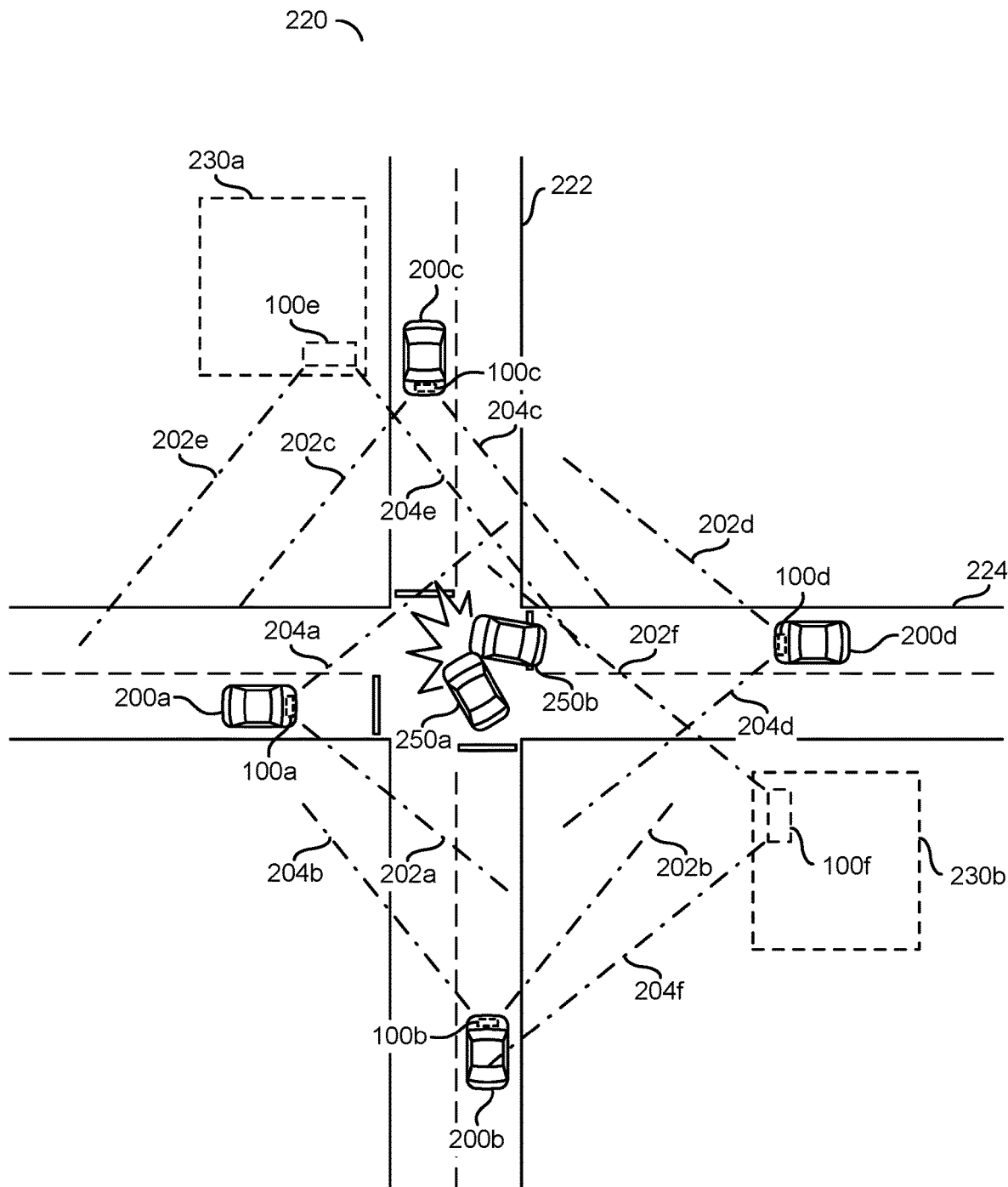
FIG. 4 is a diagram illustrating multiple vehicles capturing video footage of an event.

Referring to FIG. 4, a diagram illustrating multiple vehicles capturing video footage of an event 220 is shown. The event 220 may be a collision at an intersection of a road 222 and a road 224. A vehicle 250a and a vehicle 250b are shown colliding. The drivers of the vehicle 250a and the vehicle 250b may use the system 50 as subscriber users. For example, the subscriber users that drive the vehicle 250a and the vehicle 250b (or insurance companies representing the drivers of the vehicle 250a and/or the vehicle 250b to determine fault) may want video evidence from different viewpoints of the collision (e.g., to aid in resolving insurance claims that may arise as a result of the event 220).

The vehicle 200a may have the capture device 100a installed, the vehicle 200b may have the capture device 100b installed, the vehicle 200c may have the capture device 100c installed and/or the vehicle 200d may have the capture device 100d installed. The drivers of the vehicle 200a, the vehicle 200b, the vehicle 200c and/or the vehicle 200d may be data providers. A building 230a and a building 230b are shown. The building 230a may have the capture device 100e installed and the building 230b may have the capture device 100f installed as a security camera. In some embodiments, one or more of the capture devices 100a-100n may be implemented as stationary cameras. The owner of the building 230a and the owner of the building 230b may be data providers for the system 50 (e.g., capture video of the event 220).

The capture device 100a may capture one field of view (e.g., the line 202a and the line 204a) from the viewpoint of the vehicle 200a. The capture device 100b may capture one field of view (e.g., the line 202b and the line 204b) from the viewpoint of the vehicle 200b. The capture device 100c may capture one field of view (e.g., the line 202c and the line 204c) from the viewpoint of the vehicle 200c. The capture device 100d may capture one field of view (e.g., the line 202d and the line 204d) from the viewpoint of the vehicle 200d. The capture device 100e may capture one field of view (e.g., the line 202e and the line 204e) from the viewpoint of the building 230a. The capture device 100f may capture one field of view (e.g., the line 202f and the line 204f) from the viewpoint of the building 230b. The various fields of view may provide video metadata and/or video recordings from different viewpoints.

The database 130 may receive metadata corresponding to the video data captured by the capture devices 100a-100f of the event 220. For example, the database 130 may receive six different user IDs of the data provider users. The database 130 may receive six slightly different GPS coordinates corresponding to the different locations of the cameras 100a-100f. In some embodiments, the database 130 may receive the same timestamp from each of the capture device 100a-100f. In some embodiments, the timestamp may be slightly different because the video files may be stored as video clips having a pre-determined time (e.g., 2 minute video clips) and the start and end time of each video clip may depend on when the cameras 100a-100f were booted up (e.g., when the vehicles 200a-200d were started). In some embodiments, system 50 may be configured to synchronize the time on each of the capture devices 100a-100n (e.g., to ensure the timestamp for a start and end time of each video clip matches between the capture devices 100a-100n). The database 130 may receive up to 6 different direction metadata information. In some embodiments, multiple clips 180a-180n with metadata information 182a-182n and/or object information 186a-186n for each object detected may be received (e.g., depending on the length of the event 220).

The video metadata from each of the cameras 100a-100f may be uploaded to the database 130. Since two vehicles (e.g., 250a-250b) are in the car accident, the database 130 may associate at least the objects 184a-184b with two license plates and/or vehicle type entries (e.g., 184a for the vehicle 250a and 184b for the vehicle 250b). Depending on the fields of view, some of the cameras 100a-100n may not capture both license plates and/or vehicles (e.g., the field of view of the camera 100b may capture the license plate of the vehicle 250a but not capture the license plate of the vehicle 250b). License plate entries may be made for the data provider vehicles 200a-200d (e.g., the capture device 100a may capture the license plate of the vehicle 200d). Additional license plate and/or vehicle entries may be made for other objects and/or vehicles captured (e.g., the capture device 100b may capture the colliding vehicles 250a-250b as well as the vehicle 200a).

The metadata 158 may be extracted from the video data captured by each of the capture devices 100a-100n. The video metadata 158 may be associated with the video clips 180a-180n corresponding to each field of view captured. In one example, the video clip 180a may correspond to the metadata associated with the video data captured by the capture device 100a. In another example, the video clip 180b may correspond to the metadata associated with the video data generated by the capture device 100b. In one example, the object 184a may correspond with the vehicle 250a captured by the capture device 100a and associated with the video clip 180a and the object 184b may correspond to the vehicle 250b captured by the capture device 100a and associated with the video clip 180a. In another example, the object 184a may correspond with the vehicle 250b captured by the capture device 100b and associated with the video clip 180b and the object 184b may correspond to the vehicle 250a captured by the capture device 100b and associated with the video clip 180b. The subscriber users may use the subscriber devices 110a-110n (e.g., via the app and/or web interface 114a) to search the metadata 184a-184n to view any videos that may have been captured of the event 220.

In some embodiments, the capture devices 100a-100n may implement Wi-Fi communication (e.g., to transmit the metadata and/or the recorded videos to the network 60). Implementing the Bluetooth communication to transfer data between the capture devices 100a-100n and the user communication devices 112a-112n may be useful in the vehicles (e.g., 200a-200d) to forward metadata and/or recorded videos to the network 60. In some embodiments, the capture devices 100a-100n may implement Wi-Fi functionality to connect to access points that may be fixed (e.g., Wi-Fi hotspots, home networks, business networks, etc.). For example, if someone had a storefront or house that overlooked the intersection (or any field of view where license plate recognition and/or other type of roadway metadata extraction could be performed on passing vehicles), the cameras 100a-100n could be placed to face out a window of a home and/or business (e.g., similar to a consumer IP camera). Connecting the capture devices 100a-100n to a Wi-Fi access point may enable the cameras 100a-100n to operate like a consumer IP Camera but additionally provide the video clip metadata 180a-180n (e.g., by receiving payments from the system 50 in exchange for providing the video metadata, the cost of a security camera for the business may be subsidized). Similarly, a business operating a fleet of vehicles (e.g., taxi drivers, delivery drivers, drivers of a car-sharing company, etc.) may install the capture devices 100a-100n in an existing fleet of vehicles and make a small profit over time by receiving payments from the system 50 by being a data provider (and use the video data like an ordinary dash camera for post mortem analysis of any crash involving a vehicle from the fleet).

If the subscriber user (e.g., the driver of the vehicle 250a, the driver of the vehicle 250b, an insurance company representing the drivers of the vehicles 250a-250b, and/or another user) searches the video clips 180a-180n in the database 130, a list of videos of the event 220 may be provided. If the subscriber user decides to request a video recording of the event, the server 120 may send a request to one or more of the capture devices 100a-100n (or the associated user communication device 112a-112n). The circuits 102a-102n may set a flag for the requested video in response to the request from the server 120. Setting the flag for the requested video may be used to preserve the requested video recording (e.g., prevent the video from being over-written). The capture devices 100a-100n and/or the user communication devices 112a-112n may upload the video data to the server 120. In some embodiments, the associated video may be preserved for all data points that may be returned as search results of a search query. For example, the server 120 may send the request to one or more of the capture devices 100a-100n (or the associated user communication device 112a-112n) to preserve the video data associated with the search results so that the video data may be preserved in order to be made available if the subscriber user later decides to request the video data. The flag may be set for a pre-determined amount of time before the video is unflagged (e.g., to prevent storage of video data indefinitely).

In some embodiments, the video recording may be flagged for preservation in response to a request from a subscriber user. In some embodiments, the system 50 may send a request to all capture devices 100a-100n that have video data from a particular time and a particular location. For example, an event may occur that may be considered important (e.g., a VIP such as a celebrity is at a location, a crime has been committed, a gunshot was reported, a blast was reported, etc.). When a particular event has been determined to have occurred, all cameras 100a-100n in the vicinity may start preserving data. In one example, if the VIP event is happening presently, the video data being currently recorded may be preserved. In another example, the video data currently residing in the memory of the capture devices 100a-100n associated with the time of the event may be preserved (e.g., a crime is reported after the event occurs and later an interrupt request is provided to the capture devices 100a-100n to preserve potential evidence).

In some embodiments, the video metadata 182a-182b and/or the object information 186a-186n associated with each of the objects 184a-184n may enable the event 220 to be re-created, even if the video data is no longer available (e.g., expired, over-written, etc.). For example, the object information 186a-186n may be used for each of the objects 184a-184n of each of the video clips 180a-180n associated with the event 220 (e.g., based on a timestamp and/or general location) to determine the absolute location of each of the vehicles 200a-200d and/or the colliding vehicles 250a-250b. Even if the video data is no longer available, the object information 186a-186bn may provide detailed absolute coordinate information over a sequence of time. For example, the detailed absolute coordinate information may be used to indicate where each of the colliding vehicles 250a-250b were before, during and after the event 220. For example, by analyzing the absolute location coordinates over a sequence of time, the speed, direction of travel, the timing of the event 220 and/or other information about the colliding vehicles 250a-250b may be determined to re-create the event 220.

Figure 5:
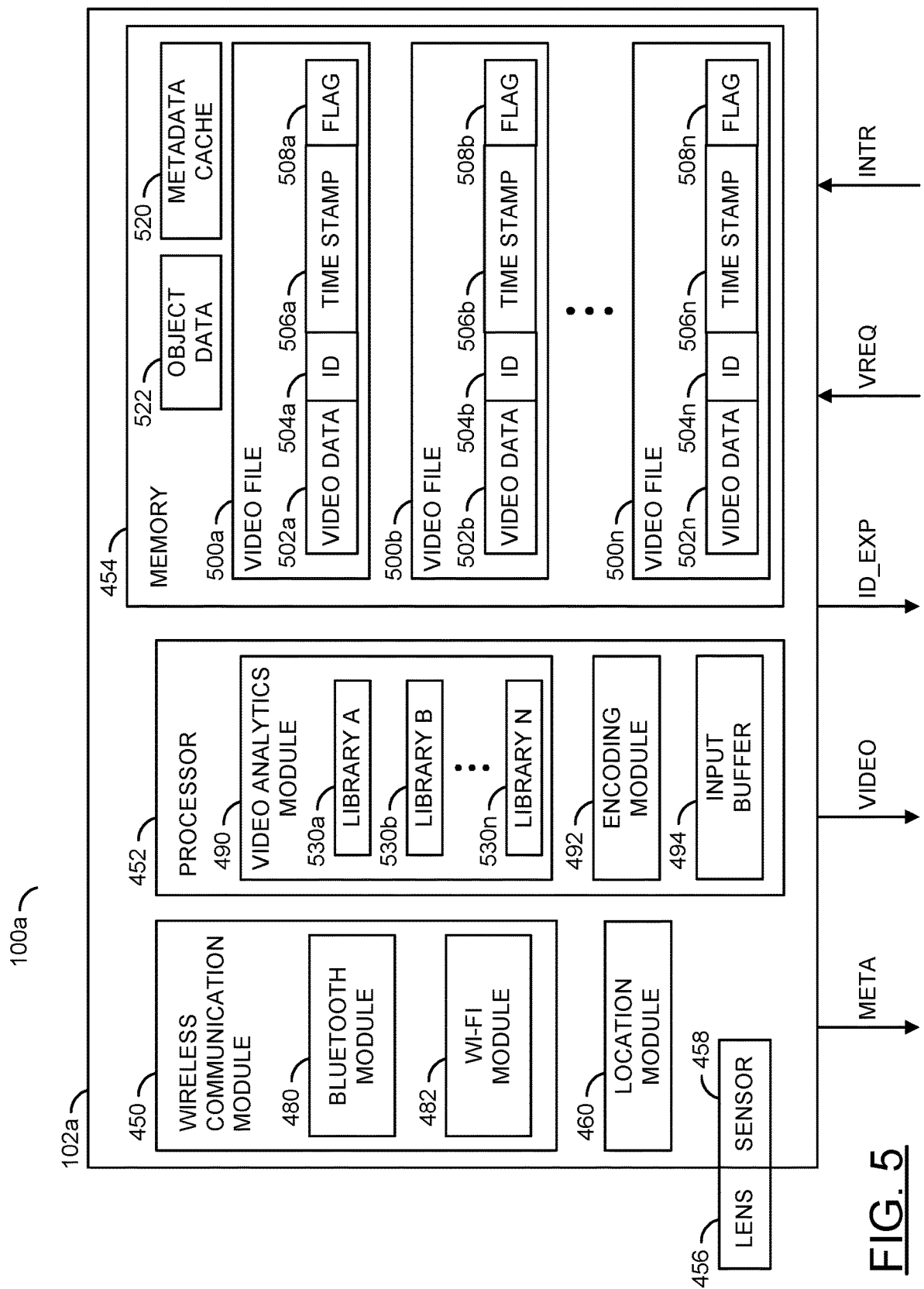
FIG. 5 is a diagram illustrating example components of a capture device.

Referring to FIG. 5, a block diagram illustrating an example implementation of the circuit 102a configured to perform the functionality of a vehicle-mounted camera 100a. The capture device 100a may be a representative example of one of the capture devices 100a-100n. The capture device 100a may comprise the circuit 102a. In some embodiments, the circuit 102a may be a main printed circuit board for the capture device 100a. In some embodiments, the circuit 102a may comprise various circuit boards, daughter boards and/or modules. For example, the circuit 102a may comprise multiple printed circuit boards connected using cables. In another example, the circuit 102a may comprise input/output slots configured to connect to drop in components (e.g., off-the-shelf components). Generally, the circuit 102a may be designed to fit a space and/or heat dissipation specification for the capture device 100a.

The circuit 102a may comprise a block (or circuit) 450, a block (or circuit) 452, a block (or circuit) 454, a block (or circuit) 456, a block (or circuit) 458 and/or a block (or circuit) 460. The block 450 may implement a wireless communication module. The block 452 may implement a processor. The block 454 may implement a memory. The block 456 may implement a lens module. The block 458 may implement a camera sensor module. The block 460 may implement a location module (e.g., a GPS/GNSS module and/or a magnetometer). The circuit 102a may comprise other components (not shown). For example, the circuit 102a may comprise a firmware, input/output ports, memory expansion slots, a battery, a power adapter (for connection to an external power supply), etc. The components of the circuit 102a may be varied according to the design criteria of a particular implementation.

The circuit 102a is shown presenting a signal (e.g., META), a signal (e.g., VIDEO) and/or a signal (e.g., ID_EXP). The circuit 102a is shown receiving a signal (e.g., VREQ) and/or a signal (e.g., INTR). The circuit 102a may present the signal META, the signal VIDEO and/or the signal ID_EXP to a corresponding one of the user communication devices 112a (e.g., a paired wireless communication device). The circuit 102a may receive the signal VREQ and/or the signal INTR from the user communication device 112a.

The wireless communication module 450 may be configured to implement one or more wireless communication protocols. The wireless communication module 450 may be configured to transmit data and/or receive data. For example, the wireless communication module 450 may enable the circuit 102a to communicate with one or more of the user communication devices 112a-112n and/or the network 60. In the example shown, the wireless communication module 450 may comprise a block (or circuit) 480 and/or a block (or circuit) 482. The block 480 may implement a Bluetooth module. The block 482 may implement a Wi-Fi module. The wireless communication module 450 may comprise other components (not shown). For example, the wireless communication module 450 may comprise a module configured to implement 3G/4G/LTE/5G communication. The implementation of the wireless communication module 450 may be varied according to the design criteria of a particular implementation.

The Bluetooth module 480 may be configured to implement Bluetooth communication. For example, the Bluetooth module 480 may be configured to pair the circuit 102a with the user communication device 112a. The Bluetooth module 480 may enable a transfer of the video data and/or the metadata from the circuit 102a to the user communication device 112a. The Bluetooth module 480 may enable a short-range and/or low-power communication.

The Wi-Fi module 482 may be configured to implement Wi-Fi communication. In some embodiments, the Wi-Fi module 482 may be configured to connect to a local and/or wide area network. In some embodiments, the Wi-Fi module 482 may be configured to create a local network and other devices (e.g., the user communication device 112a) may connect to the Wi-Fi module 482. The Wi-Fi module 482 may enable wireless communication of the video data and/or the metadata. In some embodiments, the Wi-Fi module 482 may be configured implement a mesh network with other Wi-Fi modules. For example, the Wi-Fi module 482 implemented in the capture device 100a may form a mesh network with other nearby Wi-Fi module(s) 482 in the capture devices 100b-100n. Implementing a mesh network may enable the circuits 102a-102n to communicate using an ad-hoc Wi-Fi network as vehicles move around. For example, one or more of the data provider users may have a desired connectivity to the network 60 (e.g., sufficient upload bandwidth, sufficient data quota with the service provider, an unlimited data plan, etc.). Other data provider users that do not have the desired connectivity to the network 60 may use the mesh network to utilize the connectivity to the network 60 of data provider users that do have the desired connectivity to the network 60. The mesh network may help more of the data provider users to have reliable access to the network 60.

The processor 452 may be configured to read, write and/or process data, perform calculations and/or execute computer readable instructions. The processor 452 may implement one or more processing cores to enable parallel processing. The processor 452 may be implemented using various architectures (e.g., x86/x64, ARM, etc.). In some embodiments, the processor 452 may be a Tensor processing unit configured for deep machine learning. The processor 452 may be configured to perform various types of operations (e.g., a general purpose processor). In some embodiments, the processor 452 may implement various hardware modules configured to implement specific tasks. In the example shown, the processor 452 may comprise a block (or circuit) 490, a block (or circuit) 492, and/or a block (or circuit) 494. The block 490 may comprise a video analytics module. The block 492 may comprise an encoding module. The block 494 may comprise an input buffer. The processor 452 may comprise other types of modules (not shown). For example, the processor 452 may further comprise an encryption module. The implementation of the processor 452 may be varied according to the design criteria of a particular implementation.

The video analytics module 490 may be configured to perform real-time video analytics on the captured video data. The video analytics module 490 may be configured to extract the metadata in response to the video analytics. The video analytics module 490 may be configured to scan visual data present in each video frame captured by the capture device 100a. In some embodiments, the video analytics module 490 may implement optical character recognition. In some embodiments, the video analytics module 490 may be configured to detect and/or classify objects detected in the video data. For example, the video analytics module 490 may compare features of the captured video frames to known features (e.g., templates) to identify an object captured in the video frame as a particular type of object (e.g., identify a vehicle as a particular make, model and year of a vehicle). The type of video analytics performed by the video analytics module 490 may be varied according to the design criteria of a particular implementation.

In some embodiments, the analytics performed by the video analytics module 490 may comprise determining characteristics of roadway features and/or objects. The metadata generated by the video analytic module 490 may be used as training data sets for machine learning. In one example, the capture devices 100a-100n may be implemented as dashboard cameras (e.g., dashcams) and the images captured may comprise various roadway data. The video analytics module 490 may analyze many images of various roadways and/or obstacles (e.g., curves, lane markings, curbs, street signs, traffic lights, license plate styles, road markings, pedestrians, vehicle types, vehicle makes, vehicle models, road hazards (e.g., snow, ice, flooding, chemical spills, etc.), construction barriers, etc.). The large amounts of metadata produced by the video analytics module 490 may provide many sample images and/or metadata of roadway data and/or object data. The data generated by the video analytics module 490 may be used to generate feature templates to improve detection when video analytics is performed (e.g., provide a greater data set to compare against). In an example, the metadata generated by the video analytics module 490 may be combined with data from other sensors (e.g., LIDAR, GPS and/or other sensors used to gather roadway data) for machine learning for autonomous driving.

In some embodiments, the analytics performed by the video analytics module 490 may comprise determining a distance of various detected objects from the lens 456. The video analytics module 490 may be configured to compare the sizes of objects detected in the video data with known object sizes. The video analytics module 490 may be configured to determine a region of a license plate, and compare the detected plate characters with the size of the license plate characters for the detected region (e.g., or vehicle type for vehicles such as motorcycles that have smaller plates). The video analytics module 490 may be configured to detect the corners of objects (e.g., such as the corners of a license plate) to determine a size of the detected object.

In some embodiments, the analytics performed by the video analytics module 490 may be configured to account for (e.g., normalize) objects that are at an angle to determine the size of the detected objects. For example, relationships between various portions of an object may be analyzed to determine an orientation of an object (e.g., rotated, at an angle, slanted, skewed, etc.). The video analytics module 490 may be configured to correct distortion caused by the lens 456. For example, de-warping may be performed to correct distortions caused by a wide (e.g., fisheye) lens.

The encoding module 492 may be configured to encode and/or decode the captured video data. Encoding and/or decoding the captured video may compress the video data to enable more video data to be stored in the memory 454. The encoding and/or decoding performed by the encoding module 492 may be lossless and/or lossy compression. The encoding module 492 may perform the encoding on the captured video data in real-time. For example, the encoding module 492 may implement encoding such as h.264, h.265, VP8, VP9, Daala, etc. The type of encoding implemented by the encoding module 492 may be varied according to the design criteria of a particular implementation.

The input buffer 494 may be a memory configured to provide temporary storage for newly captured video data. The video data 494 may be in the input buffer while the video analytics module 490 performs the video analysis in real time and/or the video encoding module 492 performs the encoding operations to store the video data in the memory 454. The input buffer 494 may be configured to limit the amount of spatial data used from an input video frame as input to the buffer used for video analytics. By limiting the amount of spatial data input to the working buffer the inherently limited system resources of the real time system may allocated more efficiently. The input buffer 494 may temporarily store a subset of the captured video frame.

The memory 454 may be configured to store data. The memory 454 may comprise a solid state memory (e.g., NAND flash). In some embodiments, the memory 454 may comprise memory onboard the circuit 102a and/or external memory (e.g., a microSD card). The memory 454 may comprise blocks (or circuits) 500a-500n, a block (or circuit) 520 and/or a block (or circuit) 522. The blocks 500a-500n may each implement storage of a video file. The block 520 may implement a metadata cache. The block 522 may implement object data. The memory 454 may comprise other data (not shown). For example, the memory 454 may further comprise a firmware. The type of memory implemented by, the data arrangement of and/or the data stored by the memory 454 may be varied according to the design criteria of a particular implementation.

The video files 500a-500n may comprise the captured and/or recorded video. Each of the video files 500a-500n may comprise storage locations for a video clip (e.g., a discrete video recording and/or a video segment). In some embodiments, the video files 500a-500n may represent video clips having a same length (e.g., 2 minute video clips). In some embodiments, the video files 500a-500n may represent video clips (or segments) having different lengths (e.g., based on a storage size of each video file). Each video file storage location 500a-500n may comprise a corresponding one of blocks (or circuits) 502a-502n, blocks (or circuits) 504a-504n, blocks (or circuits) 506a-506n and/or blocks (or circuits) 508a-508n. The blocks 502a-502n may comprise the video data. The blocks 504a-504n may comprise the video ID. The blocks 506a-506n may comprise a time stamp. The blocks 508a-508n may comprise a flag. The video files 500a-500n may comprise other data (not shown). The type of data stored and/or the arrangement of data stored in the video files 500a-500n may be varied according to the design criteria of a particular implementation.

The video data 502a-502n may comprise the viewable captured video. The video data 502a-502n may be the data transmitted in response to a request from the subscriber user. The video data 502a-502n may be encoded by the encoding module 492 before the video files 500a-500n are created.

The video ID 504a-504n may comprise an identification for the video files 500a-500n. The video ID 504a-504n may be implemented as a data string comprising alphanumeric characters (e.g., a hash). The video ID 504a-504n may represent a portion of the metadata associated with the video files 500a-500n. The video ID 504a-504n may be used by the database 130 to locate and/or match the metadata clips 180a-180n to a particular one of the video files 500a-500n.

The time stamp 506a-506n may comprise an indication of when the video files 500a-500n have been recorded. The time stamp 506a-506n may comprise a data string. For example, the time stamp 506a-506n may indicate a year, a month, a date, a day of the week, an hour, a minute, seconds, fractions of a second, etc. The time stamp 506a-506n may represent a portion of the metadata associated with the video files 500a-500n. The time stamp 506a-506n may be used by the processor 452 to determine which of the video files 500a-500n is the oldest. The time stamp 506a-506n may be used by the processor 452 to determine an order that the video files 500a-500n were recorded, based on time.

The flags 508a-508n may be used to indicate whether the video file 500a-500n may be overwritten. The flags 508a-508n may represent one or more preservation bits for the video files 500a-500n. In one example, when one of the flags 508a-508n is set (e.g., to indicate the file should be preserved) by the capture devices 100a-100n, the corresponding one of the video files 500a-500n may not be overwritten. In another example, when one of the flags 508a-508n is not set (e.g., to indicate the file should not be preserved), the corresponding one of the video files 500a-500n may be made available to be overwritten (e.g., by a new video file).

In some embodiments, the flags 508a-508n may be implemented using a single bit. In some embodiments, multiple bits may be used for each of the flags 508a-508n. In one example, when using multiple bits for the flags 508a-508n, a condition for determining how long to preserve the video files 500a-500n may be set (e.g., an amount of time, a particular date, an occurrence of an event, etc.). In another example, when multiple bits are used for the flags 508a-508n, different lengths of time to preserve the video files 500a-500n may be set based on a reason for preserving the video files 500a-500n (e.g., preserve video files for 3 days if a video is the result of a subscriber search, preserve video files indefinitely if the video is evidence, preserve video files one week if an event was captured, etc.). In yet another example, when multiple bits are used for the flags 508a-508n, the bits may represent an amount of time to preserve the video files 500a-500n based on a value of a subscriber user and/or subscription tier (e.g., a subscriber user paying a higher fee may result in a value of 5 being stored for the flags 508a-508n to indicate preservation for 5 days, a subscriber user paying a lower fee may result in a value of 2 being stored for the flags 508a-508n to indicate preservation for 2 days, etc.). Generally, a user that does not have a subscription to access the database 130 (e.g., a user that is not a subscription user) may not receive search results from the database 130 (e.g., the database 130 may not generate search results and/or may not allow a search query if a user is not one of the subscriber users). In some embodiments, the processor 452 may use the flags 508a-508n to decide when to overwrite the video files 500a-500n (e.g., compare the creation date of the video files 500a-500n plus the flag value to the current date). The implementation of the flags 508a-508n may be varied according to the design criteria of a particular implementation.

The metadata cache 520 may be configured to store the metadata extracted by the video analytics module 490 and/or any other metadata corresponding to the captured video data 502a-502n. The metadata cache 520 may provide temporary storage. Generally, the metadata may not be stored long-term by the memory 454. For example, the metadata may be deleted after being successfully stored by the database 130 as the metadata 158. Temporarily storing the metadata may increase an amount of the memory 454 available for storing the video files 500a-500n. Some of the metadata may be stored long-term by the memory 454 (e.g., the video ID 504a-504n and/or the time stamp 506a-506n). The metadata cache 520 may provide storage for the metadata until the metadata is uploaded to the database 130. In some embodiments, when the database 130 communicates that the metadata for a particular one of the video files 500a-500n has been successfully stored, the metadata cache 520 may purge the corresponding metadata. Generally, the metadata files may be created in the metadata cache 520, filled with metadata, compressed, encrypted, transferred to the user communication devices 112a-112n, and then deleted from the metadata cache 520 (e.g., after a confirmation of successful upload to the database 130 has been received).

The object data 522 may comprise information about known objects. The information about known objects may be used to identify, detect, and/or compare objects in the video data 502a-502n. In one example, the object data 522 may comprise a database of vehicle makes, models, years, colors, sizes, dimensions, etc. In another example, the object data 522 may comprise regional information about license plates (e.g., shape, size, font, character size, design for each state/country, etc.). In yet another example, the object data 522 may comprise information about signs, billboards, buildings, cell towers, and/or other objects (trees, lane dividers, pylons, pedestrians, animals, etc.).

The video analytics module 490 may be configured to compare the objects detected in the video data 502a-502n with the known object data 522. The comparison may be used to determine the distance of the detected object from the capture device 100a. For example, if the detected object is a 2018 Ford F-150, the known dimensions of a 2018 Ford F-150 in the stored in the object data 522 may be compared with the dimensions of the detected 2018 Ford F-150. Based on a size comparison of the known and detected dimensions, the distance of the 2018 Ford F-150 from the capture device 100a may be determined. In another example, if a license plate is detected as a Michigan license plate, the size of the alphanumeric plate characters may be compared to the known size of characters for Michigan license plates to determine the distance of the license plate from the capture device 100a. The types of objects and/or information about objects stored in the object data 522 may be varied according to the design criteria of a particular implementation.

In some embodiments, the object detection may be performed in real-time and the distance calculations for the detected objects may be performed later. In an example, the object data 522 may not have the capacity to store known characteristics of all objects. For example, if the dimensions of the 2018 Ford F-150 are not currently stored in the known object data 522, the size comparison may be delayed. In an example, the capture device 100a may send a request to the user communication device 112a to retrieve dimensions for the 2018 Ford F-150. When the information becomes available to the capture device 100a, the size comparison may be performed.

The video analytics module 490 may comprise a number of blocks (or circuits) 530a-530n. The blocks 530a-530n may implement a library. The libraries 530a-530n may be configured to recognize various types of objects. Each of the libraries 530a-530n may be specialized and/or customized for detecting specific types of objects. In one example, the library 530a may be configured to detect and/or identify vehicles in the captured video frames. In another example, the library 530b may be configured to recognize street signs. In yet another example, the library 530c may be configured to detect pedestrians. The number, type and/or specialization for each of the libraries 530a-530n may be varied according to the design criteria of a particular implementation.

In some embodiments, the libraries 530a-530n may be third party modules for recognizing objects that may be divided into discrete tasks. The library modules 530a-530n may be implemented as part of the video analytics module 490. For example, different library modules 530a-530n may be specialized to provide different types of object detection. In some embodiments, the different library modules 530a-530n may be provided by different vendors (e.g., each vendor may specialize in a particular area of object detection).

In an example, the one or more of the libraries 530a-530n may operate on different parts of the same input buffer 494. The video analysis performed by the video analytics module 490 may run sequentially or in parallel depending on the underlying hardware architecture. In an example, the library 530d may be configured to perform the video analysis searching for vehicle attributes (e.g., license plates, car make, model, color, type, brand, etc.) and may operate over an area of the input buffer 494 above the hood and below the sky since vehicles are on the roadway. In another example, the library 530b configured to detect roadway information (e.g., roadway street signs, street light signals, etc.) may operate on a different section of the input frame buffer 494 to include more sky area since many signs hang overhead.

The lens module 456 may be configured to focus light onto the camera sensor 458. The lens module 456 may comprise mechanisms for zooming, panning, tilting, focusing, adjusting a DC iris, etc. The camera sensor 458 may be configured to convert the light from the lens module 456 into images. The images generated by the camera sensor 458 may be the video frames of the captured video data. The video frames generated by the camera sensor 458 may be processed by the processor 452 to generate the captured video.

The location module 460 may be configured to calculate location coordinates. In an example, the location module 460 may be a GPS/GNSS module. The location module 460 may be configured to communicate with the GPS/GNSS satellites, receive data from the GPS/GNSS satellites and/or perform calculations on the data from the GPS/GNSS satellites to determine the current location of the capture device 100a. The location module 460 may comprise a magnetometer in order to calculate a direction of travel and/or a direction the capture device 100a is facing. The direction of travel and/or direction the capture device 100a is facing may be a numerical representation of a direction and/or angle. In some embodiments, if the magnetometer is not available the previous GPS coordinates may be used to infer the direction of travel.

The signal META may comprise the data that may be stored by the database 130 as the metadata 158 extracted from the captured video by the processor 452. The signal META may comprise the metadata stored by the metadata cache 520. The signal META may be generated by the metadata cache 520 and transmitted to the database 130 for storage and/or indexing. The wireless communication module 450 may implement a short-range, inexpensive and/or low power consumption communications protocol (e.g., Bluetooth) to communicate with the user communication device 112a. The user communication device 112a may forward the signal META from the circuit 102a to the network 60. The network 60 may transmit the signal META to the server 120 for storage in the database 130.

The signal VIDEO may comprise the video data 502a-502n recorded by the capture device 100a and/or the circuit 102a. The signal VIDEO may be generated by the wireless communication module 450 and transmitted to the server 120 and/or one of the subscriber devices 110a-110n. The wireless communication module 450 may implement a short-range, inexpensive and/or low power consumption communications protocol (e.g., Bluetooth) to communicate with the user communication device 112a. The user communication device 112a may forward the recorded video to the network 60.

Transmitting the video data 502a-502n to the subscriber users may be a low-priority data transfer. One of the flags 508a-508n corresponding to the video file 500a-500n being transferred may be set to ensure the video file 500a-500n is preserved at least until the data transfer is completed. Generally, the transfer of the signal VIDEO may not be initiated by the circuit 102a until the subscriber user requests the video. For example, if a user does not request a recorded video, the video file may eventually be overwritten by the capture device 100a. Since the recorded video is not transmitted until requested, unnecessary transfer and/or storage of data may be reduced.

The signal ID_EXP may comprise a notification (e.g., a flag) indicating that one of the video files 500a-500n stored by the memory 454 has expired (e.g., has been overwritten). The signal ID_EXP may comprise the video ID 504a-504n corresponding to the video files 500a-500n that has been overwritten. The capture device 100a may implement loop recording and, over time, may overwrite the video files 500a-500n (e.g., the oldest video data). The signal ID_EXP may be configured to notify the server 120 and/or the database 130 that one or more of the video files 500a-500n are no longer available. For example, the video ID 504a-504n may match the video file ID 182c stored as part of the metadata 158 to create a relationship between the video files 500a-500n stored in the memory 454 and the metadata 158 stored in the database 130. The signal ID_EXP may be generated by the wireless communication module 450 and transmitted to the database 130 for storage and/or indexing. For example, information transmitted by the signal ID_EXP may be stored as the expiration status flag metadata 182b in the clips 180a-180n (e.g., the metadata 158 may be updated in response to the notification to indicate that the portion of the video data corresponding to the signal ID_EXP may no longer be available). When the signal ID_EXP is received and when the corresponding video is requested, the server 120 may provide metadata only instead of video in response to the request from the subscriber user.

The metadata 158 stored in the database 130 may comprise the video ID 504a-504n of the corresponding video 500a-500n and/or store data used to derive the video ID 504a-504n and/or the capture device 100a-100n that stores the corresponding video file 500a-500n. For example, the metadata 158 may store the time stamp 506a-506n as the time 182a (e.g., when the first entry is inserted to the video files 500a-500n), a user ID as the camera ID 182n (e.g., to identify the user communication device 112a-112n corresponding to the capture device 100a-100n that captured the corresponding video files 500a-500n), a sequence number (e.g., a sequential number incrementing from 0 to 1029 and then looping back to 0). In one example, the metadata 158 may be a filed named "DATA-2017-03-07-14-30-00-00-01-0099.txt" (e.g., corresponding to the first timestamp and/or GPS entry deposited Mar. 7, 2017 at 2:30:00 PM by Driver ID #0001 and a sequence number of video file 0099). The contents of the file for the video clip metadata 180a-180n may comprise a sequence of lines of data. Each line of data may comprise at least a time stamp entry, a latitude and/or a longitude (e.g., 2017-03-07 14:30:00, 37.804440, −122.422874, 2017-03-07 14:30:20, 37.804440, −122.422874, etc.). Some lines of data may comprise a video file name and/or status of the video file (e.g., FILE DELETED: VIDEO-2017-03-06-14-30-00-0001-0022.MP4, FILE CREATED: VIDEO-2017-03-07-14-31-40-0001-0052.MP4, etc.). The video file names of the metadata 180a-180n may correspond with the names of the video files 500a-500n. The format of the metadata clips 180a-180n stored in the database 130 may be varied according to the design criteria of a particular implementation.

The signal VREQ may comprise a request to the capture device 100a configured to initiate an upload of one of the video files 500a-500n stored in the memory 454. For example, the transfer of the signal VIDEO may be initiated in response to the processor 452 receiving the signal VREQ. The signal VREQ may be generated by one of the subscriber devices 110a-110n. The signal VREQ may be generated in response to the subscriber user requesting a particular recorded video data clip. For example, the subscriber user may perform a search of the database 130 and receive a list of results based on the stored metadata. If the subscriber user does not request a video file (e.g., no signal VREQ received), the wireless communication module 450 may not upload video data. If the subscriber user does request one of the stored video files 500a-500n, the subscriber device (e.g., 110a) may generate the signal VREQ. The server 120 may determine which of the capture devices 100a-100n has the requested video file 500a-500n (e.g., based on the video list 172a and/or the device ID 182n of the clip metadata 180a-180n). The server 120 may transmit the signal VREQ to the network 60, to the corresponding user communication device (e.g., 112a) and then to the corresponding capture device 100a. In response to the signal VREQ, the server 120 may make the requested video file available to the subscriber user.

The signal INTR may comprise an interrupt request for the capture device 100a. The interrupt request communicated by the signal INTR may be configured to provide various instructions to the processor 452. In one example, the interrupt request may be used to initiate a live streaming mode for the capture device 100a. In a live streaming mode, the signal VIDEO may be streamed as a high priority data transfer (e.g., the capture device 100a may communicate with the server 120 without using the user communication device 112a). In another example, the interrupt request may be used to initiate video storage mode (e.g., record video as a loop recording). In still another example, the signal INTR may be transmitted to stop the capture device 100a from recording. In yet another example, the signal INTR may be transmitted to check if one or more of the video files 500a-500n are available and/or unavailable (e.g., check if information stored in the database 130 is consistent). Generally, the signal INTR is implemented to provide the processor 452 with a particular instruction to execute at a particular time (e.g., to cause the capture device 100a to change behavior on demand). The type of instructions transmitted as interrupt requests by the signal INTR may be varied according to the design criteria of a particular implementation.

The signal INTR may be transmitted to indicate that a particular one of the stored video files 500a-500n should be preserved. For example, one of the video files 500a-500n should be preserved when the video recording is an output result of a search request by one of the subscriber users. The database 130 may be configured to generate search results for a subscriber user based on the metadata 158 (e.g., in response to a search query submitted using the app 114a). The search results determined by the database 130 may correspond to one or more of the video files 500a-500n (e.g., based on the video IDs stored as part of the metadata 158). The database 130 may generate the signal INTR to preserve the video files 500a-500n that correspond to the search results. The database 130 may provide the signal INTR to one or more of the capture devices 100a-100n (e.g., by communicating with a corresponding one of the user communication devices 112a-112n) based on the search results (e.g., the metadata 158 may indicate which of the capture devices 100a-100n captured a particular video file and/or which of the user communication devices 112a-112n is associated with the capture devices 100a-100n that captured the particular video file).

The signal INTR may comprise one or more of the video IDs 504a-504n. The processor 452 may match the data in the signal INTR to the video IDs 504a-504n. The processor 452 may set the flags 508a-508n corresponding to the video files 500a-500n with the matching video IDs 504a-504n. The video files 500a-500n may be preserved in response to the signal INTR.

The processor 452 may be configured to receive captured images from the sensor 458, perform video analytics using the video analytics module 490 to extract the metadata, encode the captured video using the encoding module 492 and/or store the encoded video data as the video files 500a-500n in the memory 454. The video files 500a-500n may be created in the memory 454 to implement a loop recording. The loop recording implementation may create new video files 500a-500n in available (e.g., free) space in the memory 454. For example, if the memory 454 has free space available, the newest encoded video data may be stored in the free space of the memory 454 (e.g., previously stored data may not be overwritten). When the memory 454 is filled (e.g., stored to capacity), the memory 454 may overwrite previously stored data with the new data.

Generally, a loop recording default storage implementation may overwrite the oldest data (e.g., the video files 500a-500n having the oldest/lowest time stamp 506a-506n) first. For example, if the video file 500a is written into the memory 454 first and the video file 500i is written into the last of the available free space (e.g., video files 500a-500i take up all the available free space), then the next video file 500j may overwrite the video file 500a (e.g., and subsequently the video files 500b, 500c, etc. may be overwritten by new video data). The loop recording default storage implementation may enable the video files 500a-500n to be stored in the memory 454 as portions of a continuous recording (e.g., video may be continuously captured as the vehicle 200 is being driven and the video files 500a-500n may be the continuous video segmented into shorter clips).

The flags 508a-508n may be configured to override the loop recording default storage implementation. The flags 508a-508n may indicate that one or more of the video files 500a-500n should be preserved even if the video file would be the next (e.g., oldest) file to be overwritten in the loop recording default storage implementation. For example, if the video file 500a is written into the memory 454 first and the flag 508a is set, the video file 500b is written into the memory 454 second and the flag 508b is not set and the video file 500i is written into the last of the available free space (e.g., video files 500a-500i take up all the available free space), then the next video file 500j may overwrite the video file 500b instead of the video file 500a (e.g., and subsequently the video files 500c, 500d, etc. may be overwritten unless a respective one of the flags 508a-508n has been set). Generally, the processor 452 may store the next portion of the captured video (e.g., the newest created video file 500a-500n) in an empty storage location of the memory 454 when free space is available (e.g., one or more storage locations of the memory 454 are empty), and in one of the storage locations of the memory 454 that stores the oldest portion of the captured video (e.g., overwrite one of the video files 500a-500n having the oldest time stamp 506a-506n) that does not have the flag 508a-508n set if there are no empty storage locations in the memory 454.

The flags 508a-508n may be modified to enable the video files 500a-500n to be preserved in case that one of the subscriber users decides to request one of the video files 500a-500n. The flags 508a-508n may be implemented to strike a balance between preserving the video files 500a-500n that may be potentially requested, and ensuring that the memory 454 may have space available for recording new video files 500a-500n.

In some embodiments, the flags 508a-508n may be set to preserve a corresponding one of the video files 500a-500n when the database 130 selects the corresponding one of the video clips 180a-180n as the search result(s) in response to a search query from the subscriber users (e.g., sent using the app 114a on the subscriber devices 110a-110n). For example, from the search results of the query, the database 130 may identify the video ID(s) and/or the ID of the capture device(s) 100a-100n for the video clips 180a-180n based on the metadata 158. The database 130 may transmit the signal INTR to the capture device(s) 100a-100n corresponding to the ID of the capture device stored in the metadata 158. The signal INTR may identify the video IDs 504a-504n corresponding to the search result. When the signal INTR is received by the corresponding one of the circuits 102a-102n, the processor 452 may match the video IDs 504a-504n with the video files 500a-500n stored in the memory 454 and set (e.g., modify) the corresponding one of the flags 508a-508n to preserve the video. The flags 508a-508n may be set to preserve the video files 500a-500n when the metadata 158 corresponds to the search result determined by the database 130 (e.g., a request for the video files 500a-500n may not be needed for preservation). By preserving the video files 500a-500n in response to a match to a search query by the subscriber user, the system 50 may preserve the video files 500a-500n in the event that the subscriber user later decides to request the video file (e.g., the corresponding video file 500a-500n may be available when the signal VREQ is received). In some embodiments, the preserved video files 500a-500n may not be requested and to prevent any unnecessary use of data (e.g., data usage limits imposed by internet and/or cellular communication providers) the signal VIDEO may not be uploaded until formally requested by the subscriber user. The video files 500a-500n may be requested by the subscriber users using the app 114a.

In some embodiments, the flags 508a-508n may be set to preserve a corresponding one of the video files 500a-500n when an event has been determined to have occurred within a range of the capture devices 100a-100n. When an event has been determined to occur (e.g., a pre-scheduled notification to the system 50, a notification from police, a notification from news reporters, notifications from insurance investigators, etc.), the location and/or a time may be presented to the database 130 (e.g., similar to a search query from the subscriber users). In an example, when the event is pre-scheduled, the processor 452 may store the recorded video files 500a-500n that correspond to the event with the flags 508a-508n set to preserve. In another example, when the event is determined after the event has occurred, the database 130 may search the metadata 158 to determine the clips 180a-180n that match the event (e.g., a location, a time, a person of interest, a vehicle of interest, etc.). When the clips 180a-180n that match the event are found, the database 130 may find the video ID and/or the ID of the capture devices 100a-100n that potentially captured the event. The signal INTR may be sent to the capture devices 100a-100n that potentially captured the event, and the flags 508a-508n may be modified (e.g., set) for the video files 500a-500n that match the video IDs 504a-504n of the signal INTR. The flags 508a-508n may be set to preserve the video files 500a-500n when the metadata 158 corresponds to the event, even if the video has not been requested. By preserving the video files 500a-500n in response to a match of the event, the system 50 may preserve the video files 500a-500n in case that the video files 500a-500n are requested later.

Generally, the signal INTR may be sent to the capture devices 100a-100n to preserve the video files 500a-500n that have been captured within a range of the event by modifying the flags 508a-508n. In some embodiments, the range of the event may correspond to location coordinates and/or a time. When an event occurs, a notification may be sent (e.g., the signal INTR) to all capture devices 100a-100n storing video files 500a-500n with GPS tags (e.g., the location 186b) within the bounds of the locality where the event occurred. In one example, the event may be a person of interest (e.g., a wanted criminal, a missing person, a celebrity, etc.). In another example, the event may be a crime (e.g., a stolen vehicle, a shooting, an explosion, etc.). In yet another example, the event may be a natural phenomenon (e.g., an eclipse, extreme weather such as a hurricane, flooding, lightning, etc.). In still another example, the event may be a something known in advance (e.g., a parade, a ceremony, a celebration, a sports competition, etc.) and/or something not known ahead of time (e.g., an accident, an incident, a calamity, a catastrophe, a mishap, a phenomenon, etc.).

In some embodiments, the event may be conditions used for machine learning for autonomous driving (e.g., deep learning). For example, to provide training data for machine learning, particular situations, environments and/or circumstances may need to be analyzed. The processor 452 may be configured to identify particular situations, environments and/or circumstances. For example, if more training data is requested for blizzard (or flooding, or hail) conditions, the event may be when there is a blizzard (or flood, or hail) outside. In another example, if more training data is requested for identifying a type of animal, the event may be when an animal is detected. In yet another example, if more training data is requested for particular types of roadways, the event may be when pre-determined road conditions are detected. The conditions for an event may be varied according to the design criteria of a particular implementation.

When the flags 508a-508n are modified to preserve the video files 500a-500n, the video files 500a-500n may be preserved for a pre-determined amount of time. For example, when the flags 500a-500n are implemented as a single bit, the single bit may represent the pre-determined amount of time (e.g., one week). In another example, when the flags 500a-500n are implemented as multiple bits, the multiple bits may represent an amount of time to preserve the video (e.g., the bits may be encoded to represent time). Limiting the amount of time that the video files 500a-500n may be preserved may ensure that memory space is available for recording new video data (e.g., if too many videos are preserved, new videos may not be recorded). Limiting the amount of time that the video files 500a-500n may be preserved may prevent against malicious attacks and/or spam bots (e.g., prevent attacks that request all videos to prevent new data from being recorded).

In some embodiments, the pre-determined amount of time for preserving the video files 500a-500n may be configured to comply with local legislation. For example, privacy laws may limit data retention. In some embodiments, the processor 452 may determine a location of the capture device 100 and adjust the length of time for preservation based on the legislation of the region. The pre-determined amount of time for preserving the video files 500a-500n may be configured to be updated. For example, as legislation is adjusted, introduced and/or repealed and/or new court decisions are provided, the pre-determined amount of time may be updated to comply with the latest legislation. The pre-determined amount of time may be varied according to the design criteria of a particular implementation. In some embodiments, the video files 500a-500n and/or the metadata 158 may be purged to comply with the law. In some embodiments, the video files 500a-500n may have a default amount of time set to purge the data from the memory 454. The default amount of time to purge the data may be selected arbitrarily and/or based on the design criteria of a particular implementation.

In some embodiments, the signal INTR to preserve one or more of the video files 500a-500n may be received by the user communication device 112a-112n of the driver when the driver is not operating the vehicle (e.g., the capture device 100a-100n may not be powered on and/or communicating). The interrupt signal INTR may be queued by the user communication device 112a-112n (e.g., stored in memory) and transmitted to the capture device 100a-100n when the two units (e.g., the capture device 100a-100n and/or the user communication device 112a-112n) are both powered up and in proximity of each other. For example, there may be a delay between the database 130 sending the interrupt signal INTR and the capture devices 100a-100n receiving the information to preserve the video files 500a-500n. Generally, the capture device 100a-100n may not be in operation without a paired user communication device 112a-112n companion and data may not be overwritten.

In some embodiments, the system 50 may be implemented to aid in one or more of asset recovery (e.g., locating an asset with a large number of GPS data points from the metadata 158), roadway investigation (e.g., video evidence for post mortem analysis of roadway events), motor vehicle theft (e.g., real time location of stolen vehicles), locating a person of interest and/or providing roadway video for deep learning and autonomous driving training.

In an example, when locating a person of interest, a person may be located based on a large number of GPS data points (e.g., the metadata 158) corresponding to the vehicle of the person of interest (e.g., often individuals are within 1000 feet of the vehicle the individual drives). In an example of providing roadway video, self-driving car developers train machine learning techniques (e.g., for deep learning) by collecting video and/or sensor streams of various scenarios and then annotate the streams (e.g., manually and/or automatically outlining and labeling various objects in each frame). In another example of providing roadway video data, an event recorded in the video files 500a-500n may comprise a particular road and/or weather type (e.g., the event may be defined as a hail storm that occurs within city boundaries, approaching a traffic signal during night, etc.). In some embodiments, the video analytics module 490 may have the ability to distinguish objects and the database 130 may be searched for video streams with particular characteristics (e.g., the hail storm). The hail storm may only last a few minutes, but assuming a large number of drivers are collecting data during the hail storm event, there may be a significant number of video streams available for download that match the criteria of a hail storm.

Figure 6:
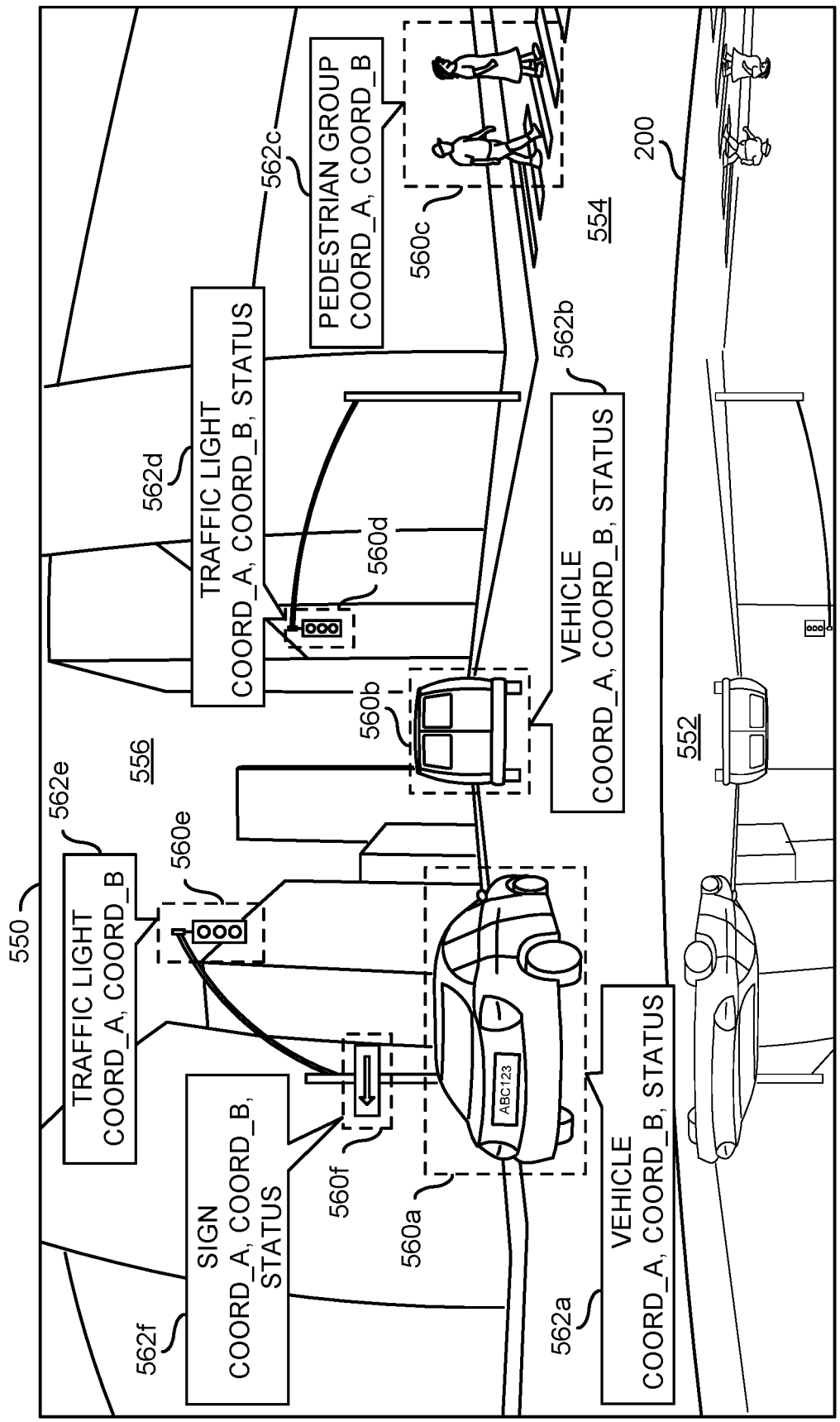
FIG. 6 is a diagram illustrating an example video frame captured by the camera showing a hood.

Referring to FIG. 6, a diagram illustrating an example video frame captured by the camera showing a hood is shown. An example video frame 550 is shown. The example video frame 550 may be an example of a video frame captured by one of the capture devices 100a-100n and/or stored as part of the video data 502a-502n. In the example shown, the video frame 550 may comprise a captured view of an urban area.

The vehicle 200 is shown in the example video frame 550. For example, one of the capture devices 100a-100n (e.g., 100a) may be a dash-mounted camera located within the vehicle 200 directed towards the windshield of the vehicle 200. The portion of the vehicle 200 shown may be a hood 552. Generally, the dashcam 100a may be mounted in a static position with respect to the vehicle 200. Since the location of the dashcam 100a may not move (or may have minimal movement) with respect to the vehicle 200, the hood 552 may be located in the same space of each captured video frame.

The example video frame 550 may comprise the hood 552, a middle section 554 and an upper section 556. The hood 552 may be located at a bottom edge of the video frame 550. Generally, the middle section 554 may comprise roadway. Generally, the upper section 556 may comprise the sky and buildings.

Various objects 560a-560f are shown in the example video frame 550. The various objects 560a-560f may be detected by the video analysis module 490. As an illustrative example, boxes are shown around the detected/recognized objects 560a-560f. In the example shown, the object 560a may be a vehicle, the object 560b may be a vehicle (e.g., a utility van), the object 560c may be a group of pedestrians, the objects 560d-560e may be stop lights, and the object 560f may be a road sign (e.g., a one-way sign). Other objects may be detected such as curbs, street markings, buildings, billboards, lampposts, sidewalks, lane markers, etc. The number and/or type of objects detected by the video analysis module 490 may be varied according to the design criteria of a particular implementation.

Status captions 562a-562f are shown. The status captions 562a-562f may be associated with the detected objects 560a-560f. The status captions 562a-562f may represent some of the information that the video analysis module 490 may tag for the detected objects 560a-560f. In the example shown, the status caption 562a may indicate that the object 560a has been identified as a vehicle, is located at a particular coordinate in the video frame 550 (e.g., an X coordinate and a Y coordinate location) and/or status information about the detected object 560a may be stored (e.g., make/model of vehicle, whether the object is moving or stationary, color, size, license plate number, presence of decorations such as bumper stickers and/or truck nuts, etc.). In another example, for the detected object 560e, the object may be detected as a traffic light and the status may indicate that the light is green. In yet another example, for the detected object 560f, the object may be detected as a street sign and the status may indicate that the sign is a one-way street sign. Generally, the information in the status captions 562a-562f may correspond to the information stored in the metadata 158.

In some embodiments, the location in the status captions 562a-562f may be a GPS location. In one example, the GPS location may be acquired by the location module 460. In another example, the GPS location may be acquired from the user device 112a (e.g., the smartphone 112a may comprise a GPS module and provide the location to the camera 100a and/or the smartphone 112a may add to the metadata before uploading). In yet another example, the GPS location may be received from an OBD device of the vehicle 200 capable of determining GPS coordinates. In some embodiments, the camera 100a may be configured to determine more granular location coordinates based on the location of the camera 100a that captured the video frame 550 and using video analysis to determine distances to the detected objects 560a-560f as described in U.S. patent application Ser. No. 16/106,777, filed Aug. 21, 2018, appropriate portions of which are hereby incorporated by reference.

Generally, the status captions 562a-562f and/or the boxes shown around the detected objects 560a-560f may not appear in the example video frame 550 when stored as a recording (e.g., when played back using a playback device). The boxes around the detected objects 560a-560f and/or the status captions 562a-562f may be illustrative examples indicating the types of objects detected by the video analysis module 490 and/or the type of information stored as the metadata 158. In some embodiments, for testing purposes (e.g., in a debug mode), the boxes around the objects 560a-560f and/or the status captions 562a-562f may be shown overlaid on the video data 502a-502n.

In some embodiments, the cameras 100a-100n may be configured to generate automated incident reports. In one example, the video analytics module 490 may be configured to flag an event (e.g., a collision such as the collision between the vehicle 250a-250b as shown in association with FIG. 4). In another example, the driver may manually flag an event by providing an input to the camera 100a (e.g., by pressing a button on the camera 100a and/or using the smartphone 112a connected to the camera 100a). In yet another example, the location module 460 may comprise an accelerometer and/or gyroscope that may detect an abrupt speed and/or direction change that may be flagged. In response to flagging the event, the cameras 100a may preserve the corresponding one of the video files 500a-500n (e.g., including a pre-determined amount of time before and after the event, such as 30 seconds before and 30 seconds after). The camera 100a (e.g., via the smartphone 112a) may communicate the video file associated with the event and the metadata (e.g., including sensor data from the vehicle 200 and/or the camera 100a) to the metadata server 120.

In some embodiments, the metadata server 120 may overlay the metadata 158 on the video corresponding to the event. In some embodiments, the processor 452 may be configured to overlay the metadata on the video corresponding to the event before communicating the video file to the metadata server 120. The data overlay may be similar to the status captions 562a-562f. For example, the automated incident report may comprise the location and/or speed data as well as showing other vehicles and/or pedestrians that may have been involved (e.g., to indicate which party may have crossed illegally, signaled incorrectly and/or behaved improperly). The annotated data of the status captions 562a-562f may provide additional information to insurance investigators and/or police to see the status of the traffic light 560e, license plates and/or make/model of the vehicle 560a, determine an identity of the pedestrians 560c (e.g., potential witnesses), etc. In an example, the camera 100a may be configured to generate a file (e.g., a PDF file) as the incident report that may reside in the memory 454 (e.g., an expandable SD-type card slot) and/or be downloaded to the user device 112a) to enable the incident report to be communicated later when internet connectivity is available.

In the example shown, most of the objects 560a-560f may be located in the middle section 554 of the video frame 550. For example, the vehicle 560a, the vehicle 560b, the pedestrians 560c, the street light 560d and/or the sign 560f may be on, or slightly above the roadway in the middle section 554. One object (e.g., the traffic light 562e) may be located in the upper section 556. No objects may be detected in the portion of the video frame 550 corresponding to the hood 552. In the example shown, the hood 552 may comprise reflections (e.g., of the objects 560a-560c). If the video analysis module 490 interprets the reflections on the hood 552 as objects, the results of the object detection and/or the associated metadata may be incorrect and/or misleading.

The video analysis module 490 may be configured to perform hood detection. For example, one of the library modules 530a-530n may be configured to detect where the hood 552 is located in the video frame 550. The video analysis module 490 may dynamically determine the location of the input buffer 494 in the video frame based on hood detection. For example, the cameras 100a-100n may be installed by the consumer and the field of view captured by each camera 100a-100n may be slightly different based on the installation. A varying amount of hood and sky may be present in the field of view of the cameras 100a-100n for each installation.

In some embodiments, the hood detection may be performed by the video analytics module 490 (e.g., on-camera). In some embodiments, the hood detection may be performed through cloud (or distributed) processing. For example, after the camera 100a is installed, a series of photos (e.g., video frames) may be captured and transferred to the cloud processing service. The video frames may be analyzed on the cloud server side to detect where the view of the hood starts in the video frame. Generally, the field of view does not change after installation. In one example, a still image may be captured and sent periodically to audit if the field of view has changed (e.g., and the location of the hood 552).

In some embodiments, general statistics may be collected from each of the cameras 100a-100n in the system 50 and/or by the processor 452. The statistics may be analyzed to learn and/or understand how many license plates and/or other objects are typically collected for each time period and general location. For example, if the number of objects detected dramatically falls, then the cameras 100a-100n may generate an alert along with a still image or video file information for an automated (e.g., hood detection) and/or manual analysis. For example, the alert may be used to determine if one or more of the cameras 100a-100n have been damaged or has become dislodged so that the field of view is no longer aligned to position the location of the hood 552 to a particular area of the frame buffer 494.

Metadata extraction from video generated from one of the dash cameras 100a-100n may take advantage of inherent characteristics of the scene to limit the amount of spatial data used from the input video frame 550 as input to the input frame buffer 464 used for video analytics. By limiting the amount of spatial data input to the working buffer 464 the inherently limited system resources of the real time system may be allocated more efficiently.

A typical scene captured from the dash cameras 100a-100n may have about 15% to 25% hood surface captured as well as 15% to 25% sky. The hood 552 is typically unimportant for the collection of roadway data. The reflections off the hood surface 552 may further complicate any analysis that is using the bottom of the video frame 550 to look for relevant objects. The sky region may have decreasing importance for roadway data as the top of the video frame 550 is reached.

Figure 7:
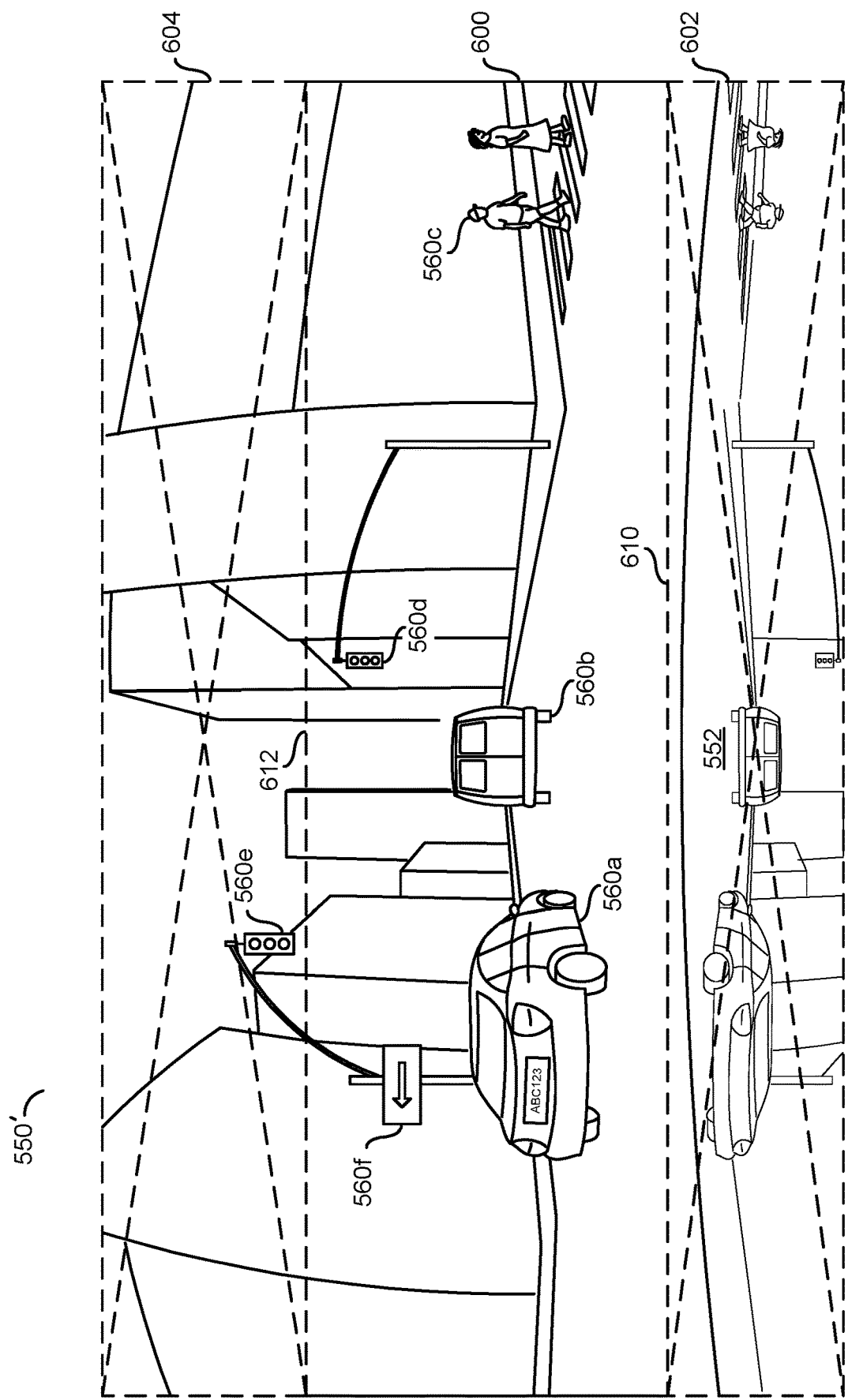
FIG. 7 is a diagram illustrating regions of a video frame.

Referring to FIG. 7, a diagram illustrating regions of a video frame is shown. The example video frame 550' is shown. The video frame 550' may comprise the hood 552 and the objects 560a-560f as shown in association with FIG. 6.

The video frame 550' is shown having three different regions. A middle region 600, a bottom region 602 and a top region 604. The middle region 600 may be a roadway region. The bottom region 602 may be a hood region. The top region 604 may be a sky region. In the example video frame 550', detected objects 560a-560d and the object 560f are in the roadway region 600. The hood 552 is in the hood region 602. The object 560e may be in the sky region.

A line 610 is shown. The line 610 may be a boundary between the roadway region 600 and the hood region 602. A line 612 is shown. The line 612 may be a boundary between the roadway region 600 and the sky region 604. For example, the portion of the video frame 550' between the hood boundary 610 and the bottom pixel row of the video frame 550' may be the hood region 602. The portion of the video frame 550' between the sky boundary 612 and the top pixel row of the video frame 550' may be the sky region 604. The portion of the video frame 550' between the hood boundary 610 and the sky boundary 612 may be the roadway region 600. The hood boundary 610 and the sky boundary 612 may represent coordinates for defining the regions 600-604 for the frame buffer 494.

In the example shown, the video frame 550' is partitioned into the three regions 600-604 horizontally. In some embodiments, the video frame 550' may be partitioned into more (or fewer) regions. In some embodiments, the regions may be partitioned horizontally. In some embodiments, the regions may be a combination of horizontally, vertically, diagonally and/or irregularly partitioned regions. The number, size and/or shape of the regions may be varied according to the design criteria of a particular implementation.

In order to perform real time video analysis to detect and/or store metadata about objects, the frame buffer 494 may be used. A large frame buffer may be used but copies are expensive in a real time, embedded environment. Also, analyzing the entire video frame 550' may be computationally expensive for the processor 452. The hood region 602 may not contain objects. The sky region 604 may have few objects. A large portion of the typical field of view of the video frame 550' comprises the sky region 604 and the hood region 602. Generally, most of the objects of interest in the video frame 550' are in the middle strip corresponding to the roadway region 600.

The circuits 102a-102n may implement an application program interface (API) that may enable configuration of the input frame buffer 494. The amount of the frame buffer 494 that may be allocated to one of the libraries 530a-530n may configured. In one example, if the library 530i implements license plate recognition, the frame buffer 494 may be configured to allocate the library 530i to the roadway region 600 since all of the license plates in the video frame 550' would be in the roadway region 600. For example, the techniques and/or processes implemented by the library 530*i* for detecting license plates need only look in the roadway region 600 and not the hood region 602 or the sky region 604. The regions and/or the libraries allocated to each region may be varied according to the design criteria of a particular implementation.

The sky region 604 may have varying degrees of usefulness for detection of different roadway objects. In an example, the taller the roadway object to be detected, the higher the probability of the object being present in the sky region 604. For example, if one of the libraries 530*a*-530*n* are configured to detect buildings, then the building detection library may be allocated to the sky region 604 and/or the roadway region 600. In the example shown, the street light 560*e* may be a tall object located in the sky region 604. A tall object such as the traffic light 560*e* could be in the sky region 604. For example less resources of the processor 452 may be used in the sky region 604, but some important objects such as the traffic light 560*e* may be in the sky region 604. In certain circumstances and localities (e.g., within a city), scanning the sky region may provide useful information.

The processor 452 may be configured to divide the input buffer 494 into different regions. The processor 452 may determine co-ordinates corresponding to X,Y locations of the video frame 550' for each region. The frame buffer 494 may store the co-ordinates corresponding to the various regions.

The data in the divided input buffers 494 may be analyzed using different library modules 530*a*-530*n* that specialize in detecting different types of objects. The object detection modules 530*a*-530*n* may be commoditized. Multiple vendors may offer the object detection libraries 530*a*-530*n*. The different libraries 530*a*-530*n* may provide vision based object detection that differ in implementation. In some embodiments, the libraries 530*a*-530*n* may use object detection techniques from two or more different vendors simultaneously. For example, the library 530*a* from one vendor may be installed and may be used for car make, model, color and LPR detects and the library 530*b* from another vendor may be installed into the same system and configured to be used for traffic signals, street lights or only tall objects.

The resources of the circuits (e.g., the SoC 102*a*) may be shared. The region of interest of the frame buffer 494 may be specified differently for each of the libraries 530*a*-530*n*. In one example, there is no reason for the car detection library to look for cars, and license plates in the sky region 604, and there is little reason for the tall object library to look for objects in the roadway section 600 (e.g., since the tall objects would be far away and yield low confidence results until closer and in the sky region 604).

In some embodiments, the regions may be vertically oriented. In one example, some objects may be more likely to be detected on the side and/or edges of the input buffer 494. In one example, one of the libraries 530*a*-530*n* may be configured to search for business signs for restaurants, shops, banks, etc. In another example, one of the libraries 530*a*-530*n* may be configured to search for parking spots (e.g., the camera 100*a* may identify free parking spots and sends the information to a cloud service to provide real-time parking availability). In yet another example, one of the libraries 530*a*-530*n* may be configured to detect street vendors, bus stops, high-occupancy vehicle lanes, etc. The processor 452 may allocate libraries 530*a*-530*n* that search left and right bands (excluding the hood region 602) of the input buffer 494.

In some embodiments, the libraries 530*a*-530*n* may be configured to define the various regions of the input buffer 494. In an example, one of the libraries 530*a*-530*n* may specialize in detection of the hood 552 in order to define the hood region 602. In some embodiments, one of the libraries 530*a*-530*n* may define a region for another one of the libraries 530*a*-530*n*. In one example, the input buffer 494 may be configured broadly as the roadway region 600 and one of the libraries 530*a*-530*n* may be configured for the car detection. The location of the vehicles may be detected and/or the corresponding metadata may be tagged by the video analytics module 490. The car detection library may further define the region(s) for the license plates (e.g., since the license plate regions may be a subset of the roadway region 600 since license plates may be located on the detected cars). The car detection library may narrow the region of interest for one of the libraries 530*a*-530*n* that may perform LPR/OCR to read license plates.

In another example, the location of pedestrians may be detected and/or corresponding metadata may be tagged by the video analytics module 490. The pedestrian detection library may further define the region(s) for another one of the libraries 530*a*-530*n* to perform additional analysis on the pedestrians. For example, one of the libraries 530*a*-530*n* may be configured to determine gender and/or age of the pedestrians (e.g., since the gender/age information about the pedestrians may be determined from analyzing the video frame at the location of the pedestrians). The pedestrian detection library may narrow the region of interest for one of the libraries 530*a*-530*n* that may perform age, gender and/or pedestrian identity detection.

Figure 8:
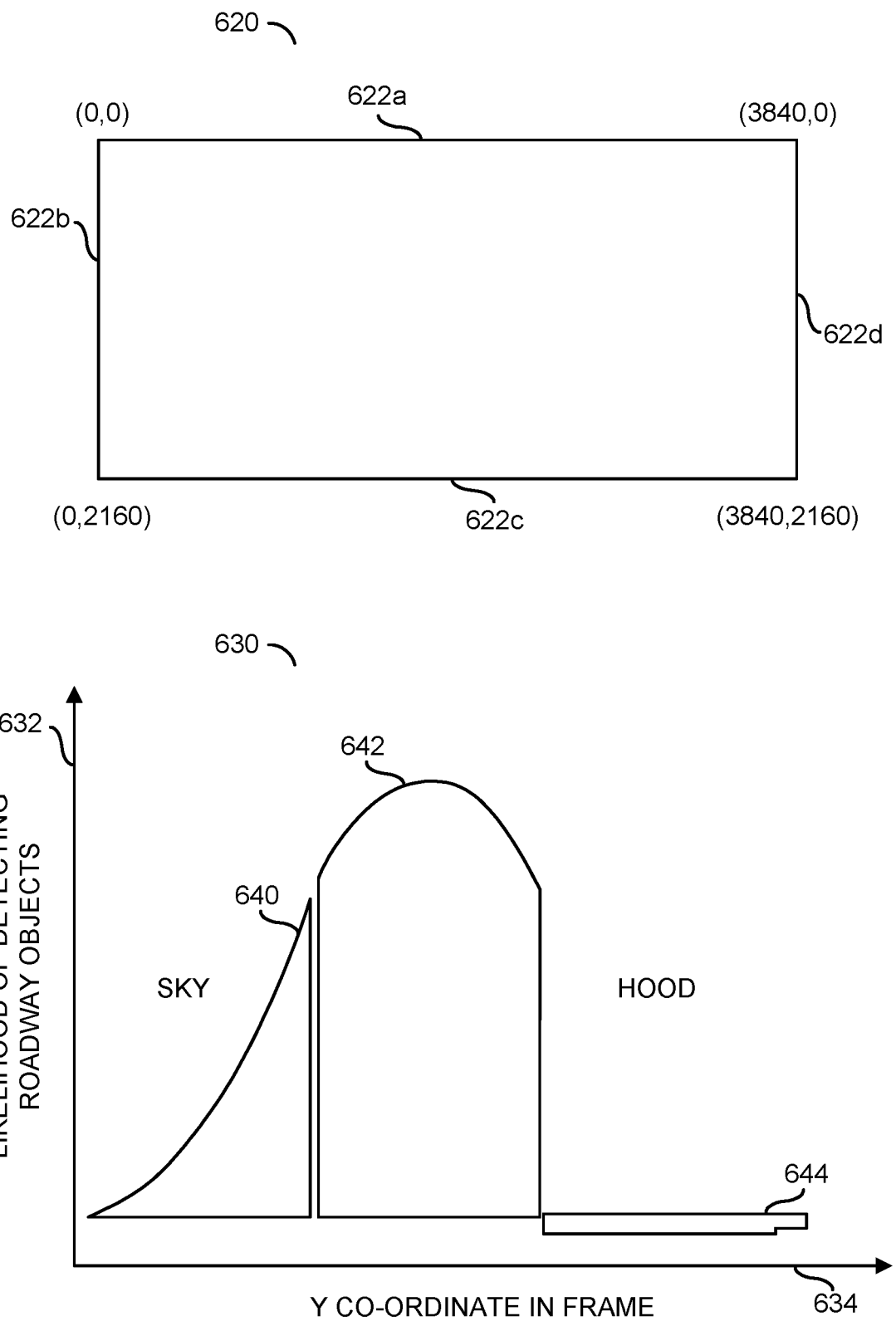
FIG. 8 is a diagram illustrating a graph of a likelihood of detecting roadway objects with respect to a Y co-ordinate of a video frame.

Referring to FIG. 8, a diagram illustrating a graph of a likelihood of detecting roadway objects with respect to a Y co-ordinate of a video frame is shown. A frame buffer example 620 is shown. The frame buffer example 620 may comprise edges 622*a*-622*d*. The edges 622*a*-622*d* may represent boundaries of a video frame captured by the capture devices 100*a*-100*n*. The edge 622*a* may be a top edge (e.g., row of pixels) of the frame buffer example 620. The edge 622*b* may be a left edge (e.g., column of pixels) of the frame buffer example 620. The edge 622*c* may be a bottom edge of the frame buffer example 620. The edge 622*d* may be a right edge of the frame buffer example 620.

In the example shown, the frame buffer example 620 may be a 4K (UHD) video frame (e.g., a 3840×2160 resolution). The frame buffer example 620 may have a first pixel (X,Y) location of (0,0) at the intersection of the top edge 622*a* and the left edge 622*b* (e.g., top left corner). The frame buffer example 620 may have a last pixel of the first row (X,Y) location of (3840,0) at the intersection of the top edge 622*a* and the right edge 622*d* (e.g., top right corner). The frame buffer example 620 may have a first pixel of the last row (X,Y) location of (0,2160) at the intersection of the left edge 622*b* and the bottom edge 622*c* (e.g., bottom left corner). The frame buffer example 620 may have a last pixel (X,Y) location of (3840,2160) at the intersection of the bottom edge 622*c* and the right edge 622*d* (e.g., bottom right corner). The pixel locations may be used as the co-ordinates of the frame buffer model 620 that define the regions 600-604. The number of pixels in the video frames captured by the capture devices 100*a*-100*n* may be varied according to the design criteria of a particular implementation.

A graph 630 is shown. The graph 630 may comprise a Y axis 632 and an X axis 634. The Y axis 632 may represent a likelihood of detecting a roadway object. The X axis 634 may represent a Y co-ordinate in the frame buffer example 620. The graph 630 may comprise a section 640, a section 642 and a section 644.

The first section 640 of the graph 630 may represent the sky region 604 (e.g., starting from the edge 622a of the frame buffer example 620 at Y co-ordinate 0). Towards the top of the frame buffer example 620, the likelihood of detecting a roadway object may be low. The likelihood of detecting a roadway object in the sky region 604 may increase towards the middle of the frame (e.g., as the Y co-ordinate increases in the frame buffer model 620).

The second section 642 of the graph 630 may represent the roadway region 600. Generally, most objects of interest may be detected in the roadway region 600 (e.g., other vehicles, cyclists, pedestrians, signs, buildings, roads, streetlights, etc.). The likelihood of detecting on object may vary nominally within the roadway region 600.

The third region 644 of the graph 630 may represent the hood region 602 (e.g., ending with the bottom edge 622c of the frame buffer example 620 at Y co-ordinate 2160). The hood region 602 may be the portion of the video frame detecting the hood 552 of the vehicle 200. Objects of interest are generally not detected in the hood region 602. For example, video analytics and/or object detection may be reduced and/or not used in the hood region 602.

The processor 452 may be configured to initially allocate the roadway region 600, the hood region 602 and the sky region 604. In some embodiments, the allocation of the regions 600-604 may be determined based on historical data from the recorded dash camera videos 500a-500n. For example, the processor 452 may analyze a number of dash camera videos to gather some statistics (e.g., as represented by the graph 630) to determine likely locations of regions that may be categorized as the hood region 602 and the sky region 604.

In some embodiments, the processor 452 may determine the allocation of the regions 600-604 by dynamically locating and fine tuning the hood region 602 and the sky region 604 using reflection detection and/or other visual cues. The video analysis module 490 may analyze the entire frame buffer 494 periodically and use visual cues to identify the sky region 604 and/or the hood region 602. In an example, for hood detection, the video analysis module 490 may search for reflections. Vehicles and/or store front signs that are detected as being upside down and/or spatially associated (as per properties of light reflection) with the objects located on the street. In another example, for hood detection, the video analysis module 490 may track objects that are getting closer (e.g., bigger) to the camera 100a and then disappear (or become sufficiently distorted) at the lower portion of the frame. The location where objects disappear or become distorted may be flagged as the hood region 602. In an example, for the sky region 604, visual cues from tracking items that approach the camera 100a (e.g., become larger) may be used. For example, trees or tree-tops, buildings or tops of buildings, clouds, the sun and/or blue sky may be identified by the video analytics module 490 and statistics may be gathered as to where the sky region 604 should start (e.g., the boundary 612).

In some embodiments, the processor 452 may determine the allocation of the regions 600-604 by dynamically allocating the roadway region of interest 600 based on occurrence of objects identified with sufficient confidence. For example, the hood region 602 may be sufficiently devoid of objects identified after the object analysis is performed by the video analytics module 490 for an amount of time. As the area corresponding to the hood 552 returns less and less objects with confidence above a threshold level, then the area 602 may be considered the hood region and may be ignored. In some embodiments, the processor 452 may progressively spend less resources scanning the hood region 602 as the occurrence of objects identified declines. For example, after 10000 frames of no items being identified in bottom 15% of video frame 550', the video analytics module 490 may start scanning the hood region 602 only every other input frame, then after another 20000 scans with no items identified (e.g., increasing the confidence level), the video analytics module 490 may scan only every fifth frame of the hood region 602, etc.

In some embodiments, the processor 452 may determine the allocation of the regions 600-604 in response to a user input. The user (e.g., the driver of the vehicle 200) may interact with a user interface to manually mark the hood boundary 610. In one example, a touchscreen LCD display on the camera 100a may provide a video preview and the user may use the touchscreen to trace the hood region 602. In another example, the video frames may be transmitted to the user device 112a and the user may use the smartphone touchscreen to trace the hood region 602 (e.g., a companion smartphone app may be provided with the camera 100a). In some embodiments, the camera 100a may transmit sample video frames (e.g., a single captured video frame or multiple video frames) to the metadata server 120 and the metadata server 120 may be configured to determine the hood region 602 and/or a person may enter the boundaries corresponding to the hood region 602 after a manual review.

The implementation of the input frame buffer 494 may be varied based on the video input architecture. In one example, for simplicity, there may be an assumption that the video frame buffer 494 is preserved for some time and the video analytics library(ies) 530a-530n are given region of interest co-ordinates in memory corresponding to rectangular regions inside the video input frame buffer 494. One assumption may be made that the video frame buffer 494 is copied (or direct memory accessed) into a safe place (e.g., in totality) and is preserved until the video analytic libraries 530a-530n have finished the analysis. For example, the analysis may be performed in as little time as the blanking period between video frames, in one frame time, or in multiple frame times. In some embodiments, the libraries 530a-530n may be configured to communicate to the processor 452 that the input buffer 494 may be freed and a new frame buffer may be made available. In an example, the portions and/or subsets of the frame buffer 494 may be static rectangular regions available for a short time for analysis.

Figure 9:
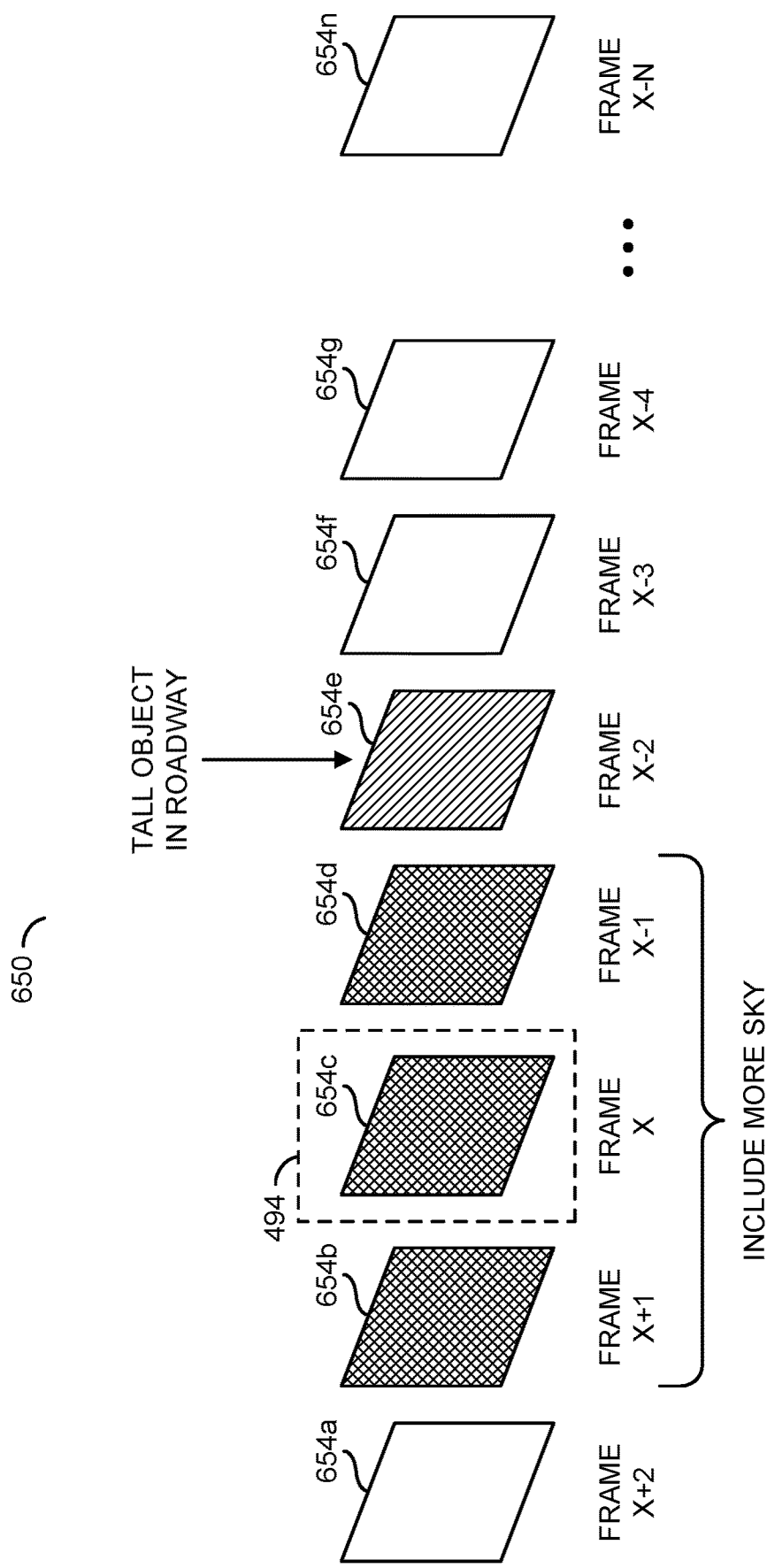
FIG. 9 is a diagram illustrating adjusting regions for frames following an object detection.

Referring to FIG. 9, a diagram illustrating adjusting regions for frames following an object detection is shown. A sequence 650 of video frames 654a-654n is shown. The sequence 650 may represent the video frames 654a-654n through the input frame buffer 494. In the example shown, the video frames 654c may represent a video frame currently in the input buffer 494 at a time X. The video frames 654d-654n may represent video frames that have already been through the input buffer 494 (e.g., labeled with times X–1 to X–N). The video frames 654a-654b may represent upcoming video frames that may pass through the input buffer 494 (e.g., labeled with times X+2 to X+1).

The processor 452 may take advantage of the installation location of the dash cameras 100a-100n being typically mounted on the front of the vehicle 200 and that the vehicle 200 is usually moving forward along a roadway. The objects 560a-560f that may appear at the top of the video frame 550' when close to the vehicle 200 (e.g., in the sky region 604) may generally be detected earlier when the same objects are farther away and appear smaller and located below the sky region 604 of the video frame 550'. For example, an object may appear small on the horizon when far away, then appear larger and tall when close. Even with a low confidence level of detection as to what the object is, the object location may be tracked over the sequence of video frames 650.

In some embodiments, the sky region 604 of the video frame 550' may not be analyzed by the video analytics module 490 at all unless objects are detected in previous frames and the objects are identified as objects that may likely inhabit the higher portions of the video frame (e.g., the sky region 604) at a slightly later time. The video analytics module 490 may perform a more comprehensive search for objects with a smaller input buffer 494 to scan. In an example, if no roadway objects that can be characterized as 'tall' were identified in previous video frames in the roadway region 600 (e.g., the center of the video frame 550) then only the roadway region 600 may be used for the current object search. If 'tall' roadway objects were scanned in some video frames previous to the current frame subsequent video frames may be analyzed by the video analytics module 490 using a larger search area that includes the sky region 604.

In the example shown, the video frames 654*f*-654*n* may have already been through the input buffer 494, analyzed by the video analytics module 490 and have an output indicating that no tall objects were detected. The video frame 654*e* may have already been through the input buffer 494 and may have a tall object present. When the video analytics module 490 detects a tall object (e.g., a tall object in the distance that would become larger as the vehicle 200 approaches), then the processor 452 may adjust the input frame buffer 494 to include more of the sky region 604.

In response to detecting the tall object in the video frame 654*e*, the processor 452 may adjust the input buffer 494 to enable the libraries 530*a*-530*n* to analyze more of the top portion of the video frame of incoming video frames for a pre-determined amount of time. In one example, the processor 452 may adjust the location coordinates of the sky boundary 612 (e.g., move the boundary 612 towards the top of the video frame) to increase the road region 600. In another example, the processor 452 may allocate more resources to performing the video analysis on the sky region 604. In the example shown, the next three video frames 654*b*-654*d* may have the adjustment to analyze a higher portion of the input video frames. The amount of subsequent video frames that include more analysis of the sky region 604 may be varied according to the design criteria of a particular implementation.

In the example shown, the video frame 654*d* may have already been through the input buffer 494. The video frame 654*d* may be one of the video frames that have more resources dedicated to detecting objects in a top portion of the video frame. In the example shown, the video frame 654*c* may be the current video frame in the input buffer 494. The video frame 654*e* may be one of the video frames that have more resources dedicated to detecting objects in a top portion of the video frame. In the example shown, the video frame 654*b* may be the next upcoming video frame for the input buffer 494. The video frame 654*d* may be one of the video frames that have more resources dedicated to detecting objects in a top portion of the video frame. In the example shown, the video frame 654*a* may be an upcoming video frame for the input buffer 494. For the video frame 654*a*, the processor 452 may revert to the default analysis (e.g., limited detection in the sky region 604, and most detection dedicated to the roadway region 600), assuming that no more tall objects are detected in the distance.

Referring to FIG. 10, a diagram illustrating tracking an approach of a tall object is shown. A sequence of video frames 654*a'*-654*c'* and the corresponding input buffers 494*a*-494*c* are shown. The input buffers 494*a*-494*c* may each comprise corresponding roadway regions 600*a*-600*c*, hood regions 602*a*-602*c*, sky regions 604*a*-604*c*, hood boundaries 610*a*-610*c* and sky boundaries 612*a*-612*c*. An object 680*a*-680*c* may represent an object being tracked over time in a sequence of video frames as the vehicle 200 approaches the object 680*a*-680*c*.

The object 680*a* is shown in the video frame 654*a'* and the input buffer 680*a*. The object 680*a* may be a traffic light detected by the video analytics module 490 in the distance. The traffic light 680*a* may be an example of a tall object that appears in the roadway region 600*a* when far away. The object 680*b* is shown in the video frame 654*b'* and the input buffer 680*b*. The object 680*b* may be the traffic light 680*a* detected by the video analytics module 490 that is now closer to the vehicle 200. The traffic light 680*b* may be an example of a tall object that is approaching the vehicle 200 and appears larger as the distance is reduced. The object 680*c* is shown in the video frame 654*c'* and the input buffer 680*c*. The object 680*c* may be the traffic light 680*a* detected by the video analytics module 490 that is now close to the vehicle 200. The traffic light 680*c* may be an example of a tall object that may appear in the sky region 604*c* when close to the vehicle 200.

The traffic light 680*a*-680*c* may first be detected in the roadway section 600 and as the camera approaches the traffic light 680*a*-680*c* may be tracked as the traffic light 680*a*-680*c* slowly moves upward into the sky region 604. Conversely, other objects, such as cars and pedestrians, in the scene would remain in the middle section 600. The video analytics module 490 may detect the attribute of objects 'drifting' upward into the sky region 604. In an example, objects that have the attribute of drifting upwards into the sky region 604 may be classified as tall objects. Objects that drift upwards into the sky region 604 may trigger the processor 452 to dynamically adjust the coordinates stored in the input buffer 494 to use more of the sky region 604 for object detection. Additionally, a confidence level returned about the object identity and current GPS co-ordinates (e.g., with map data in a central database) may be implemented to intelligently extend the input buffer 494 to include more of the sky region 604.

In the example shown, the frame buffer 494*a* may have a smaller middle region 600*a* when the tall object 680*a* is detected. The processor 452 may dynamically adjust the size of the middle region 600. In the frame buffer 494*b*, the object 680*b* may appear higher as the object 680*b* is closer. The sky boundary 612*b* may be moved upward and the roadway region 600*b* may be a larger proportion of the input buffer 494*b*. Similarly, in the frame buffer 494*c*, the object 680*c* may appear even higher as the object 680*c* is very close to the vehicle 200. The processor 452 may continually adjust the sky boundary 612*c*. The sky boundary 612*c* may be moved even higher towards the top of the input buffer 494*c* and the size of the sky region 604*c* may be smaller and the roadway region 600*c* may include more area at the top of the input buffer 494*c*.

The video analytics module 490 may generate a confidence level to determine whether objects detected are categorized as tall. If the confidence level is above a threshold value, then the processor 452 may increase the amount of resources used on the input buffer 494 in the sky area 604. The amount of adjustment may be varied according to the design criteria of a particular implementation. The adjustment may be implemented for the next object detection iteration. The processor 452 may keep the adjustment as long as the confidence levels are increasing for the classification of the object(s).

In some embodiments, the processor 452 may implement a locality heuristic. Generally, the higher the likelihood that the camera 100*a* is entering or near or inside a non-rural area the greater predisposition to allocate more of the input buffer 494 to the sky region 604 (e.g., in urban areas there are statistically more tall buildings, street lights, street signs, etc.). Additionally, temporal heuristics may be implemented by the processor 452. For example, a predisposition to skew towards more sky region temporally when there has been a high confidence detection of a tall object recently.

Figure 11:
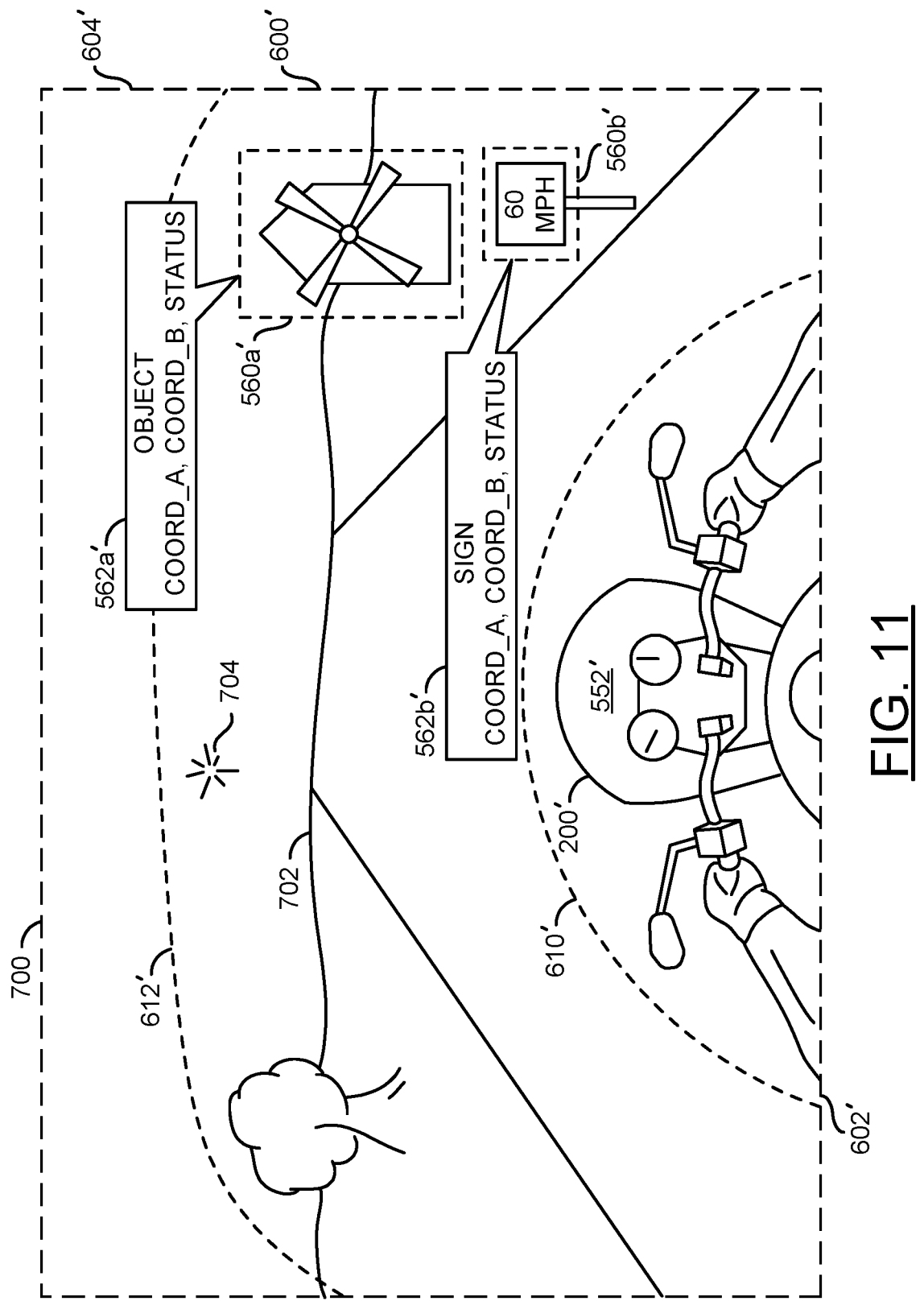
FIG. 11 is a diagram illustrating an example video frame of a rural region.

Referring to FIG. 11, a diagram illustrating an example video frame 700 of a rural region is shown. The example video frame 700 may be captured by one of the cameras 100*a*-100*n*. The video frame 700 may comprise a field of view showing a rural area. The hood 552' of the vehicle 200' is shown. Generally, the location of the hood 552' may not change in a rural area compared to an urban area. However, in the example shown, the vehicle 200' may be a motorcycle. The motorcycle 200' may have a different hood/front end 552' (e.g., a handlebars, instrument panel, front tire, etc.).

The objects 560*a*'-560*b*' are shown detected by the video analytics module 494. The status captions 562*a*'-562*b*' are shown. The objects 560*a*'-560*b*' detected and/or the metadata for the status captions 562*a*'-562*b*' may be similar in the rural area and the urban area.

The hood boundary 610' is shown as a curved line. In some embodiments, the vehicle with the camera 100*a* may not have an easily defined rectangular hood region 602. In the example shown for a motorcycle, the hood region 602' may be an irregular shape to accommodate the front end 552' of the motorcycle 200' (e.g., a semi-circle and/or a rounded corner rectangle). The hood region 602' may be larger than the front end 552' to account for the potential of movement of the front end 552' (e.g., the driver may turn the handlebars). In some embodiments, the camera 100*a* may be installed on one side of the windshield (e.g., not centered) so that there is more roadway region 600' on one side of the video frame 700 and more hood region 602' on the other side of the video frame 700.

In the example shown, the sky boundary 612' is shown as a curved line. The curved line of the sky boundary 612' may enable the roadway region 600' to include more area in the central portion of the video frame 700 and less area towards the edges of the video frame 700. In an example, tall objects such as traffic lights and street signs may be more likely to occur above the road in the central vertical area of the video frame 700 than at the edges of the video frame 700. The shape of the sky boundary 612' may be varied according to the design criteria of a particular implementation.

The horizon 702 is shown. In the rural area, there may be few objects of interest above the horizon 702. For example, rural areas have fewer tall buildings, stop lights and/or billboards. When a rural area is detected (e.g., using geolocation and/or based on video analytics), the processor 452 may use the locality heuristic to reduce the amount of resources dedicated to detecting objects in the sky region 604 in the input buffer 494.

An object 704 is shown. In some embodiments, one of the libraries 530*a*-530*n* may be configured to detect objects in the sky (e.g., allocated to the roadway region 600' and/or the sky region 604'). In one example, the object 704 may be a light in the sky and/or a fast moving object and the library 530*i* may be configured to detect meteor events, UFO events and/or airplanes. In another example, the object 704 may represent a weather event (e.g., a tornado, a severe lightning storm, hail, etc.). For example, the metadata from the video frame 700 may comprise weather information that may be uploaded to the metadata server 120. The metadata server 120 may collect the weather events from many of the cameras 100*a*-100*n* to accumulate a central weather database. The central weather database may map weather events in real time to better predict future events based on the video analysis (e.g., provide tornado warnings).

Figure 12:
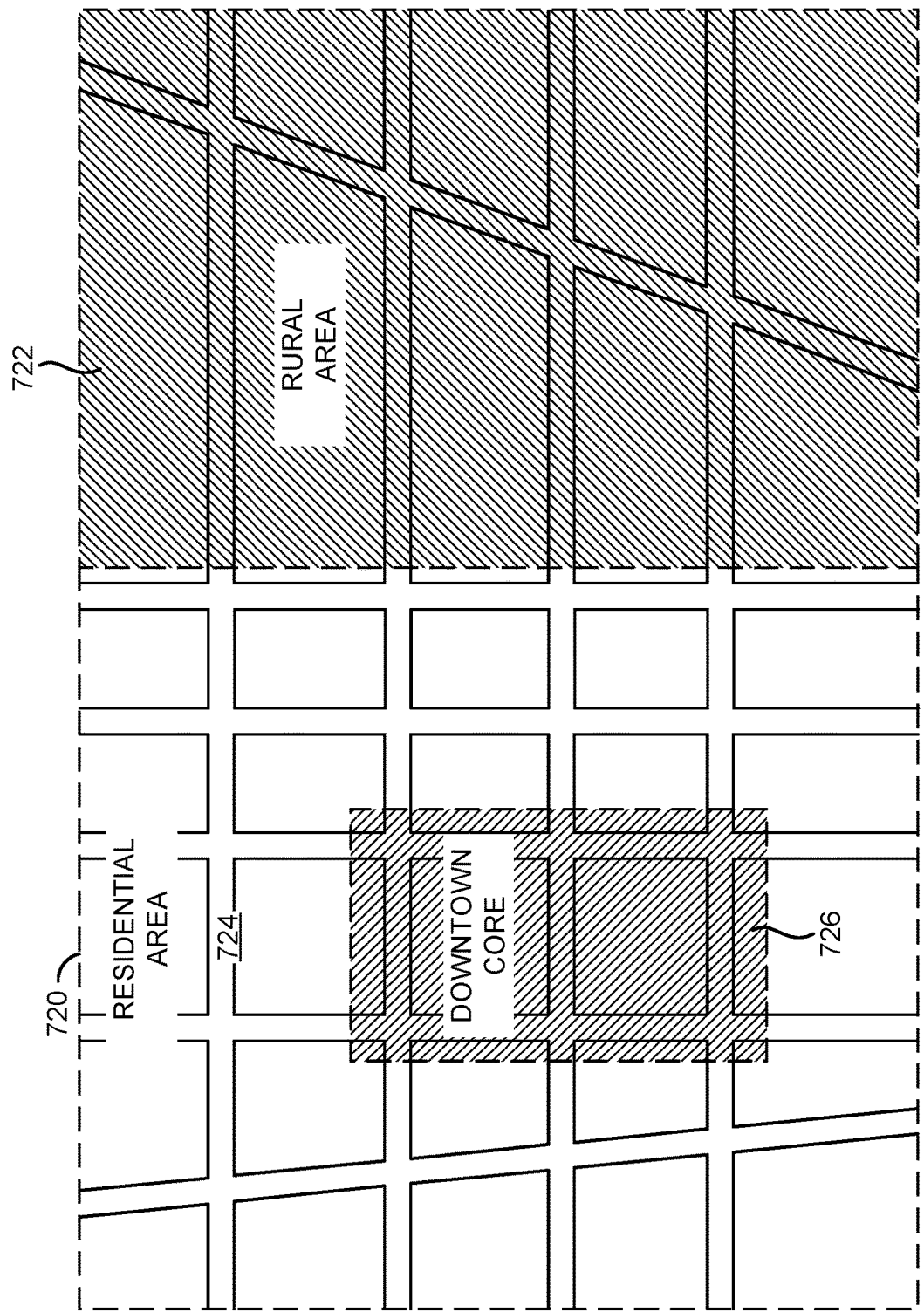
FIG. 12 is a diagram illustrating map regions for adjusting frame buffer regions.

Referring to FIG. 12, a diagram illustrating map regions for adjusting frame buffer regions is shown. A map 720 is shown. The map 720 may be part of a GPS-enabled system and/or cloud connected system connected to a central mapping authority or database. The map 720 may comprise a number of areas. An area 722, an area 724 and an area 726 are shown. The area 722 may correspond to a rural area. The area 724 may correspond to a residential area. The area 726 may correspond to a downtown core area. The number of areas and/or the categories of areas may be varied according to the design criteria of a particular implementation.

The areas 722-726 may characterize the location of the cameras 100*a*-100*n* when performing the video analysis. The characteristics of the areas 722-726 may be used by the locality heuristics implemented by the processor 452. The characteristics (e.g., statistical information and/or actual information based on previously performed video analysis using one or more of the cameras 100*a*-100*n*) of the areas 722-726 may be used to better allocate if, when or how much of the sky region 604 would be used to scan for 'tall' objects. In one example, the location module 460 may determine the current GPS/GNSS coordinates. The GPS/GNSS coordinates may indicate that the vehicle 200 is driving in the rural area 722. In the rural area 722, the probability of tall roadway objects entering the scene may be minimal and less system resources may be allocated to recognize and identify such objects. Thus more system resources could be allocated to detecting and classifying the remaining roadway objects that typically appear in the roadway portion 600 (e.g., license plates, car make, model, year, type, color, etc.). With more system resources allocated to different roadway objects, the roadway objects being identified may be identified with higher confidence scores, which may be important for the OCR (optical character recognition) portion of the license plate scan.

In an example, a map service may be used to determine the location of the rural area 722, the residential area 724 and/or the downtown core area 726. In some embodiments, the map service may define the areas 722-726. In some embodiments, the cameras 100*a*-100*n* may store statistical information (e.g., similar to the graph 630 shown in association with FIG. 8) that may be associated with GPS coordinates determined by the location module 460. As more and more information is gathered from the cameras 100*a*-100*n*, the characteristics of the areas 722-726 may be defined. For example, the rural regions 722 may be marked as areas where more system resources are allocated to 'shorter' objects and a different area of the input buffer 494 could be used. The downtown core area 726 may be marked as areas where more of the input buffer 494 and a broader scan for more objects in the sky region 604 is performed. The residential area 724 may have more objects detected in the sky region 604 compared to the rural area 722, but not as many objects as the downtown core area 726.

The areas 722-726 may be defined according to other types of characteristics. In one example, one or more of the areas 722-726 may represent a high extreme weather area and one or more of the areas 722-726 may represent a low extreme weather area. For example, as the vehicle 200 moves into areas that historically have more active weather (e.g., tornadoes), more resources may be allocated to the sky region 604. In an area of low historical incidence of extreme weather one or more libraries 530a-530n that detect extreme weather may analyze every other captured video frame (or every 4th video frame, every couple of minutes, etc.). In the areas 722-726 that have more extreme weather, the libraries 530a-530n may be configured to perform computational analysis of cloud patterns, rain patterns, lightning patterns, etc. In some embodiments, the metadata server 120 may communicate the signal INTR to adjust the amount of analysis for the sky region 604 in response to weather alerts from a weather authority. For example, when a tornado alert is activated for one of the areas 722-726, every one of the cameras 100a-100n in the area may devote more resources to the sky region 604.

In some embodiments, the areas 722-726 may be defined according to high incidences of alien ship sightings and/or astronomy events. When the areas 722-726 have high incidences of UFO sightings, the processor 452 may allocate more resources to the sky region 604. Similarly, time may be used to adjust the allocation of the regions 600-604. For example, a meteor shower may appear at a particular time (e.g., a one-time only event) and the processor 452 may allocate more resources to the sky region for the meteor shower. In another example, particular weather patterns may occur at particular times of the year. For example, tornados may be less likely to occur in the winter in Oklahoma.

Figure 13:
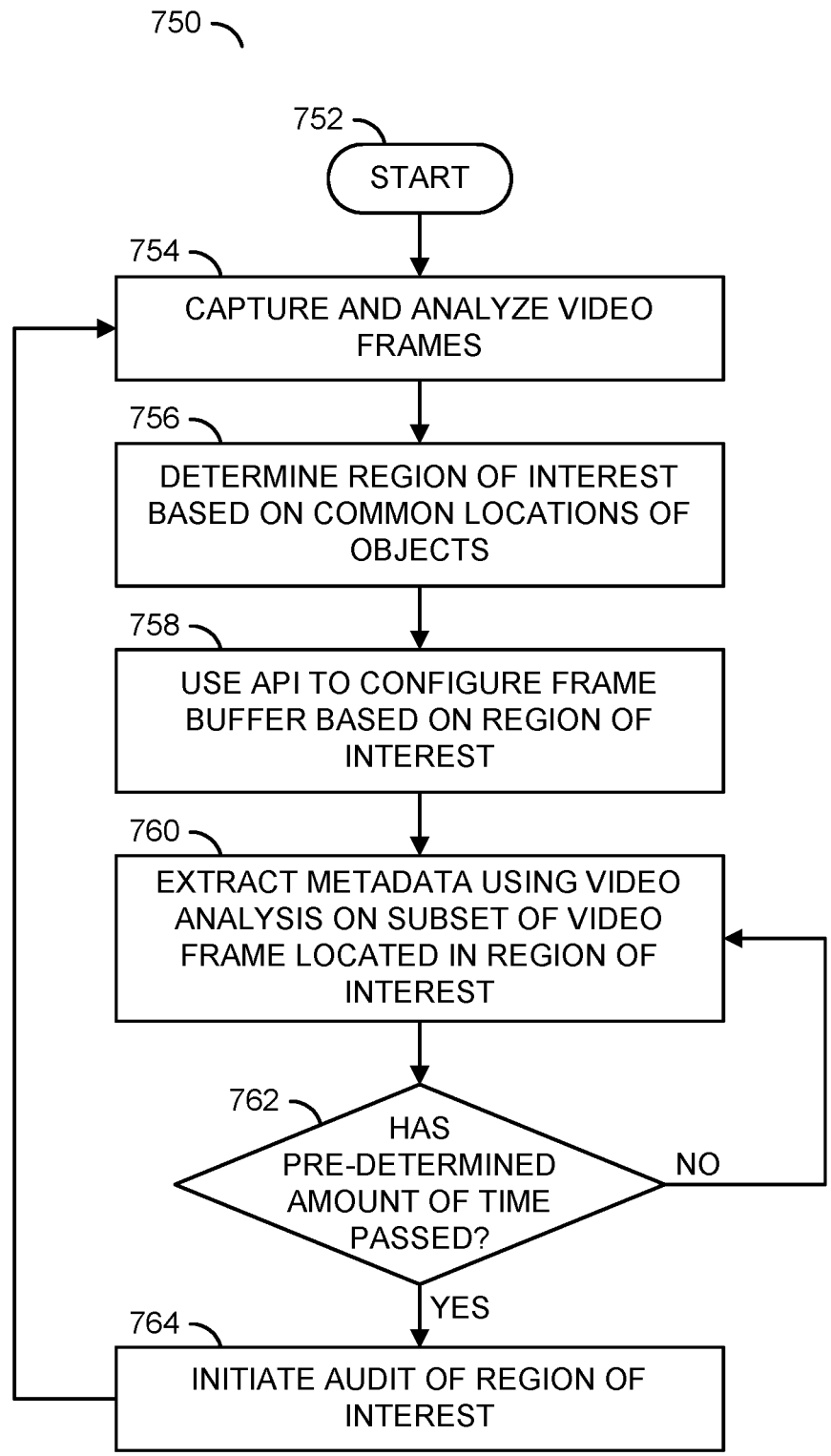
FIG. 13 is a flow diagram illustrating a method for configuring a region of interest for a frame buffer.

Referring to FIG. 13, a method (or process) 750 is shown. The method 750 may configure a region of interest for a frame buffer. The method 750 generally comprises a step (or state) 752, a step (or state) 754, a step (or state) 756, a step (or state) 758, a step (or state) 760, a decision step (or state) 762, and a step (or state) 764.

The step 752 may start the method 750. In the step 754, the cameras 100a-100n (e.g., using the lens 456, the sensor 458 and the processor 452) may capture and analyze the video frames. Next, in the step 756, the processor 452 may determine the region of interest based on common (e.g., likely) locations of the objects 560a-560n. In the step 758, the processor 452 may use an API to configure the input frame buffer 494 based on the region of interest (e.g., the roadway region 600). Next, in the step 760, the video analytics module 490 may extract the metadata 158 using video analysis on a subset of the video frame located in the region of interest 600. Next, the method 750 may move to the decision step 762.

In the decision step 762, the processor 452 may determine whether a pre-determined amount of time has passed. If a pre-determined amount of time has not passed, the method 750 may return to the step 760. If the pre-determined amount of time has passed, the method 750 may move to the step 764. The pre-determined amount of time may be a calibration timer set by the processor 452. In the step 764, the processor 452 may initiate an audit of the region of interest 764. The audit may be performed by analyzing a full video frame to determine whether adjustments should be made to the hood boundary 610 and/or the sky boundary 612 (e.g., the co-ordinates for the regions 600-604) so that suitable sizes are selected for the regions 600-604. Next, the method 750 may return to the step 754.

Figure 14:
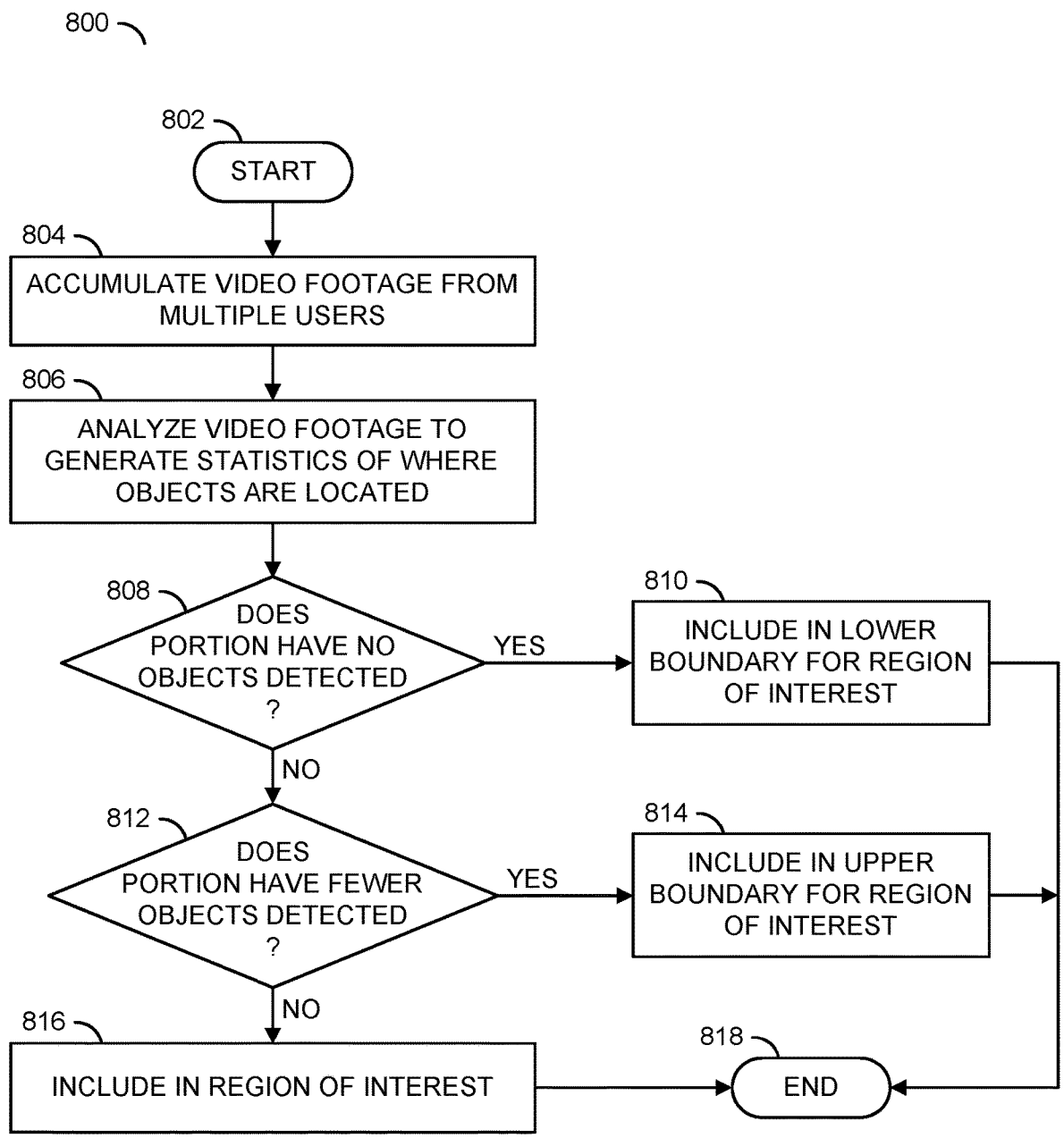
FIG. 14 is a flow diagram illustrating a method for using statistical analysis of detected objects to adjust boundaries of a frame buffer.

Referring to FIG. 14, a method (or process) 800 is shown. The method 800 may use statistical analysis of detected objects to adjust boundaries of a frame buffer. The method 800 generally comprises a step (or state) 802, a step (or state) 804, a step (or state) 806, a decision step (or state) 808, a step (or state) 810, a decision step (or state) 812, a step (or state) 814, a step (or state) 816, and a step (or state) 818.

The step 802 may start the method 800. In the step 804, the database 130 of the metadata server 120 may accumulate video footage (e.g., the video files 500a-500n and/or the metadata 158) from multiple users (e.g., the cameras 100a-100n). Next, in the step 806, the video footage may be analyzed to generate statistics of where the objects 560a-560f are located. In some embodiments, the video footage may be analyzed locally by each of the cameras 100a-100n and the statistical information may be aggregated by the database 130 and then the aggregated statistical information may be provided to each of the cameras 100a-100n. In some embodiments, the metadata server 120 may be configured to perform the video analysis and determine the statistical information. Next, the method 800 may move to the decision step 808.

In the decision step 808, the processor 452 may determine whether a portion of the video frame 550 has no objects detected (or reflections of objects). If the portion has no objects detected, the method 800 may move to the step 810. In the step 810, the processor 452 may adjust the input frame buffer 494 to set the lower boundary 610 for the region of interest 600 based on the portion with no objects. Next, the method 800 may move to the step 818. In the decision step 808, if the portion does have objects detected, the method 800 may move to the decision step 812.

In the decision step 812, the processor 452 may determine whether one of the portions of the captured video frame 550 has fewer objects detected. If one of the portions of the captured video frame 550 has fewer objects detected, the method 800 may move to the step 814. In the step 814, the processor 452 may adjust the input frame buffer 494 to set the upper boundary 612 for the region of interest 600 based on the portion with fewer objects. Next, the method 800 may move to the step 818.

In the decision step 812, if one of the objects does not have fewer objects detected (e.g., the region with most of the detected objects), the method 800 may move to the step 816. In the step 816, the processor 452 may include the portion of the video frame 550 with the most detected objects in the region of interest (e.g., the roadway region) 600. Next, the method 800 may move to the step 818. The step 818 may end the method 800.

The method 800 may be implemented to determine the locations of the regions 600-604 for the input frame buffer 494 based on historical data. The videos used for statistical analysis may be videos from the same product SKU or at least the cameras 100a-100n that generate video attributes that are the same (e.g., videos that have the same hardware characteristics such as, video resolution, lens FOV, etc.).

Figure 15:
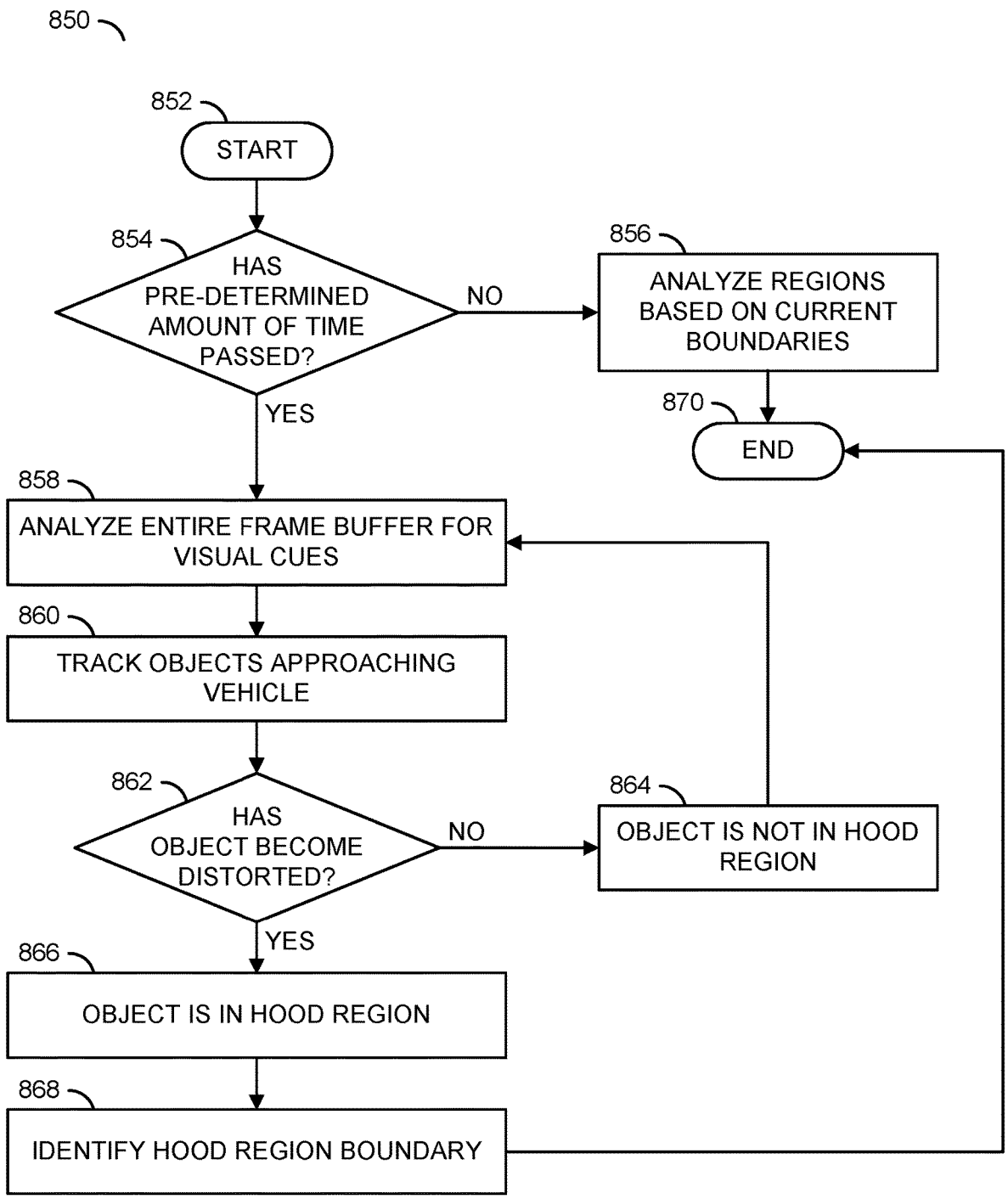
FIG. 15 is a flow diagram illustrating a method for tracking approaching vehicles to determine a hood region for a frame buffer.

Referring to FIG. 15, a method (or process) 850 is shown. The method 850 may track approaching vehicles to determine a hood region for a frame buffer. The method 850 generally comprises a step (or state) 852, a decision step (or state) 854, a step (or state) 856, a step (or state) 858, a step (or state) 860, a decision step (or state) 862, a step (or state) 864, a step (or state) 866, a step (or state) 868, and a step (or state) 870.

The step 850 may start the method 852. In the decision step 854, the processor 452 may determine whether a pre-determined amount of time has passed (e.g., for updating characteristics and/or co-ordinates of the input frame buffer 494). If the pre-determined amount of time has not passed, the method 850 may move to the step 856. In the step 856, the video analytics module 490 may analyze the various regions 600-604 based on the current location of the hood boundary 610 and the sky boundary 612. Next, the method 850 may move to the step 870. In the decision step 854, if the pre-determined amount of time has passed, the method 850 may move to the step 858.

In the step 858, the video analytics module 490 may analyze the entire frame buffer 494 for visual cues (e.g., reflections, objects drifting upwards, objects disappearing, etc.). Next, in the step 860, the video analytics module 490 may track objects approaching the vehicle 200. Next, the method 850 may move to the decision step 862.

In the decision step 862, the video analytics module 490 may determine whether the tracked object has become distorted. If the object has not become distorted, the method 850 may move to the step 864. In the step 864, the processor 452 may determine that the object is not in the hood region 602. Next, the method 850 may return to the step 858. In the decision step 862, if the object has become distorted, the method 850 may move to the step 866.

In the step 866, the processor 452 may determine that the tracked object is in the hood region 602. Next, in the step 868, the processor 452 may identify the hood boundary 610. Next, the method 850 may move to the step 870. The step 870 may end the method 850.

Figure 16:
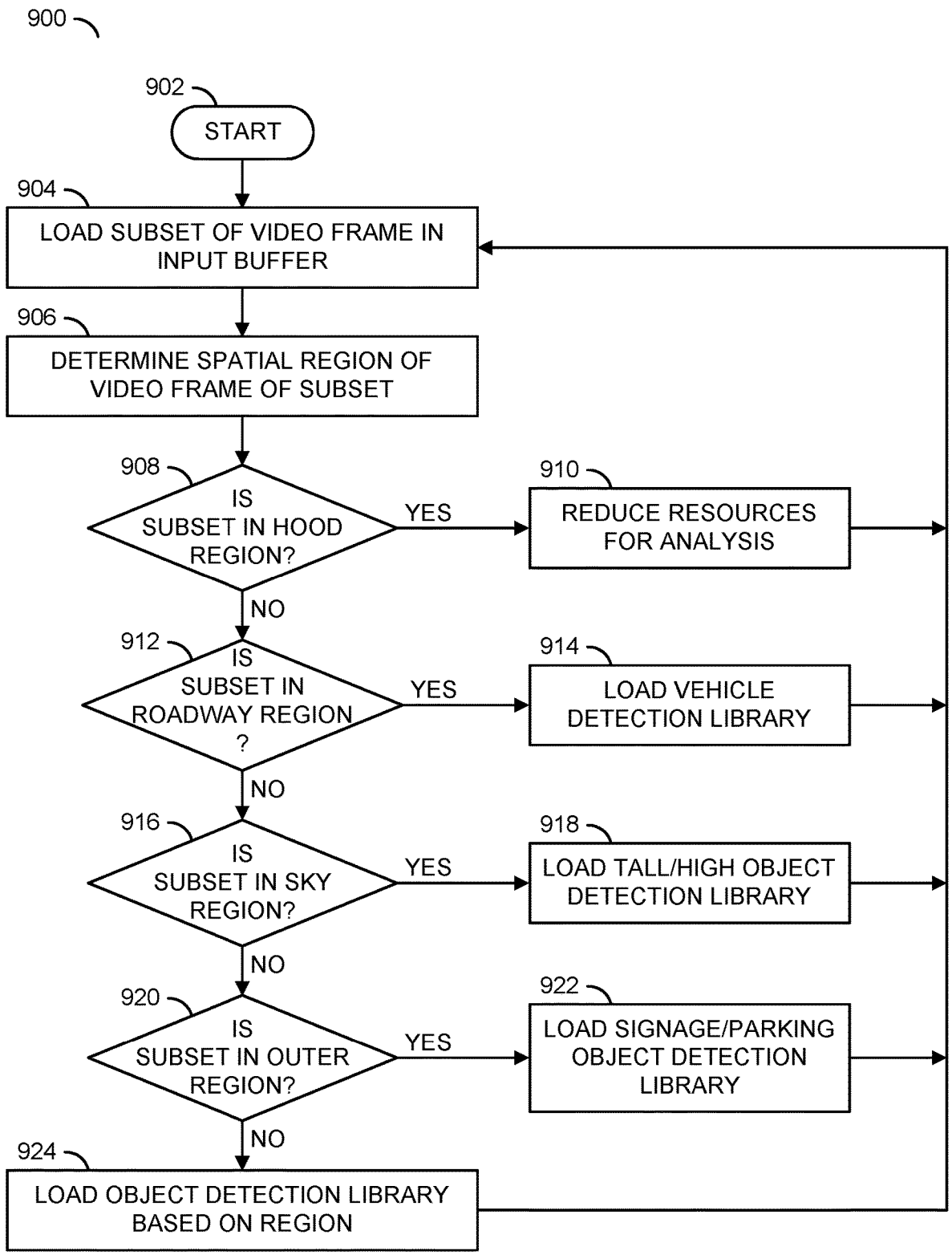
FIG. 16 is a flow diagram illustrating a method for applying various detection libraries to different regions of a frame buffer.

Referring to FIG. 16, a method (or process) 900 is shown. The method 900 may apply various detection libraries to different regions of a frame buffer. The method 900 generally comprises a step (or state) 902, a step (or state) 904, a step (or state) 906, a decision step (or state) 908, a step (or state) 910, a decision step (or state) 912, a step (or state) 914, a decision step (or state) 916, a step (or state) 918, a decision step (or state) 920, a step (or state) 922, and a step (or state) 924.

The step 902 may start the method 900. In the step 904, the processor 452 may load a subset of a video frame (e.g., the video frame 550) in the input buffer 494. Next, in the step 906, the processor 452 may determine the spatial region (e.g., co-ordinates) of the video frame of the loaded subset. Next, the method 900 may move to the decision step 908.

In the decision step 908, the video analytics module 490 may determine whether the subset of the video frame is the hood region 602. For example, the video analytics module 490 may determine whether no objects are detected and/or detect visual cues such as reflections. If the loaded subset is the hood region 602, then the method 900 may move to the step 910. In the step 910, the processor 452 may reduce the amount of resources dedicated for video analysis. Next, the method 900 may return to the step 904. In the decision step 908, if the loaded subset is not the hood region 602, the method 900 may move to the decision step 912.

In the decision step 912, the video analytics module 490 may determine whether the subset of the video frame is the roadway region 600. For example, the video analytics module 490 may determine whether there is a large amount of objects detected and/or the types of objects detected (e.g., vehicles, pedestrians, street signs, license plates, etc.). If the loaded subset is the roadway region 600, then the method 900 may move to the step 914. In the step 914, the video analytics module 490 may load one of the libraries 530a-530n for vehicle detection. In an example, the library 530a may be specialized for vehicle detection. Next, the method 900 may return to the step 904. In the decision step 912, if the loaded subset is not the roadway region 600, then the method 900 may move to the decision step 916.

In the decision step 916, the video analytics module 490 may determine whether the subset of the video frame is the sky region 604. For example, the video analytics module 490 may determine whether there are few objects detected and/or the types of objects detected (billboards, buildings, traffic lights, etc.). If the loaded subset is the sky region 604, then the method 900 may move to the step 918. In the step 918, the video analytics module 490 may load one of the libraries 530a-530n for tall/high object detection. In an example, the library 530b may be specialized for tall object detection such as buildings. In another example, the library 530i may be specialized for high objects such as UFOs and/or weather events. Next, the method 900 may return to the step 904. In the decision step 916, if the loaded subset is not the sky region 904, then the method 900 may move to the decision step 920.

In the decision step 920, the video analytics module 490 may determine whether the subset of the video frame is the outer region. For example, the video analytics module 490 may determine whether the objects detected are signage, parking spots, and/or storefronts and/or determine whether objects disappear from the field of view (e.g., get cut off by the edge of the video frame 550). If the loaded subset is the outer region, the method 900 may move to the step 922. In the step 922, the video analytics module 490 may load one of the libraries 530a-530n for signage/parking object detection. In an example, the library 530c may be specialized for signage/parking objects. Next, the method 900 may return to the step 904. In the decision step 920, if the loaded subset is not the outer region, the method 900 may move to the step 924. In the step 924, one or more of the libraries 530a-530n may be loaded based on the type of region detected. In one example, the library 530d may be specialized for OCR to read license plates. Next, the method 900 may return to the step 904.

Figure 17:
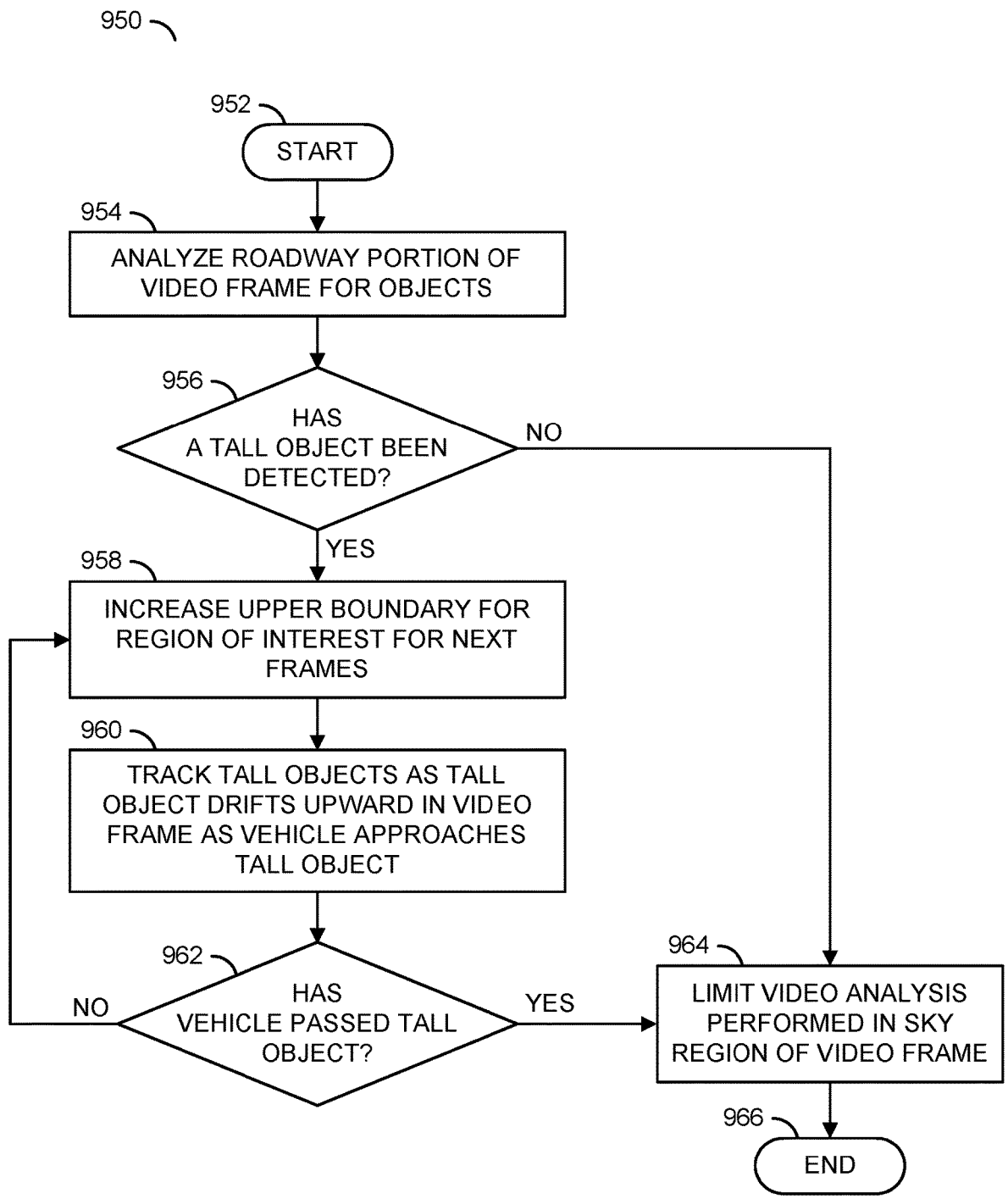
FIG. 17 is a flow diagram illustrating a method for tracking tall objects and adjusting a sky region.

Referring to FIG. 17, a method (or process) 950 is shown. The method 950 may track tall objects and adjust a sky region. The method 950 generally comprises a step (or state) 952, a step (or state) 954, a decision step (or state) 956, a step (or state) 958, a step (or state) 960, a decision step (or state) 962, a step (or state) 964, and a step (or state) 966.

The step 952 may start the method 950. In the step 954, the video analytics module 490 may analyze the roadway portion 600 of the video frame for objects. Next, the method 950 may move to the decision step 956.

In the decision step 956, the video analytics module 490 may determine whether a tall object has been detected. The roadway portion 600 may be analyzed because tall objects may appear small and in the roadway region 600 (e.g., at the horizon 702) when far away. Objects that are tall may either be classified by type of object (e.g., billboards, buildings, etc.) and/or by tracking the tall object over time as the vehicle 200 gets closer to the suspected tall object. The tall object may drift towards the top of the video frame. If the tall object has not been detected, the method 950 may move to the step 964. If the tall object has been detected, the method 950 may move to the step 958.

In the step 958, the processor 452 may increase the size of the region of interest 600 for the next captured video frames (e.g., temporarily move the upper sky boundary 612 towards the top edge 622a). Next, in the step 960, the video analytics module 490 may track the tall objects as the tall object drifts upwards in the video frames as the vehicle 200 approaches the tall object. Next, the method 950 may move to the decision step 962.

In the decision step 962, the video analytics module 490 may determine whether the vehicle 200 has passed the tall object. For example, the tall object may drift to the top edge 622a and then disappear as the tall object passes over the camera 100a and outside of the field of view. If the vehicle 200 has not passed the tall object, the method 950 may return to the step 958. If the vehicle 200 has passed the tall object, the method 950 may move to the step 964.

In the step 964, the processor 452 may limit the amount of video analysis performed in the sky region 604 of the captured video frame. Next, the method 950 may move to the step 966. The step 966 may end the method 950.

Figure 18:
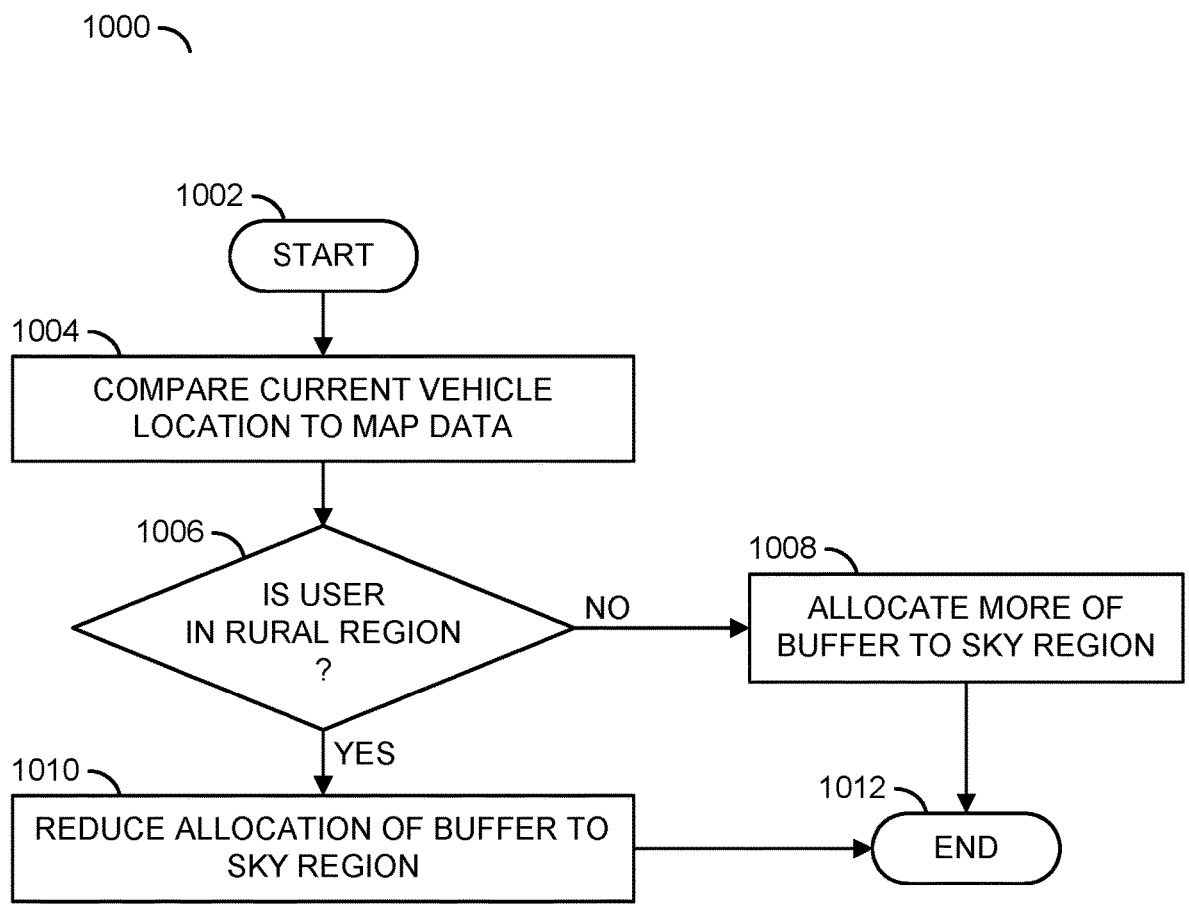
FIG. 18 is a flow diagram illustrating a method for adjusting a sky region of a frame buffer in response to a physical location.

Referring to FIG. 18, a method (or process) 1000 is shown. The method 1000 may adjust a sky region of a frame buffer in response to a physical location. The method 1000 generally comprises a step (or state) 1002, a step (or state) 1004, a decision step (or state) 1006, a step (or state) 1008, a step (or state) 1010, and a step (or state) 1012.

The step 1002 may start the method 1000. In the step 1004, the processor 452 may compare the current vehicle location received from the location module 460 to the map data 720. Next, the method 1000 may move to the decision step 1006.

In the decision step 1006, the processor 452 may determine whether the vehicle 200 is in the rural region 722. If the vehicle 200 is not in the rural region 722, the method 1006 may move to the step 1008. In the step 1008, the processor 452 may allocate more of the input buffer 494 to the sky region 604. Next, the method 1000 may move to the step 1012.

In the decision step 1006, if the vehicle 200 is in the rural region 722, the method 1000 may move to the step 1010. In the step 1010, the processor 452 may reduce the allocation of the input buffer 494 to the sky region 604. Next the method 1000 may move to the step 1012. The step 1012 may end the method 1000.

Figure 19:
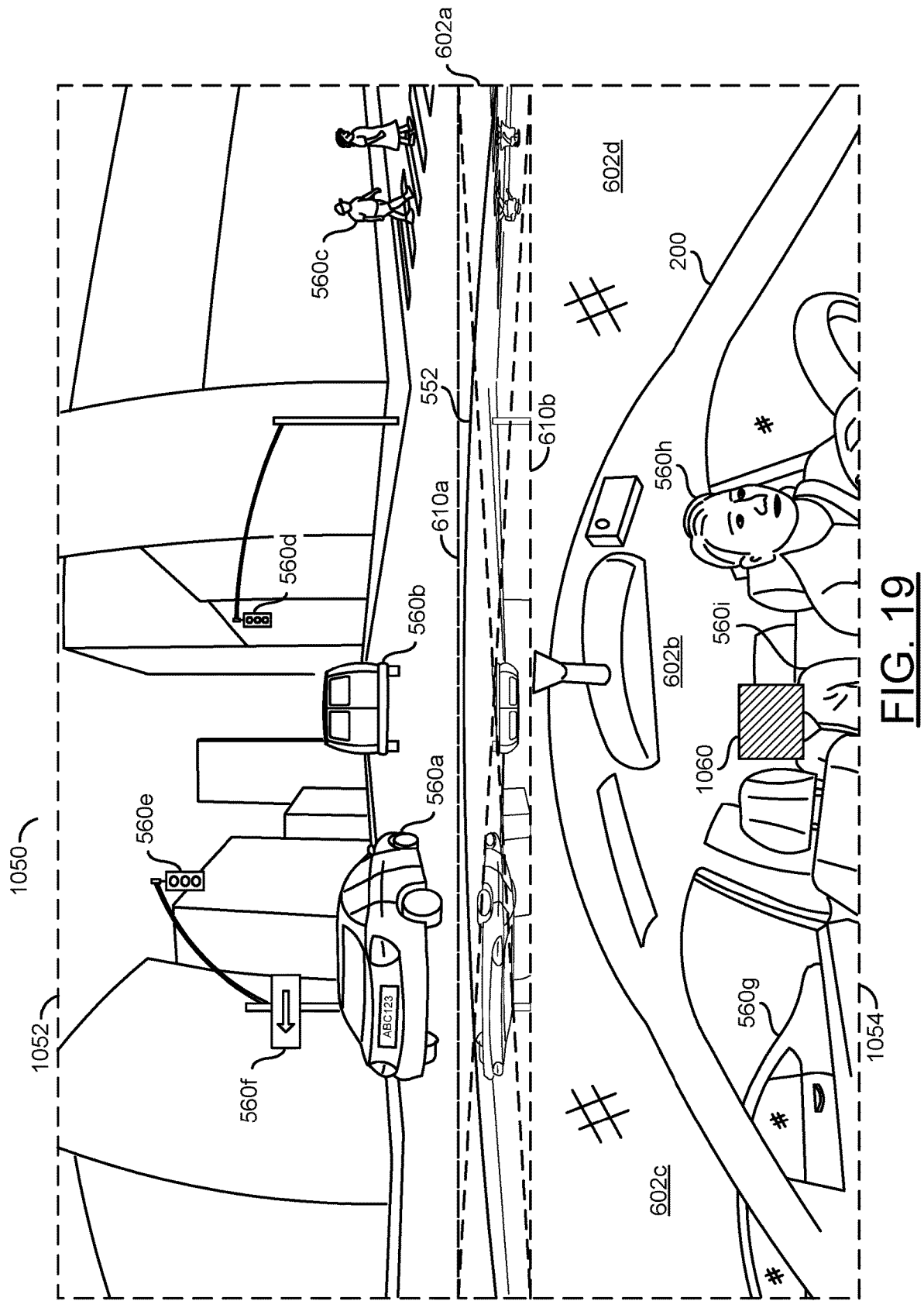
FIG. 19 is a diagram illustrating an example panoramic video frame.

Referring to FIG. 19, a diagram illustrating an example panoramic video frame 1050 is shown. The panoramic video frame 1050 may comprise video data having a field of view greater than 180 degrees. In one example, the panoramic video frame 1050 may be a 360 degree field of view video frame (e.g., a spherical video frame). In another example, the panoramic video frame 1050 may have less than a 360 degree field of view. In some embodiments, the panoramic video frame 1050 may comprise multiple video frames (e.g., the cameras 100a-100n may each comprise more than one lens 456 and/or sensor 458) that have been stitched together by the processor 452. The implementation of the panoramic video frame 1050 may be varied according to the design criteria of a particular implementation.

In some embodiments, the cameras 100a-100n may be configured to capture and/or generate the panoramic video frame 1050. In the example shown, the panoramic video frame 1050 may be a rectilinear view of the spherical video frame (e.g., a strip of video representing the 360 degree field of view). The panoramic video frame 1050 may comprise a view 1052 and a view 1054. In the example shown, the view 1052 may be a front view and the view 1054 may be an in-cabin view.

The front view 1052 may be a view through the windshield of the vehicle 200. In the example shown, the front view 1052 may be similar to the front view video frame 550' shown in association with FIG. 7. The detected objects 560a-560f are shown in the front view 1052. The hood 552 is shown in the front view 1052. The hood boundary 610a-610b is shown. The hood boundary 610a-610b may include an upper and lower boundary line corresponding to the hood region 602a for the front view 1052.

The in-cabin view 1054 may comprise a view of the interior of the vehicle 200. Similar to the hood 552 for the front view 1052, a portion of the interior of the vehicle 200 may be statically located in the panoramic video frame 1050 and have a low probability of objects being detected. For example, an object of interest may be unlikely to appear on the roof of the interior of the vehicle 200. In another example, an object of interest may be unlikely to appear above the vehicle through the windshield (e.g., above the vehicle 200). The processor 452 may be configured to adjust the input frame buffer 494 to include additional vehicle regions 602b-602d in addition to the hood region 602a.

In the example shown, the region 602b may correspond to the roof/frame of the vehicle 200 and the regions 602c-602d may correspond to an area above the vehicle 200. Similar to the hood region 602a, the processor 452 may allocate less (or varying amounts of) resources for the regions 602b-602d. The location of the regions 602a-602d may be varied according to the characteristics of the panoramic video frame 1050 (e.g., the location of the hood 552, the location of the cabin of the vehicle 200, how much of the field of view shows above or below the cameras 100a-100n, etc.).

In the example shown, the in-cabin view 1054 may comprise the detected objects 560g-560i. In the example, shown, the object 560g may be a vehicle beside the vehicle 200, the object 560h may be the driver of the vehicle 200 and the object 560i may be a passenger. The video analytics module 490 may detect the objects 560g-560i similar to detecting the objects 560a-560f in the front view 1052. For example, one or more of the libraries 530a-530n may be configured to detect the driver, passengers, the vehicle cabin and/or other vehicles.

In some embodiments, one or more of the libraries 530a-530n may implement passenger behavior detection (e.g., a library to detect if a passenger is unruly, sick, asleep, alert, etc.). For example, the circuit 102a may be configured to send an alert to the driver 560h in response to a detected behavior of the passenger 560i. In another example, the libraries 530a-530n may be configured to identify faces and/or compare to a database of known faces (e.g., a most wanted list, outstanding warrants, list of previous passengers for taxis or ride-sharing services, compiling statistics such as gender or age of passengers, etc.). In yet another example, identifying the face of the driver 560h may be implemented for fleets of vehicles (e.g., vehicles that might have different drivers in one vehicle for different shifts). For example, identifying the driver 560h may only need to occur when the driver 560h enters the vehicle and resources may be saved by not performing driver identification again until the driver leaves and re-appears again.

A region 1060 is shown. The region 1060 may be a blank area and/or an area that the video analytics module 490 may not perform object detection on (e.g., to save computational resources) similar to the hood and/or vehicle regions 602a-602d. In the example shown, the region 1060 may be a mask over a face of the passenger 560i.

In some embodiments, portions of the panoramic video frame 1050 may not be useable due to privacy reasons. The region 1060 may be a mask region and/or a region that is not analyzed. In an example of ride-sharing vehicle usage, the camera 100a may be configured to monitor the driver 560h (e.g., for drowsiness, alertness, etc.) and may optionally monitor the passenger 560i. For example, in some embodiments, detecting the identity of the passenger 560i may be useful. In another example, in some embodiments, the identity of the passenger 560i may not be useful (or not allowed). Similarly, the mask 1060 may be applied to the driver 560h. For example, the driver 560h may prefer to only capture the forward and side video of the panoramic video frame 1050, but not the driver facing portion.

In some embodiments, the regions 602*c*-602*d* may be excluded from the video analysis by the processor 452 due to privacy concerns. For example, local laws and/or regulations may restrict recording sensitive locations (e.g., private residences and/or buildings may need to be excluded from analysis). In another example, the regions 602*c*-602*d* may be included for the video analysis by the processor 452 (e.g., public roadways may be allowed to be recorded).

The functions performed by the diagrams of FIGS. 1-19 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
 a processor configured to (i) receive video frames captured by a capture device and (ii) perform video analysis on said video frames to extract metadata corresponding to objects detected in said video frames, wherein (i) resources allocated to detecting said objects in a sky region are reduced when geolocation information indicates said apparatus is in a rural area and (ii) resources allocated to detecting said objects in said sky region are increased when said geolocation information indicates said apparatus is in an urban area; and
 a memory configured to (i) store co-ordinates corresponding to a plurality of regions of said video frames including said sky region and (ii) provide temporary storage for said video frames to enable said processor to perform said video analysis, wherein (i) said video analysis performs a different amount of processing for detecting said objects on each of said plurality of regions and (ii) one of said regions corresponds to a portion of said video frames comprising a hood of a vehicle.

2. The apparatus according to claim 1, wherein said co-ordinates corresponding to said region corresponding to said hood does not change position.

3. The apparatus according to claim 1, wherein said processor does not perform said video analysis on said region corresponding to said hood.

4. The apparatus according to claim 1, wherein said sky region corresponds to a top portion of said video frames.

5. The apparatus according to claim 4, wherein (i) one of said plurality of regions is a roadway region and (ii) said roadway region is above said region corresponding to said hood and below said sky region.

6. The apparatus according to claim 5, wherein said processor assigns fewer resources for said video analysis for said sky region than a roadway region.

7. The apparatus according to claim 5, wherein (i) said video analysis detects most of said objects in said roadway region and (ii) said processor assigns a greater amount of resources for said video analysis for said roadway region than said region corresponding to said hood and said sky region.

8. The apparatus according to claim 5, wherein said processor is configured to dynamically adjust a location of a boundary between said sky region and said roadway region.

9. The apparatus according to claim 8, wherein (i) said processor adjusts said boundary based on a type of said objects detected and (ii) said type of said objects for adjusting said boundary is a tall object.

10. The apparatus according to claim 9, wherein (i) said tall object is detected by said processor in said roadway region when said tall object is far away from said apparatus and (ii) said processor is configured to track said tall object as said tall object drifts towards a top of said video frames received.

11. The apparatus according to claim 1, wherein said processor adjust a boundary of said sky region based on said geolocation information.

12. The apparatus according to claim 1, wherein said memory implements a video frame buffer.

13. The apparatus according to claim 1, wherein said processor is configured to periodically perform an audit on said co-ordinates by analyzing a full video frame to determine if said co-ordinates of said regions have changed.

14. The apparatus according to claim 1, wherein said processor is configured to determine said co-ordinates based on visual cues detected in said video frames.

15. The apparatus according to claim 14, wherein said visual cues for determining said co-ordinates for said region corresponding to said hood comprise reflections.

16. The apparatus according to claim 14, wherein said visual cues for determining said co-ordinates for said region corresponding to said hood comprise tracking said objects that become bigger and distorted.

17. The apparatus according to claim 1, wherein (i) said memory is configured to store statistical information about said objects detected in each of said plurality of regions and (ii) and said statistical information is used to determine said co-ordinates.

18. The apparatus according claim 1, wherein said metadata extracted from said video frames is based on inherent characteristics of a captured scene in order to limit an amount of spatial data used from said video frames as input to said memory for said video analysis.

19. An apparatus comprising:

a processor configured to (i) receive video frames captured by a capture device (ii) perform video analysis on said video frames to extract metadata corresponding to objects detected in said video frames and (iii) dynamically adjust a location of a boundary between a sky region and a roadway region based on geolocation information, wherein (i) said boundary is adjusted to reduce resources allocated to detecting said objects in said sky region when said geolocation information indicates said apparatus is in a rural area and (ii) said boundary is adjusted to increase resources allocated to detecting said objects in said sky region when said geolocation information indicates said apparatus is in an urban area; and a memory configured to (i) store co-ordinates corresponding to a plurality of regions of said video frames and (ii) provide temporary storage for said video frames to enable said processor to perform said video analysis, wherein (i) said video analysis performs a different amount of processing for detecting said objects on each of said plurality of regions and (ii) one of said regions corresponds to a portion of said video frames comprising a hood of a vehicle, one of said regions is said sky region corresponding to a top portion of said video frames, and one of said regions is said roadway region above said region corresponding to the portion of said video frames comprising the hood of the vehicle and below said sky region.

* * * * *